United States Patent
Lanner et al.

(10) Patent No.: US 12,516,287 B2
(45) Date of Patent: Jan. 6, 2026

(54) METHODS FOR PRODUCING RETINAL PIGMENT EPITHELIUM CELLS

(71) Applicant: BioLamina AB, Sundyberg (SE)

(72) Inventors: Karl Anders Fredrik Lanner, Nykvarn (SE); Álvaro Plaza Reyes, Seville (ES); Sandra Petrus Reurer, Cambridge (GB); Sara Padrell Sánchez, Solna (SE)

(73) Assignee: BioLamina AB, Sundbyberg (SE)

(*) Notice: Subject to any disclaimer, the term of this patent is extended or adjusted under 35 U.S.C. 154(b) by 892 days.

(21) Appl. No.: 17/252,789

(22) PCT Filed: Jun. 19, 2019

(86) PCT No.: PCT/EP2019/066285
§ 371 (c)(1),
(2) Date: Dec. 16, 2020

(87) PCT Pub. No.: WO2019/243462
PCT Pub. Date: Dec. 26, 2019

(65) Prior Publication Data
US 2021/0261918 A1    Aug. 26, 2021

Related U.S. Application Data

(60) Provisional application No. 62/687,416, filed on Jun. 20, 2018.

(51) Int. Cl.
*C12N 5/079*   (2010.01)

(52) U.S. Cl.
CPC ........ *C12N 5/0621* (2013.01); *C12N 2500/98* (2013.01); *C12N 2501/115* (2013.01); *C12N 2501/15* (2013.01); *C12N 2501/16* (2013.01); *C12N 2533/52* (2013.01)

(58) Field of Classification Search
None
See application file for complete search history.

(56) References Cited

U.S. PATENT DOCUMENTS

| | | |
|---|---|---|
| 2010/0184033 A1 | 7/2010 | West et al. |
| 2015/0175964 A1* | 6/2015 | Clegg ............... C12N 5/0621 435/405 |
| 2015/0299653 A1 | 10/2015 | Hovatta et al. |
| 2017/0067017 A1 | 3/2017 | Meyer et al. |

FOREIGN PATENT DOCUMENTS

| | | |
|---|---|---|
| AU | 2015201435 A1 | 4/2015 |
| EP | 3056563 A1 | 8/2016 |
| WO | 2012158910 A2 | 11/2012 |
| WO | 2016/037159 A1 | 3/2016 |
| WO | 2017/072763 A1 | 5/2017 |
| WO | 2017/091844 A1 | 6/2017 |
| WO | WO 2018/034618 A1 | 2/2018 |

OTHER PUBLICATIONS

Hazim et al. (Stem Cell Research & Therapy (2017) 8:217, DOI 10.1186/s13287-017-0652-9) (Year: 2017).*
Li et al (IOVS, Dec. 2007, vol. 48, No. 12, https://doi.org/10.1167/iovs.07-0327). (Year: 2007).*
Hongisto et al (Stem Cell Research & Therapy (2017) 8:291, DOI 10.1186/s13287-017-0738-4, Published: Dec. 29, 2017) ( Year: 2017).*
Kuroda et al (PLoS ONE 7(5): e37342. doi: 10.1371/journal.pone.0037342, Published May 17, 2012) (Year: 2012).*
Kawasaki et al (Proc Natl Acad Sci USA. Feb. 5, 2002;99(3):1580-5. doi: 10.1073/pnas.032662199. Epub Jan. 29, 2002.) (Year: 2002).*
Golos et al (Placenta 34, Supplement A, Trophoblast Research, vol. 27 (2013) S56-S61, http://dx.doi.org/10.1016/j.placenta.2012.11.019) (Year: 2013).*
Choudhary et al (Stem Cells Translational Medicine 2017; 6:490-501, Doi: 10.5966/sctm.2016-0088) (Year: 2017).*
Zahabi et al (Stem Cells And Development, vol. 21, No. 12, 2012, DOI: 10.1089/scd.2011.0599) (Year: 2012).*
Wilson et al (Fluids Barriers CNS (2015) 12:13 DOI 10.1186/s12987-015-0007-9 ) (Year: 2015).*
SG Search Report of Application No. 11202011929V Dated Aug. 10, 2022.
Bennis A et al: "Stem Cell Derived Retinal Pigment Epithelium: The Role of Pigmentation as Maturation Marker and Gene Expression Profile Comparison with Human Endogenous Retinal Pigment Epithelium", Stem Cell Reviews and Reports, Humana Press Inc, US, Jul. 21, 2017. Pages 659-669, vol. 13, No. 5.

(Continued)

*Primary Examiner* — Peter Paras, Jr.
*Assistant Examiner* — Khoa Nhat Tran
(74) *Attorney, Agent, or Firm* — Lippes Mathias LLP

(57) ABSTRACT

Method comprises providing a culture of human pluripotent stem cells adherent on a first substrate comprising a first laminin; exposing the stem cells to a differentiation medium for a first time period of 15 days to 50 days to obtain a first population of adherent cells comprising RPE cells and/or progenitors thereof; at the end of the first time period, dissociating the first population from the first substrate; replating the dissociated first population of cells on a second substrate comprising a second laminin; and culturing the replated first population of cells on the second substrate for a second time period to obtain an expanded and matured second population of cells comprising the RPE cells. The first and second laminins may be independently selected from LN-521, LN-511, LN-111 and LN-121, and are an intact protein or protein fragment. Cell surface markers useful for in vitro generation of RPE cells selected from CD140b, CD56, CD104, CD164, CD220, EGER, GD2, CD184, CD10, CD30, CD49a, CD49b, CD50, CD171, TRA-1-60 and CD326, preferably CD140b, CD56, GD2 and/or CD184. Also included are RPE cells so produced as well as materials and compositions utilizing such RPE cells for various treatments.

18 Claims, 44 Drawing Sheets

(56) References Cited

OTHER PUBLICATIONS

Alvar Plaza Reyes et al: "Xeno-Free and Defined Human Embryonic Stem Cell-Derived Retinal Pigment Epithelial Cells Functionally Integrate in a Large-Eyed Preclinical Model", Stem Cell Reports, Jan. 1, 2016, pp. 9-17, vol. 6, No. 1.
Alvaro Plaza Reyes et al: "Identification of cell surface markers and establishment of monolayer differentiation to retinal pigment epithelial cells", Nature Communications, Mar. 30, 2020, vol. 11, No. 1.
Petrus-Reurer Sandra et al: "Molecular profiling of retinal pigment epithelial cell differentiation for therapeutic use", bioRxiv, Mar. 31, 2021.
Alvaro Plaza Reyes et al: "Xeno-Free and Defined Human Embryonic Stem Cell-Derived Retinal Pigment Epithelial Cells Functionally Integrate in a Large-Eyed Preclinical Model", Stem Cell Reports, vol. 6, No. 1, Jan. 1, 2016 (Jan. 1, 2016), pp. 9-17, XP055615409, United States, ISSN: 2213-6711, DOI: 10.1016/j.stemcr.2015.11.008.
Chichagova Valeria et al: "Cellular regeneration strategies for macular degeneration: past, present and future", Eye, Nature Publishing Group, GB, vol. 32, No. 5, Mar. 5, 2018 (Mar. 5, 2018), pp. 946-971, XP036619345, ISSN: 0950-222X, DOI: 10.1038/S41433-018-0061-Z [retrieved on Mar. 5, 2018].
Heidi Hongisto et al: "Xeno- and feeder-free differentiation of human pluripotent stem cells to two distinct ocular epithelial cell types using simple modifications of one method", Stem Cell Research & Therapy, vol. 8, No. 1, Dec. 1, 2017 (Dec. 1, 2017), XP055615400, DOI: 10.1186/s13287-017-0738-4.
Parul Choudhary et al: "A strategy to ensure safety of stem cell-derived retinal pigment epithelium cells", Stem Cell Research & Therapy, vol. 7, No. 1, Sep. 2, 2016 (Sep. 2, 2016), XP055645020, DOI: 10.1186/s13287-016-0380-6.
Shelly E. Tannenbaum et al: "Derivation of Xeno-Free and GMP-Grade Human Embryonic Stem Cells—Platforms for Future Clinical Applications", PLoS ONE, vol. 7, No. 6, Jun. 20, 2012 (Jun. 20, 2012), p. e35325, XP055471292, DOI: 10.1371/journal.pone.0035325.
International Search Report dated Dec. 5, 2019 from PCT/EP2019/066285.
Jorgensen, Annette, et al, "Superantigen Presentation by Human Retinal Pigment Epithelial Cells to T Cells is Dependent on CD2-CD58 and CD18-CD54 Molecule Interactions" Exp. Eye Res. 2001 doi: 10.1006/exer.2001.1082.
Lim, Jennifer, I., et al., "Neuropilim-1 Expression by Endothelial Cells and Retinal Pigment Epithelial Cells in Choroidal Neovascular Membranes" Elesevier Inc., 2005, doi: 10.1016/j.ajp.2005.07.021.
Hongisto, Supplementary Dataset 1. Optimization of hPSC-RPE Differentiation.
Reyes, Alvaro Plaza, et al., "Identification of cell surface markers and establishment of monolayer differentiation to retinal pigment epithelial calls", Nature Communications 2020, https://doi.org/10.1038/s41467-020-15326-5.
Deora, Ami A., et al., "The Basolateral Targeting Signal of CD147 (EMMPRIN)Consists of a Single Leucine and Is Not Recognized by Retinal Pigment Epithelium" Molecular Biology of the Cell vol. 15, 4148-4165, Sep. 2004.
Choudhary, Paul, et al., "Astrategy to ensure safety of stme cell-derived retinal pigment epithelium cells" Stem Cell Research & Therapy, 2016, doi: 10.1186/s13287-016-0380-6.
Sugino, Ilene K., et al., "Cell-Deposited Matrix Improves Retinal Pigment Epithelium Survival on Aged Submacular Human Bruch's Membrane" Investigative Opthalmology & Visual Science, Mar. 2011, vol. 52, No. 3.
Susan D. Vogt, MS, et al., "Retinal pigment epithelial expression of compliment regulator CD46 is altered early in the course of geographic atrophy" Exp Eye Res. 2011, Oct. 93(4): 413-423 doi: 10.1016/j.exer.2011.06.002.

* cited by examiner

MITF

PMEL

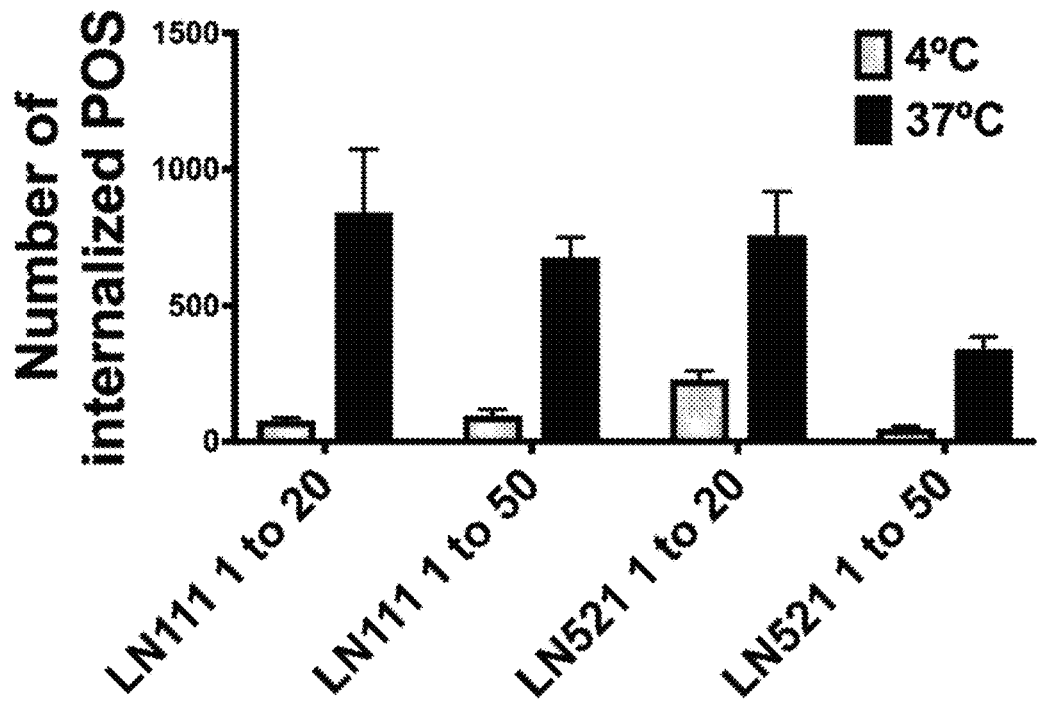
Fig 16C
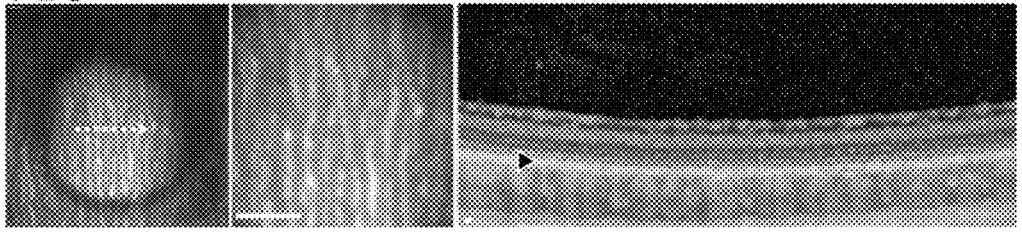
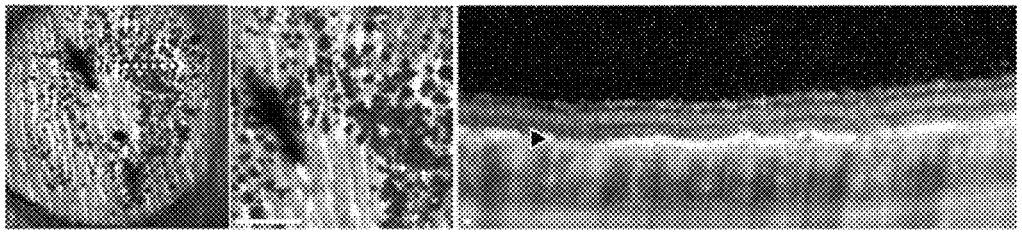
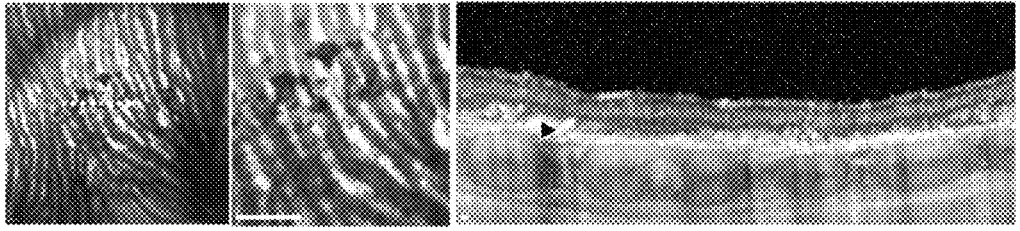
Fig 16D

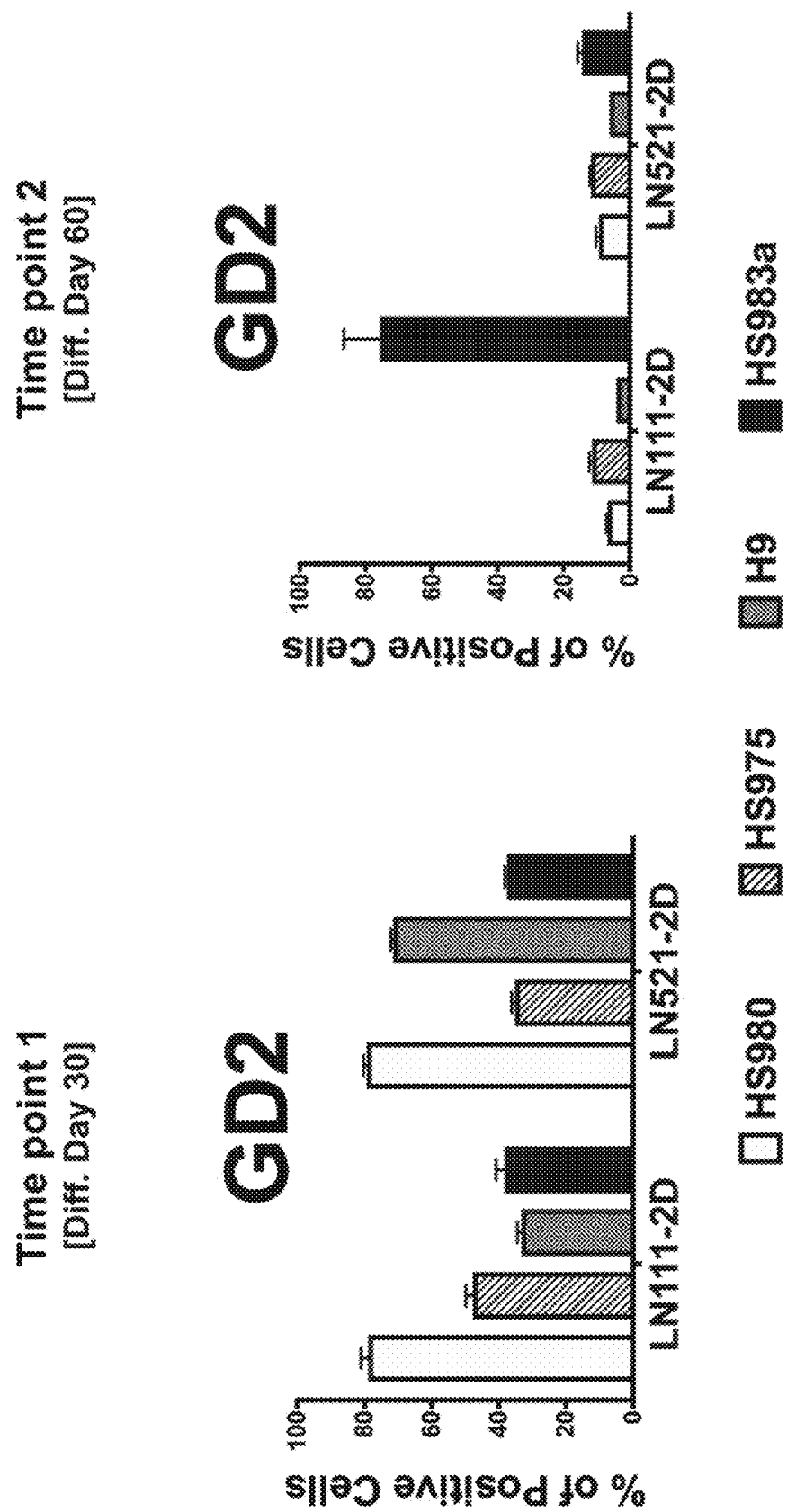

METHODS FOR PRODUCING RETINAL PIGMENT EPITHELIUM CELLS

CROSS-REFERENCE TO RELATED APPLICATIONS

This application is a 371 of PCT Application No. PCT/EP2019/066285, filed Jun. 19, 2019, which claims priority to U.S. Provisional Patent Application Ser. No. 62/687,416, filed Jun. 20, 2018.

TECHNICAL FIELD

The present disclosure relates to methods and compositions for producing retinal pigment epithelium (RPE) cells from stem cells. Laminin-coated substrates are used, along with specific cell culture mediums. Cell surface markers are also identified, which can be used for various applications in RPE in vitro production (such as quality control and enrichment). Additionally disclosed are the specific populations of RPE cells produced utilizing the methods and compositions described herein, as well as various treatments and other processes utilizing the same.

BACKGROUND TO THE INVENTION

Stem Cells

A stem cell is an undifferentiated cell from which specialized cells are subsequently derived. The process by which a stem cell changes into a more specialized cell is referred to as differentiation. Pluripotent stem cells can be differentiated into any of the three germ layers: endoderm, mesoderm, or ectoderm. Post fertilization, pluripotent stem cells form every cell type in the human body, including less plastic stem cell populations such as adult stem cells, fetal stem cells, and amniotic stem cells. Embryonic stem cells are a type of pluripotent stem cell, and possess extensive self-renewal capacity and pluripotency. Induced pluripotent stem cells are produced from mammalian terminally differentiated cells by a process termed somatic cell reprogramming.

Laminins

Laminins are a family of heterotrimeric glycoproteins that reside primarily in the basal lamina. They function via binding interactions with neighboring cell receptors on the one side, and by binding to other laminin molecules or other matrix proteins such as collagens, nidogens or proteoglycans. The laminin molecules are also important signaling molecules that can strongly influence cellular behavior and function. Laminins are important in both maintaining cell/tissue phenotype, as well as in promoting cell growth and differentiation in tissue repair and development.

Laminins are large, multi-domain proteins, with a common structural organization. The laminin molecule integrates various matrix and cell interactive functions into one molecule. A laminin protein molecule comprises one α-chain subunit, one β-chain subunit, and one γ-chain subunit, all joined together in a trimer through a coiled-coil domain. The twelve known laminin subunit chains can form at least 15 trimeric laminin types in native tissues. Within the trimeric laminin structures are identifiable domains that possess binding activity towards other laminin and basal lamina molecules, and membrane-bound receptors. For example, domains VI, IVb, and IVa form globular structures, and domains V, IIIb, and IIIa (which contain cysteine-rich EGF-like elements) form rod-like structures. Domains I and II of the three chains participate in the formation of a triple-stranded coiled-coil structure (the long arm).

There exist five different alpha chains, three beta chains, and three gamma chains that in human tissues have been found in at least fifteen different combinations. These molecules are termed laminin-1 to laminin-15 based on their historical discovery, but an alternative nomenclature describes the isoforms based on their chain composition, e.g. laminin-111 (laminin-1) that contains alpha-1, beta-1, and gamma-1 chains. Four structurally defined family groups of laminins have been identified. The first group of five identified laminin molecules all share the β1 and γ1 chains, and vary by their α-chain composition (α1 to α5 chain). The second group of five identified laminin molecules, including laminin-521, all share the β2 and γ1 chain, and again vary by their α-chain composition. The third group of identified laminin molecules has one identified member, laminin-332, with a chain composition of α3β3γ2. The fourth group of identified laminin molecules has one identified member, laminin-213, with the newly identified γ3 chain (α2β1γ3).

Retinal Pigment Epithelium-Cells

The pigmented layer of retina or Retinal Pigment Epithelium (RPE) is the pigmented cell layer just outside the neurosensory retina that nourishes retinal visual cells and is firmly attached to the underlying choroid and overlying retinal visual cells. The RPE is composed of a single layer of hexagonal cells (RPE-cells) that are densely packed with pigment granules. The RPE has several functions, such as scattered light absorption, epithelial transport, spatial ion buffering, visual cycle, phagocytosis, secretion and immune modulation. Age-related macular degeneration (AMD) is the major cause of severe vision loss in people over 60 years of age especially among individuals with Caucasian ethnicities, with 500.000 new cases each year in the Western countries. AMD is estimated to affect 170 million currently worldwide, a number predicted to increase to 196 million in the coming five years and up to 288 million in 2040, implying substantial social and financial consequences. AMD comes in two forms: neovascular or "wet" AMD, characterized by the abnormal growth of choroidal vessels through the Bruch's membrane causing subretinal edema and hemorrhage, and "dry" AMD, which in advanced stages is characterized by well demarcated areas of RPE loss and outer retinal degeneration, also known as geographic atrophy. The "dry" form accommodates 80-90% of the AMD patients and there is no treatment available for "dry" AMD patients.

In the dry advanced form of age-related macular degeneration (AMD) disease, RPE cells are one of the main cell types lost, which leads to subsequent degeneration of essential retinal structures (e.g. photoreceptors) causing severe vision impairment. As there is no treatment available to regenerate the affected tissue, RPE cell transplantation has a great potential as cell replacement therapy. However, until now sources for obtaining healthy RPE cells have been limited, as they would either come from fetal or adult donors, or be generated from stem cells in vitro using cumbersome methods.

Key to any pluripotent stem cell-based cellular replacement therapy is purity of the final product. From a safety perspective, it is critical to ensure that there are no remaining pluripotent stem cells which could give rise to teratoma formation. Several strategies can be taken to reduce this risk.

One strategy is to negatively select for the undifferentiated cells and positively select for the cell type of interest. Although intensive efforts are in place towards pluripotent stem cell-based treatments for AMD, there has been a lack of useful cell surface markers for the RPE lineage. A previous study took an image-based strategy to identify such markers and suggested that CD59 would be useful (Choudhary, P. & Whiting, P. J. Stem Cell Res. Ther. 7, 127 (2016)). However, in the present work, the inventors find that although RPE cells are positive for CD59, both undifferentiated and partially differentiated cells also express CD59 making it less suitable for this purpose.

Another strategy to reduce the risk of lingering pluripotent cells is to establish a differentiation protocol which is efficient enough to eliminate all undifferentiated cells. Generally, this is achieved with most differentiation strategies towards RPE cells as current protocols span over several weeks, thereby eliminating undifferentiated cells. However, it is also important to generate a pure RPE product which does not contain alternative differentiated cell types. Previous studies have evaluated purity by combined image analysis of pigmentation together with staining for several intracellular markers. However, global transcriptional analysis has revealed that contaminants of cells with alternative fate can nevertheless be found, such as lense-like cells expressing CRYSTALLIN genes in <10% of otherwise apparently homogenous cultures. Such contaminants may be difficult to identify by image analysis for pigmentation and intracellular staining of RPE markers, so the advent of transcriptional analysis sets a new standard for the quality of RPE-cells generated from pluripotent stem cells.

It would be desirable to provide solutions to the above needs, in particular by provision of improved methods for generating RPE cells in vitro from pluripotent stem cells, and provision of cell markers useful in such methods.

SUMMARY OF THE INVENTION

The present disclosure provides methods for culturing pluripotent stem cells to obtain retinal pigment epithelium (RPE) cells. The pluripotent stem cells are cultured adherent on a cell culture substrate comprising a laminin, which may be laminin-521, laminin-511, laminin-121, laminin-111, or a combination thereof. The stem cells are then exposed to suitable cell culture medium to obtain first population of cells comprising RPE cells and/or progenitors thereof. After a defined period of differentiation (15-50 days), the first population of cells is dissociated and replated on a second substrate comprising a laminin, which may be laminin-521, laminin-511, laminin-121, laminin-111, or a combination thereof. The first population of cells is then expanded and matured further by culturing on the second substrate in a differentiation medium to obtain a second population of cells comprising the RPE cells to be obtained.

Unexpectedly, this early dissociation/replating step in combination with adherent culture on the laminin substrate results in a population of cells which with a very high fraction of RPE cells without the need for complicated/laborious manual dissection or any other type of selective dissociation commonly used in the prior art. In addition to producing high purity RPE cells, the method is also comparatively fast and results in high yields of RPE cells, so it is better suited to producing cells for clinical applications than the earlier methods.

The present disclosure also provides the use of certain cell surface markers (CD140b, CD56, CD104, CD164, CD220, EGFR, GD2, CD184, CD10, CD30, CD49a, CD49b, CD50, CD171, TRA-1-60 and CD326) in in vitro generation of RPE cells.

The present invention relates to the following items. The subject matter disclosed in the items below should be regarded disclosed in the same manner as if the subject matter were disclosed in patent claims.

1. A method for obtaining Retinal Pigment Epithelium (RPE) cells, comprising:
    a. providing a culture of human pluripotent stem cells adherent on a first substrate comprising a first laminin;
    b. exposing the stem cells to a differentiation medium for a first time period of about 15 days to about 50 days to obtain a first population of adherent cells comprising RPE cells and/or progenitors thereof;
    c. at the end of the first time period, dissociating the first population from the first substrate;
    d. replating the dissociated first population of cells on a second substrate comprising a second laminin; and
    e. culturing the replated first population of cells on the second substrate for second time period to obtain an expanded and matured second population of cells comprising the RPE cells;
        wherein the first and second laminins are independently selected from LN-521, LN-511, LN-111 and LN-121, and are an intact protein or protein fragment.
2. The method according to any of the preceding items, wherein the first and second laminin are coated at an amount of about 5 µg/cm$^2$ to about 20 µg/cm$^2$.
3. The method according to any of the preceding items, wherein the first and/or second substrate is/are xeno-free.
4. The method according to any of the preceding items, wherein the first and/or second substrate contain only a single type of laminin.
5. The method according to any of the preceding items, wherein the first laminin is LN-111 or LN-521 and the second laminin is LN-521.
6. The method according to any of the preceding items, wherein the first laminin is LN-111 and the second laminin is LN-521.
7. The method according to item 5, wherein the first and second laminins are both LN-521.
8. The method according to any of the preceding items, wherein the culture of pluripotent stem cells is provided at a cell density of about $1.2 \times 10^4$ cells/cm$^2$ to about $4.8 \times 10^4$ cells/cm$^2$.
9. The method according to any of the preceding items, wherein the pluripotent stem cells are cultured in a culture medium comprising bFGF or TGFbeta prior to exposure to differentiation medium.
10. The method according to any of the preceding items, wherein the stem cells are cultured in a stem cell culture medium comprising bFGF or TGFbeta, and a Rho-kinase inhibitor is included in the stem cell culture medium for a time period of about 12 hours to about 48 hours prior to the initiation of the exposure to differentiation medium.
11. The method according to any of the preceding items, wherein the differentiation medium is a stem cell culture medium devoid of any composition maintaining the stem cells in a pluripotent state.
12. The method according to any of the preceding items, wherein the differentiation medium is devoid of bFGF and TGFbeta.
13. The method according to any of the preceding items, wherein Activin A is included in the differentiation medium.

14. The method according to any of the preceding items, wherein Activin A is included in the differentiation medium at a concentration of about 50 ng/ml to about 200 ng/ml.
15. The method according to any of the preceding items, wherein Activin A is included in the differentiation medium no earlier than a time point at about 4 days to about 8 days from the exposure, preferably for a time period starting from about 5 days to about 7 days from the exposure and ending at the time of the dissociation step, most preferably about 6 days from the exposure and ending at the time of the dissociation step.
16. The method according to any of the preceding items, wherein the time period is about 15 days to about 40 days, preferably about 15 days to about 33 days, more preferably about 18 days to about 30 days, most preferably about 18 days to about 22 days.
17. The method according to any of the preceding items, comprising quantitating the number or fraction of cells expressing a marker selected from CD140b, CD56, CD104, CD164, CD220, or EGFR, preferably CD140b or CD56, most preferably CD140b.
18. The method according to item 17, wherein the dissociation step (c) is initiated when at least 30%, preferably at least 40%, more preferably at least 50%, most preferably at least 60% of the cells are positive for the marker.
19. The method according to any of items 17-18, wherein the culturing step (e) is continued until at least 80%, preferably at least 85%, more preferably at least 90%, most preferably at least 95% of the cells are positive for the marker.
20. The method according to any of the preceding items, comprising quantitating the number or fraction of cells expressing a marker selected from GD2, CD184, CD10, CD30, CD49a, CD49b, CD50, CD171, TRA-1-60, or CD326, preferably GD2 or CD184.
21. The method according to item 20, wherein the dissociation step (c) is initiated when at least 30%, preferably at least 40%, more preferably at least 50%, most preferably at least 60% of the cells are negative for the marker.
22. The method according to any of items 20-21, wherein the culturing step (e) is continued until at least 80%, preferably at least 85%, more preferably at least 90%, most preferably at least 95% of the cells are negative for the marker.
23. The method according to any of the preceding items, wherein the dissociation of the first population of cells from the first substrate is performed indiscriminately.
24. The method according to any of the preceding items, wherein the dissociation of the first population of cells from the first substrate involves dissociating the substantially the entire population into a single suspension of cells.
25. The method according to any of the preceding items, wherein the dissociated first population of cells are replated without any selection.
26. The method according to any of items 1-25, wherein the dissociated first population of cells is enriched prior to replating by the steps of:
   F1. labelling a cell surface marker on the dissociated first population of cells;
   F2. separating the cells that are positive for said cell surface marker from cells that are negative for said cell surface marker to obtain an enriched first population of cells that is more enriched in RPE cells and/or progenitors thereof than the dissociated first population cells; and
   F3. using the enriched first population of cells in the replating step.
27. The method according to item 26, wherein the cell surface marker is selected from CD140b, CD56, CD104, CD164, CD220, CD165 and EGFR, preferably CD140b or CD56.
28. The method according to item 27, wherein cells positive for said cell surface marker are selected for the enriched first population of cells.
29. The method according to item 26, wherein the cell surface marker is selected from GD2, CD184, CD10, CD30, CD49a, CD49b, CD50, CD171, TRA-1-60, and CD326, preferably GD2 or CD184.
30. The method according to item 29, wherein cells negative for said cell surface marker are selected for the enriched first population.
31. The method according to any of the preceding items, wherein the dissociation from the first substrate involves forming a suspension of single cells of the first population of cells.
32. The method according to any of the preceding items, wherein the dissociated cells are replated on a second substrate at a cell density from about $1.4 \times 10^4$ cells/cm$^2$ to about $1.4 \times 10^6$ cells/cm$^2$.
33. The method according to any of the preceding items, wherein the RPE cells are obtained after a total of 6-12 weeks, preferably 8-10 weeks, more preferably about 9 weeks or 60-66 days.
34. An RPE-cell population obtained or obtainable by the method according to any of the preceding items.
35. The RPE cell population according to item 34, comprising at least 70%, more preferably at least 80%, yet more preferably at least 90%, still more preferably at least 95%, most preferably at least 97% RPE cells.
36. The RPE cell population according to any of items 34-35, comprising no more than 30%, more preferably no more than 20%, yet more preferably no more than 10%, still more preferably no more than 5%, most preferably no more than 3% of non-RPE eye field progenitor cells.
37. The RPE cell population according to any of items 34-36, comprising less than 10%, more preferably less than 5%, yet more preferably less than 3%, still more preferably less than 2%, even more preferably less than 1%, most preferably less than 0.5% of cells of mesodermal lineage.
38. The RPE cell population according to any of items 34-37, comprising at least 70% RPE-cells, less than 30% non-RPE eye field progenitor cells, and less than 10% cells of the mesodermal lineage,
   preferably the RPE cell population comprises at least 80% RPE-cells, less than 20% non-RPE eye field progenitor cells, and less than 5% cells of the mesodermal lineage, more preferably comprising at least 90% RPE-cells, less than 10% non-RPE eye field progenitor cells, and less than 5% cells of the mesodermal lineage,
   still more preferably comprising at least 95% RPE-cells, less than 5% non-RPE eye field progenitor cells, and less than 1% cells of the mesodermal lineage,
   most preferably comprising at least 95% RPE-cells, less than 3% non-RPE eye field progenitor cells, and less than 0.5% cells of the mesodermal lineage.

39. The RPE cell population according to any of items 34-38, for use in the treatment of age-related macular degeneration or Stargardt's macular dystrophy.
40. The RPE cell population according to any of items 34-38, for use according to item 39, wherein the treatment comprises injecting cells of the RPE cell population into an eye of the patient to be treated, wherein the injection preferably delivers about 50,000-400,000 of the RPE cells (more preferably about 100,000 to 200,000) to the eye.
41. A method of enriching RPE cells or progenitors of RPE cells in a mixture of cells, comprising:
    a. labeling a cell surface marker in a starting mixture of RPE cells or progenitors of RPE cells; and
    b. separating the cells that are positive for said cell surface marker from cells that are negative for said cell surface marker to obtain a final mixture of RPE cells or progenitors of RPE cells that is more enriched in RPE cells or progenitors of RPE cells compared to the starting mixture;
        wherein said cell surface marker is CD140b, CD56, CD104, CD164, CD220, CD165, EGFR, GD2, CD184, CD10, CD30, CD49a, CD49b, CD50, CD171, TRA-1-60, or CD326.
42. The method according to 41, comprising selecting cells positive for CD140b, CD56, CD104, CD164, CD220, CD165 and/or EGFR, preferably CD140b and/or CD56, for the final mixture.
43. The method according to any of items 41-42, comprising selecting cells negative for GD2, CD184, CD10, CD30, CD49a, CD49b, CD50, CD171, TRA-1-60 and/or CD326, preferably GD2 and/or CD184, for the final mixture.
44. The method according to any of items 41-43, comprising selecting cells that are positive for CD140b and negative for GD2 for the final mixture.
45. The method according to any of items 41-44, comprising selecting cells that are positive for CD140b and negative for CD184 for the final mixture.
46. The method according to any of items 41-45, wherein the labelling is performed using an antibody targeting the cell surface marker.
47. An RPE-cell population obtained or obtainable by the method according to any of items 41-46.
48. An RPE cell mixture according to item 47, for use in the treatment of age-related macular degeneration or Stargardt's macular dystrophy.
49. The RPE cell mixture according to item 47, for use according to item 48, wherein the treatment comprises injecting the cells into an eye of the patient to be treated, wherein the injection preferably delivers about 50,000-400,000 of the RPE cells (more preferably about 100,000 to 200,000) to the eye..
50. A method for analyzing an in vitro cell culture comprising mature RPE cells, progenitors of RPE cells and/or undifferentiated stem cells, comprising quantitating the number or fraction of cells expressing one or more cell surface markers selected from CD140b, CD56, CD104, CD164, CD220, EGFR, GD2, CD184, CD10, CD30, CD49a, CD49b, CD50, CD171, TRA-1-60 and CD326, preferably CD140b, CD56, GD2 and/or CD184.
51. The method according to item 50, wherein the expression of CD140b, CD56, CD104, CD164, CD220 and EGFR is indicative of the presence of mature RPE cells or progenitors of RPE cells.
52. The method according to item 50 or 51, wherein the expression of GD2, CD184, CD10, CD30, CD49a, CD49b, CD50, CD171, TRA-1-60 and/or CD326 is indicative of undifferentiated stem cells.
53. A method of obtaining Retinal Pigment Epithelium (RPE) cells, comprising:
    culturing one or more human pluripotent stem cells on a first substrate comprising a single first laminin, wherein the laminin is an intact protein or protein fragment;
    exposing the stem cells to a first cell culture medium for a first time period, wherein the first cell culture medium maintains pluripotency;
    removing the first cell culture medium and exposing the stem cells to a second cell culture medium for a second time period of 3 days to 12 days, wherein the second cell culture medium is a differentiation medium and does not contain growth factors;
    removing the second cell culture medium and exposing the stem cells to a third cell culture medium that contains a growth factor being Activin A, for a third time period of 18 days to 35 days to obtain induced RPE cells;
    replating the induced RPE cells on a second substrate comprising a single second laminin; and
    culturing the induced RPE cells on the second substrate for 14 days to 28 days to obtain the RPE cells, wherein the total time for differentiation ranges from 42 days to 70 days, and
    wherein the single first laminin and the single second laminin are independently laminin-521, laminin-511, laminin-121, or laminin-111.
54. The method of item 53, wherein the single first laminin and the single second laminin are coated at a concentration of about 5 $\mu g/cm^2$ to about 20 $\mu g/cm^2$.
55. The method of item 53 or 54, wherein the first laminin and the second laminin are recombinant laminins.
56. The method of any of items 53-55, wherein the first cell culture medium comprises a Rho-kinase inhibitor that is present in the first cell culture medium at a concentration of about 5 $\mu M$ to about 20 $\mu M$.
57. The method of any of items 53-56, wherein the first cell culture medium comprises at least one growth factor.
58. The method of item 57, wherein the at least one growth factor in the first cell culture medium comprises bFGF and TGFβ.
59. The method of any of items 53-58, wherein the second cell culture medium does not contain growth factors or a Rho-kinase inhibitor.
60. The method of any of items 53-59, wherein the Activin A is present at a concentration of about 50 ng/mL to about 200 ng/mL.
61. The method of any of items 53-60, wherein the substrate, the first cell culture medium, the second cell culture medium, and the third cell culture medium do not contain any differentiation inhibitors, feeder cells, or apoptosis inhibitors.
62. The method of any of items 53-61, wherein the stem cells are plated onto the first substrate at a cell density of about $1.2 \times 10^4$ cells/cm² to $4.8 \times 10^4$ cells/cm².

BRIEF DESCRIPTION OF THE FIGURES

The following is a brief description of the drawings, which are presented for the purposes of illustrating the exemplary embodiments disclosed herein and not for the purposes of limiting the same.

FIG. 9A is for MITF. The y-axis is logarithmic from 0.1 to 10,000 in increments of powers of 10. The x-axis is in weeks, and includes weeks 0, 1, 2, 3, 4, and 7.

FIG. 9B is for BEST1. The y-axis is logarithmic from 0.1 to 10,000 in increments of powers of 10. The x-axis is in weeks, and includes weeks 0, 1, 2, 3, 4, and 7.

FIG. 9C is for TYR. The y-axis is logarithmic from 10-5 to $10^{10}$ in increments of powers of 105. The x-axis is in weeks, and includes weeks 0, 1, 2, 3, 4, and 7.

FIG. 9D is for TBB3. The y-axis is logarithmic from 0.1 to 1000 in increments of powers of 10. The x-axis is in weeks, and includes weeks 0, 1, 2, 3, 4, and 7.

FIG. 9E is for NANOG. The y-axis is logarithmic from 0.1 to 10 in increments of powers of 10. The x-axis is in weeks, and includes weeks 0, 1, 2, 3, 4, and 7.

FIG. 9F is for POU5F1 (OCT3/4). The y-axis is logarithmic from 0.1 to 10 in increments of powers of 10. The x-axis is in weeks, and includes weeks 0, 1, 2, 3, 4, and 7.

FIG. 11A is for TRA-1-60, an hPSC-specific marker. FIG. 11B is for CD140b, an RPE-specific marker. FIG. 11C is for CD56, an eye field progenitor marker.

FIG. 13A indicates results for the TRA-1-60 marker (hPSC-specific), and FIG. 13B indicates results for the CD140b marker (RPE-specific).

FIG. 14A is for RPE65. The y-axis runs from 0 to 20,000 in increments of 5,000.

FIG. 14B is for BEST1. The y-axis runs from 0 to 10,000 in increments of 2,000.

FIG. 14C is for MITF. The y-axis runs from 0 to 800 in increments of 200.

FIG. 14D is for PMEL. The y-axis runs from 0 to 250 in increments of 50.

FIG. 14E is for NANOG. The y-axis runs from 0 to 1.0 in increments of 0.5.

FIG. 14F is for TBB3. The y-axis runs from 0 to 1.0 in increments of 0.2.

FIG. 15A shows the results for cells induced on LN-111, and FIG. 15B shows the results for cells induced on LN-521. For both graphs, the y-axis is the production yield, as measured by fold change in cell number. The y-axis runs from 0 to 100 in increments of, 20, then jumps to 2,000 and runs to 10,000 in increments of 2,000.

FIGS. 16A-16C are functional assays demonstrating monolayer integrity as measured by transepithelial resistance (TEER), pigment epithelium-derived factor (PEDF) secretion as measured by ELISA (B), and internalization of photoreceptor outer segments (phagocytosis). They were conducted for RPE cells induced on either LN-111 or LN-521 at two different re-plating densities of 1 to 20 and 1 to 50. The bars represent mean±SEM from three independent experiments.

FIG. 16A is the TEER assay. The y-axis is in units of $\Omega \cdot cm^2$, and runs from 0 to 400 in increments of 100.

FIG. 16B is the PEDF secretion assay. The y-axis is in units of nanograms (ng), and runs from 0 to 500,000 in increments of 100,000. Apical indicates the apical side of the hPSC-RPE cells grown in the trans-well culture, and Basal indicates the basal side of the hPSC-RPE cells grown in the trans-well culture.

FIG. 16C is the phagocytosis assay. Measurements were made at two different temperatures 4° C. and 37° C. The y-axis is the number of internalized photoreceptor outer segments, and runs from 0 to 1,500 in increments of 500.

FIG. 16D is a set of two multi-color and spectral domain-optical coherence tomography (SD-OCT) images showing sub-retinal injection of RPE cells cultured on either LN-111 or LN-521 (re-plated at a cell density of $7 \times 10^4$ cells/cm$^2$). A negative control (PBS) is also shown.

FIGS. 17A-20B show the gene expression analysis of RPE, pluripotent, and neural specific genes at day 30 (time point 1) and at day 60 (time point 2) of differentiation on stem cells cultured on either LN-111 or LN-521. Four different stem cell lines (HS980, HS975, H9, and HS983a) were used. The genes represented are BEST1 (17A-B), MITF (18A-B), PMEL (19A-B), and TBB3 (20A-B). Values are normalized to GAPDH and displayed as relative to undifferentiated hPSC. For all graphs, the y-axis is fold change in expression.

FIG. 17A is a bar graph for the BEST1 gene at time point 1. The y-axis runs from 0 to 4,000 in increments of 1,000. FIG. 17B is a bar graph for the BEST1 gene at time point 2. The y-axis runs from 0 to 8,000 in increments of 2,000.

FIG. 20B is a bar graph for the TBB3 gene at time point 2. The y-axis runs from 0 to 40 in increments of 10.

FIGS. 21A-25B show the percentage of positive cells expressing genes TRA-1-60, CD140b, CD56, GD2, and CD184 at day 30 (time point 1) and at day 60 (time point 2) of differentiation on either laminin-111 or laminin-521. Four different stem cell lines were used (HS980, HS975, H9 and HS983a). Differentiation with the HS983a hESC line was not possible and is shown here as an example of what the expression for the mentioned cell surface markers looks like in the event of a failed or poor differentiation. In all graphs, the y-axis is % positive cells, and runs from 0 to 100 in increments of 20.

FIG. 21A is a bar graph for the TRA-1-60 gene at time point 1. FIG. 21B is a bar graph for the TRA-1-60 gene at time point 2.

FIG. 24A is a bar graph for the GD2 gene at time point 1. FIG. 24B is a bar graph for the GD2 gene at time point 2.

FIG. 25B is a bar graph for the CD184 gene at time point 2.

(FIG. 31).

Figure 1:
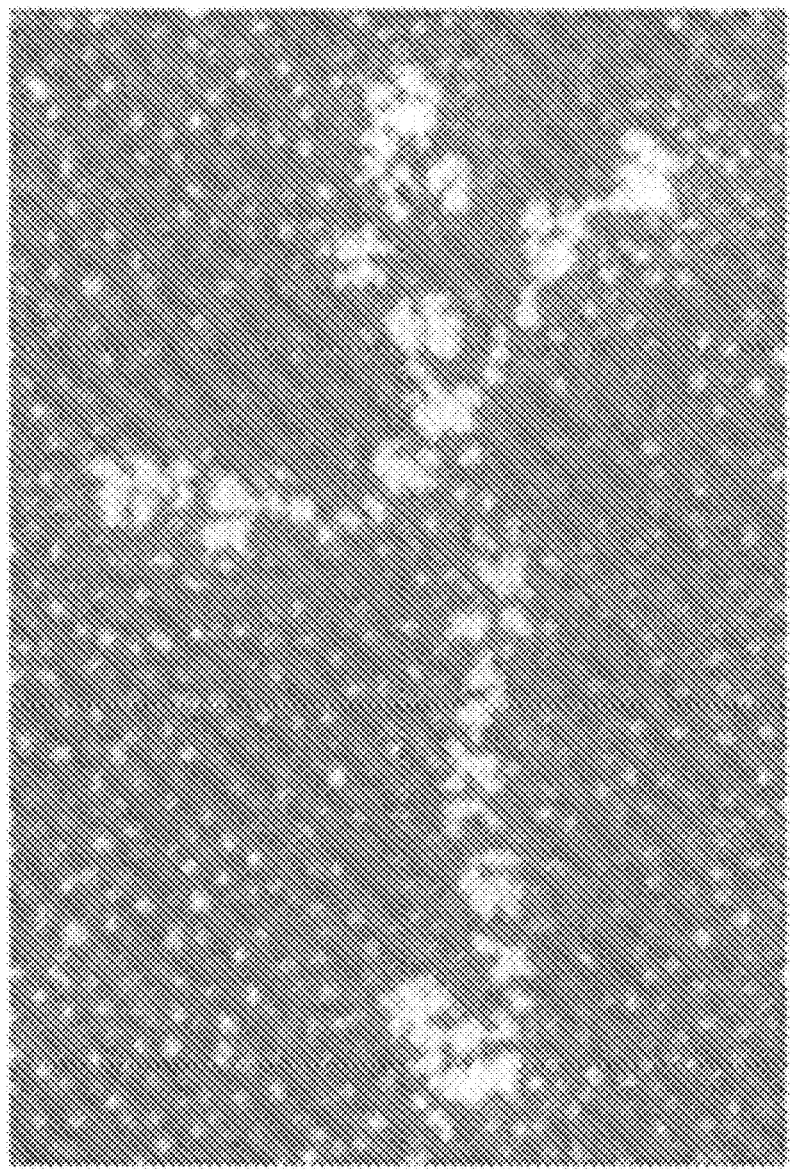
FIG. 1 is a rotary shadowing electron microscopy picture of a recombinant laminin molecule.
Figure 2:
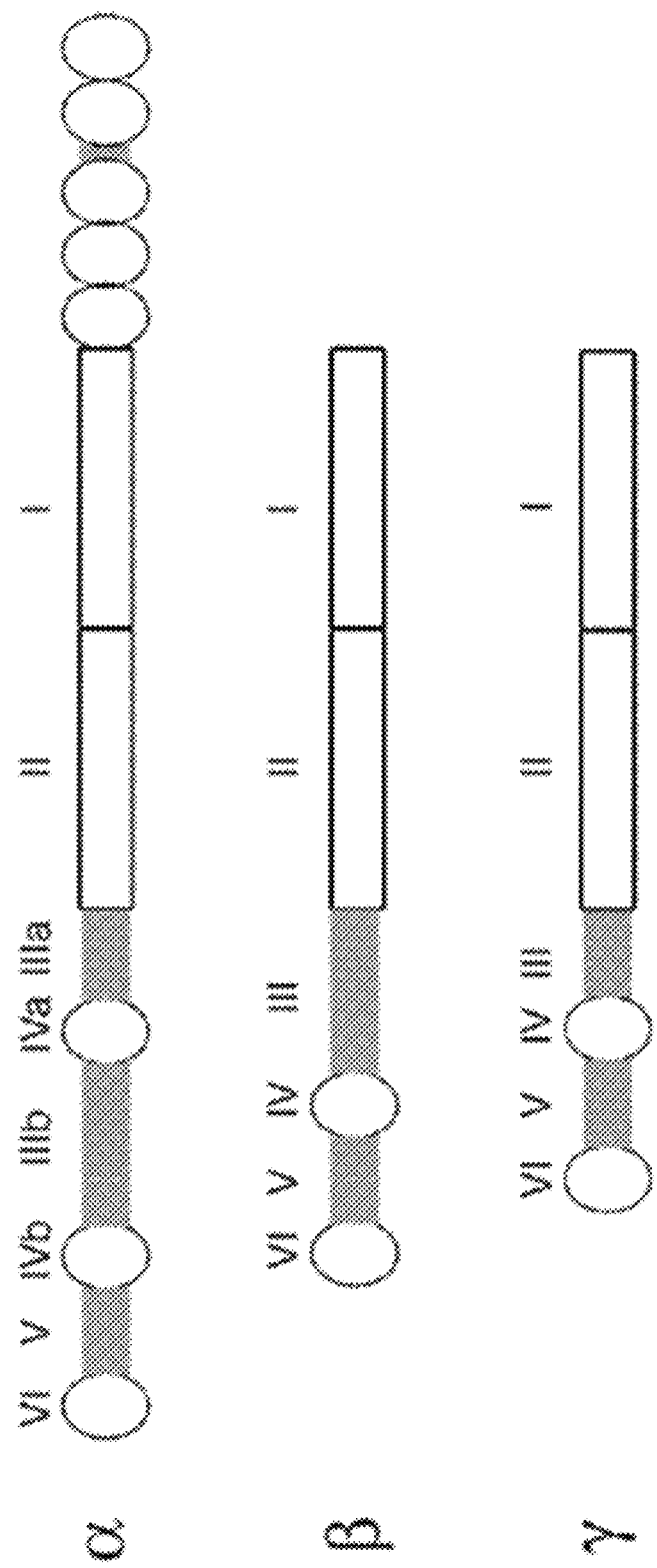
FIG. 2 shows the structural motifs of laminin α, β, and γ chains. The N-terminal, internal, and C-terminal globular domains are depicted as white ovals. The coiled-coil forming domains (I and II) are shown as white rectangles. The rod-like structures (domains V, IIIb, and IIIa) are depicted as grey rectangles.

Although specific terms are used in the following description for the sake of clarity, these terms are intended to refer only to the particular structure of the embodiments selected for illustration in the drawings, and are not intended to define or limit the scope of the disclosure.

DETAILED DESCRIPTION

Definitions

All publications, patents, and patent applications discussed herein are hereby incorporated by reference in their entirety.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values).

The term "about" can be used to include any numerical value that can vary without changing the basic function of that value. When used with a range, "about" also discloses the range defined by the absolute values of the two endpoints, e.g. "about 2 to about 4" also discloses the range "from 2 to 4." The term "about" may refer to plus or minus 10% of the indicated number.

As used herein, the term "laminin-521" ("LN-521") refers to the protein formed by joining α5, β2 and γ1 chains together. The term should be construed as encompassing both recombinant LN-521 and heterotrimeric LN-521 from naturally occurring sources.

As used herein, the term "laminin-511" ("LN-511") refers to the protein formed by joining α5, β1 and γ1 chains together. The term should be construed as encompassing both recombinant LN-511 and heterotrimeric LN-511 from naturally occurring sources.

As used herein, the term "laminin-121" ("LN-121") refers to the protein formed by joining α1, β2 and γ1 chains together. The term should be construed as encompassing both recombinant LN-121 and heterotrimeric LN-121 from naturally occurring sources.

As used herein, the term "laminin-111" ("LN-111") refers to the protein formed by joining α1, β1 and γ1 chains together. The term should be construed as encompassing both recombinant LN-111 and heterotrimeric LN-111 from naturally occurring sources.

The term "intact" refers to the protein being composed of all of the domains of the α-chain, β-chain, and γ-chain, with the three chains being joined together to form the heterotrimeric structure. The protein is not broken down into separate chains, fragments, or functional domains. The term "chain" refers to the entirety of the alpha, beta, or gamma chain of the laminin protein. The term "fragment" refers to any protein fragment which contains one, two, or three functional domains that possesses binding activity to another molecule or receptor. However, a chain should not be considered a fragment because each chain possesses more than three such domains. Similarly, an intact laminin protein should not be considered a fragment. Examples of functional domains include Domains I, II, III, IV, V, VI, and the G domain.

The term "hrLN" means "human recombinant laminin".

The term RPE cells refers to cells having characteristics of mature RPE cells. Being "mature" in the present context includes that the RPE cells are capable of formation of tight monolayers exhibiting pigmentation, phagocytic activity, expression of RPE-specific markers BEST-1, CRALBP, RPE65 and polarized secretion of VEGF and PEDF.

The terms progenitors of RPE cells or induced RPE cells refer to immature cells that are no longer pluripotent, having acquired a capacity and tendency to differentiate into an RPE cell (i.e. have been induced towards RPE fate). They may share certain specific characteristics such as cell surface markers with mature RPE cells and other specific characteristics with pluripotent stem cells. The term "immature" is used in this context as a contrast to "mature", indicating that the cells have begun differentiation towards mature RPE cells but have not yet acquired all the characteristics of mature RPE cells as defined above.

The abbreviation hPSC stands for "human pluripotent stem cells". The abbreviations hESC and hES stand for "human embryonic stem cells", a subset of hPSC. On the area of overlap, the terms can be used interchangeably.

The abbreviations hPSC-RPE and hESC-RPE stand for hPSC-derived RPE-cells and hESC-derived RPE-cells, respectively. As will be apparent from in the present context, these terms generally refer to RPE-cells generated in vitro from the stem cells.

The term treatment in the present context refers to treatments resulting in a beneficial effect on a subject or patient afflicted with the condition to be treated, including any degree of alleviation, including minor alleviation, substantial alleviation, major alleviation as well as cure. Preferably, the degree of alleviation is at least a minor alleviation.

OVERVIEW OF THE DISCLOSURE

The present invention is in part based on the results of a comprehensive cell surface antibody screen identifying positive and negative markers for RPE cells (Example 1). These markers can be used to enrich for RPE cells during and after differentiation as well as quantitative measures to track in vitro differentiation. The inventors have identified CD140b (PDGFRβ) as being expressed by RPE cells as they emerge during in vitro differentiations in several independent hES cell lines and can prospectively identify RPE cells from alternative cell types. CD140b/PDGFRβ has important roles in the regulation of many biological processes including embryonic development, angiogenesis, cell proliferation and differentiation, thus appearing highly expressed in several tissues and cell types such as vascular cells, decidual cells or fibroblasts. Although CD140b is not uniquely expressed on RPE cells, the inventors show that it is specific to RPE cells in the setting of in vitro differentiation of pluripotent stem cells as the undifferentiated cells are negative for CD140b. CD140b as a marker was further validated by the discovery that it is expressed in endogenous RPE cells of the retina and interestingly it was found to be expressed in a polarized and apical manner.

Figure 35:
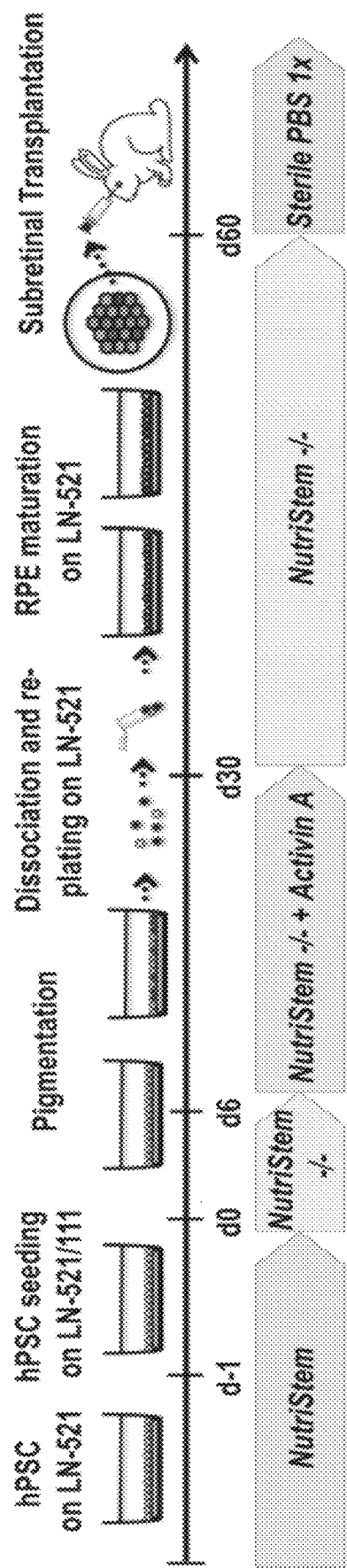
FIG. 35 illustrates schematically the experimental flow of Example 2. In the figure, "d" refers to day, e.g. "d30" refers to "day 30".

Taking advantage of these markers, the inventors have established a robust and direct differentiation methodology which will facilitate large scale manufacturing of hPSC-RPE cells (Example 2, schematically illustrated in FIG. 35). The inventor's combined analysis using flow cytometry (in particular of CD140b together with TRA-1-60) suggested that there were no lingering pluripotent cells in the RPE cell population obtained using the inventive RPE generation method (Example 2, FIGS. 21A-21B, 22A-22B). Unbiased single cell RNA sequencing analysis is very powerful at identifying known and unknown impurities. In agreement with the flow cytometry, a single cell global transcriptional analysis of more than 2000 RPE cells generated from hESCs with a method of the invention did not identify any cell with transcriptional properties of undifferentiated hESCs (Example 3). Indeed, the great majority expressed robust transcriptional profiles of RPE cells whereas approximately 10% of the cells resembled more immature eye-field progenitors with expression of SIX3/6, PAX6, LHX2 and OTX2. The transcriptional data showed elevated transcriptional levels of NCAM1 in this progenitor population, which was corroborated by positive staining in cells with low to absent pigmentation, indicating that NCAM1/CD56 may be a good marker to combine with CD140b to evaluate presence of eye-field progenitors or immature RPE.

Interestingly, about 1% of the cells expressed genes associated with mesoderm lineage such as MYOD1. While cells of mesoderm lineage are not expected to be advantageous for RPE applications, it is not likely that such low fraction of mesoderm lineage would have functional consequences in practice. Rather, the results illustrate the power of single cell RNA sequencing to identify even minor impurities in an unbiased manner.

Combined positive selection for CD140b together with negative selection for either CD184 or GD2 efficiently eliminated the mesoderm contamination and reduced the fraction of immature progenitors, showing that a sorting/enrichment step can be implemented to achieve an even more homogenous cell product (Example 3).

Development of a clinically compliant manufacturing protocol allowing large-scale production and banking of hPSC-derived RPE cells relies on several aspects such as xeno-free and chemically defined components, reproducibility, streamlined process and high production yields. The present invention shows that biologically relevant laminins efficiently support direct monolayer differentiation from hESCs to RPE with a clinically compliant culture media, optionally with the addition of Activin A. The effect of Activin A in RPE differentiation in the new RPE generation method was in line with previous reports.

The method of the invention, using a basal culture media together with culturing on relevant laminin is very robust (Examples 2, 3) and translatable to multiple lines (Example 4). The dissociation step allows elimination of EB differentiation involving manual dissection of pigmented areas, making the protocol much more streamlined and amenable to automatization in closed systems as it only requires media changes and one bulk passage.

One striking benefit of changing to monolayer differentiation on the laminins was the increased yield, with up to 8000-fold expansion from starting hPSC material. Considering that current cell replacement approaches for treating AMD use a dose of 100,000-200,000 cells per eye, the inventive protocol could in 60 days generate cells to treat 40,000-80,000 patients, from a starting culture of only 1 million undifferentiated hPSC.

In conclusion, the present disclosure identifies several cell surface markers (especially CD140b, CD56, CD184 and/or GD2) which together can be used as quantitative quality control assays to evaluate maturation and purity of hPSC-RPE differentiation, as well as for positive and negative enrichment to generate an RPE cell population with improved purity. With the aid of these markers to quantify the differentiation process, the inventors have established a differentiation process which can use xeno-free and defined components, does not require a selective dissociation step, and therefore is amenable to being GMP-compliant industrial manufacturing allowing large-scale production and banking of hPSC-derived RPE cells.

Methods for Obtaining Retinal Pigment Epithelium (RPE) Cells

In a first aspect, the present invention provides a method for obtaining Retinal Pigment Epithelium (RPE) cells, comprising:
  a. providing a culture of pluripotent stem cells adherent on a first substrate comprising a first laminin;
  b. exposing the stem cells to a differentiation medium for a first time period of about 15 to about 50 days to obtain a first population of adherent cells comprising RPE cells and/or progenitors thereof;
  c. at the end of the first time period, dissociating the first population from the first substrate;
  d. replating the dissociated first population of cells on a second substrate comprising a second laminin; and
  e. culturing the replated first population of cells on the second substrate for second time period to obtain an expanded and matured second population of cells comprising the RPE cells.

The RPE cells may be obtained after a total of 6-12 weeks, preferably 8-10 weeks, more preferably about 9 weeks or most preferably 60-66 days, counted from the start of the first time period.

Substrates

Preferably, the first and second laminins for the first aspect are independently selected from LN-521, LN-511, LN-111 and LN-121, and are an intact protein or protein fragment (e.g. an active fragment).

Since laminins are very large multidomain proteins, certain fragments have essentially the same activity as an intact protein, provided that the relevant domains are retained intact. Thus, the use of active laminin fragments is also contemplated in addition to intact proteins.

The first and second laminin may be coated at an amount of about 5 μg/cm$^2$ to about 20 μg/cm$^2$. Preferably, the first and/or second substrate(s) is/are xeno-free.

The first and/or second substrate may preferably contain only a single type of laminin.

In a preferred combination, the first laminin is LN-111 or LN-521 and the second laminin is LN-521. The first and second laminins may both be LN-521. Most preferably, the first laminin is LN-111 and the second laminin is LN-521.

Preferably, the both the first and the second laminins are intact proteins.

Culture of Pluripotent Stem Cells

In the method of the first aspect, the culture of pluripotent stem cells may be provided at a cell density of about $1.2 \times 10^4$ cells/cm$^2$ to about $4.8 \times 10^4$ cells/cm$^2$.

Prior to exposure to the differentiation medium, the pluripotent stem cells may be cultured in a stem cell culture medium comprising bFGF and/or TGFbeta. Prior to exposure the differentiation medium, the stem cells may be cultured in a stem cell culture medium comprising bFGF or TGFbeta, and a Rho-kinase inhibitor may be included in the stem cell culture medium for a time period of 12-48 h prior to the initiation of the exposure to the differentiation medium.

The pluripotent stem cells may be propagated in undifferentiated state e.g. on a LN-521 or LN-511 substrate in a stem cell culture medium comprising bFGF and/or TGFbeta. Preferably, 12-48 h prior to exposure to the differentiation medium, the pluripotent stem cells are seeded at a cell density of about $1.2 \times 10^4$ cells/cm$^2$ to about $4.8 \times 10^4$ cells/cm$^2$ on the first substrate in a stem cell culture medium comprising bFGF and/or TGFbeta further comprising a Rho kinase inhibitor.

Several Rho-kinase inhibitors are known in the art, for instance Y-27632 (CAS number 129830-38-2), thiazovivin, fasudil, GSK429286A, RKI-1447 etc. Using an effective amount of a Rho-kinase inhibitor in a stem cell culture medium increases survival of stem cells by blocking apoptotic signaling, and thereby ultimately increases RPE cell yield. The blockade of apoptotic signaling with a Rho-kinase inhibitor is in particular useful at a time period following seeding of pluripotent stem cells on the first substrate (preferably at the above density), prior to the exposure to the differentiation medium.

The pluripotent stem cells are preferably pluripotent human stem cells. The pluripotent stem cells can include induced pluripotent stem cells, embryonic stem cells, adult stem cells, fetal stem cells, amniotic stem cells, and generally any pluripotent stem cell.

Differentiation Medium

The differentiation medium used in a method according to the first aspect may be a stem cell culture medium devoid of any composition for maintaining the stem cells in a pluripotent state (i.e. a differentiation inhibitor). The differentiation medium is preferably effectively devoid of bFGF and TGF-beta, as these growth factors would act to prevent differentiation and promote proliferation of the stem cells at a pluripotent state.

RPE cells are spontaneously induced from pluripotent stem cells, when growth factors acting to prevent differentiation and promote proliferation of the stem cells at a pluripotent state are withdrawn. In other words, it is not essential to add any specific factors to the differentiation medium to induce or promote RPE cell fate. However, Activin A can be used to significantly increase the RPE cell yield by promoting induction of an RPE cell fate.

Preferably, Activin A is included in the differentiation medium, at an amount effective for increasing RPE cell yield. More preferably, Activin A is included in the differentiation medium at a concentration of about 50 ng/ml to about 200 ng/ml. Timewise, Activin A is preferably included in the differentiation medium no earlier than a time point at 4-8 days from the exposure, preferably for a time period starting from 5-7 days from the exposure and ending at the time of the dissociation step, most preferably 6 days from the exposure and ending at the time of the dissociation step.

Basal composition of the differentiation medium can be any of the known cell culture media suitable for culture and maintenance of pluripotent stem cells, provided that any growth factors acting to prevent differentiation and promoting proliferation of the stem cells at a pluripotent state are omitted. Preferably, the differentiation medium is xeno-free and chemically defined. One example of a differentiation medium is Nutristem™ XF medium (Biological Industries) devoid of bFGF and TGFbeta.

Timing of Dissociation and Culturing Steps

In a method of the first aspect, the timing of the dissociation step (from the initiation of the exposure to differentiation medium) is important. Thus, the first time period is about 15 to about 50 days, preferably about 15 to about 40 days, more preferably about 15 to about 33 days, yet more preferably about 18 to about 30 days, most preferably about 18 to about 22 days. Also preferably, there are no additional dissociation steps between the initiation of the differentiation by exposure to the differentiation medium (step (b)) and the aforementioned dissociation (step (c)). However, additional dissociation steps may optionally take place later on, when the cell population has expanded and is to be passaged or harvested.

Timing of the dissociation/replating step discussed above is an important feature of the present invention. The optimal timing allows the dissociation to be carried out without a cumbersome manual dissection or selective dissociation, thus rendering the method more robust and more suitable for industrial application (i.e. for clinical purposes). The optimal timing also allows for the combination of high yields and high purity in a short culture period. In addition to costs, long culture periods are generally undesirable, as the risk of acquiring unwanted mutations increases with time in culture.

The method the first aspect may comprise quantitating the number or fraction of cells expressing a marker selected from CD140b, CD56, CD104, CD164, CD220, or EGFR, preferably CD140b or CD56, most preferably CD140b. Preferably, the dissociation step (c) is initiated when at least 30%, preferably at least 40%, more preferably at least 50%, most preferably at least 60% of the cells are positive for the marker of the preceding list. The culturing step (e) may be continued until at least 80%, preferably at least 85%, more preferably at least 90%, most preferably at least 95% of the cells are positive for the marker.

The method of the first aspect may comprise quantitating the number or fraction of cells expressing a marker selected from GD2, CD184, CD10, CD30, CD49a, CD49b, CD50, CD171, TRA-1-60, TRA-1-60, or CD326, preferably GD2 or CD184. The dissociation step (c) is preferably initiated when at least 30%, preferably at least 40%, more preferably at least 50%, most preferably at least 60% of the cells are negative for the marker of the aforementioned list. The culturing step (e) may be continued until at least 80%, preferably at least 85%, more preferably at least 90%, most preferably at least 95% of the cells are negative for the marker.

Using the markers as described above is helpful in determining the optimum timing for dissociation/replating. In addition to providing a quality control checkpoint, the markers allow the timing of the dissociation/replating to be adapted and optimized to the unavoidable variations inherent to different batches of cell culture.

Dissociation

Preferably, the dissociation of the first population of cells from the first substrate is performed indiscriminately. In other words, there is preferably no particular, especially no intentional bias towards dissociating one cell type more or less than another. The present invention is particularly advantageous in that the laborious manual dissection step used in several prior art methods to select for pigmented optical vesicle cells can be dispensed with. The provided method has the advantage that it does not necessarily require any type of selection of cells during the entire procedure (although in some embodiments selection steps may be optionally included).

The dissociation of the first population of cells from the first substrate may involve dissociating substantially the entire culture into a single suspension of cells. Preferably, the dissociated first population of cells are replated without any selection.

For instance, the entire adherent culture may be dislodged mechanically, chemically or through a combination of mechanical and chemical dissociation. In principle any of the many methods for dissociation known in the art may be used. For instance, the cells may be subjected to trypsin, dispase, EDTA, trypsin-EDTA, other collagenolytic and proteolytic enzymes or the like for a period of a few minutes, to dissociate the cells from the substrate. Dissociation can be aided mechanically by gentle pipetting or gentle shaking of the cell culture vessel. The dissociation agent may then be suitably inactivated or removed, depending on the type of the agent.

While a selective dissociation, e.g. manually dissecting pigmented cells, would not as such prevent the generation of RPE cells, it would more or less negate many of the advantages of the present method in that it would increase labor and reduce cell yields.

The dissociation from the first substrate may involve forming a suspension of single cells of the first population of cells. The dissociated cells are preferably replated on a second substrate at a cell density from about $1.4 \times 10^4$ cells/$cm^2$ to about $1.4 \times 10^6$ cells/$cm^2$.

Optional Enrichment

While high purity is possible to obtain even without enrichment, in some instances it may be preferable to use certain cell surface markers to enrich the first population of cells in conjunction with the dissociation. This may be used to provide additional robustness for the method and/or be used as a routine step to replace a quality control check.

In a method according to the first aspect, the dissociated first population of cells may be enriched (prior to replating) by the steps of:

F1. labelling a cell surface marker in a starting mixture of cells; and

F2. separating the cells that are positive for said cell surface marker from cells that are negative for said cell surface marker to obtain a final mixture that is more enriched in RPE cells and/or progenitors thereof than the starting mixture.

The starting mixture of cells may be the cells dissociated in step (c), and the final mixture is then replated in step (d).

Said cell surface marker can be selected from CD140b, CD56, CD104, CD164, CD220, CD165 and EGFR, preferably CD140b or CD56. If the marker is selected from the aforementioned group, cells positive for said cell surface marker are selected for the enriched population of cells that make the final mixture to be replated.

The cell surface marker can also be selected from GD2, CD184, CD10, CD30, CD49a, CD49b, CD50, CD171, TRA-1-60, and CD326, preferably GD2 or CD184. If the marker is selected from the aforementioned group, cells negative for said cell surface marker are selected for the enriched population of cells that make the final mixture to be replated. This may be achieved by removing cells positive for said cell surface marker from the final mixture.

Expansion and Maturation

After the replating step, the first population of cells (which was optionally enriched as discussed above) is cultured further on the second substrate for a second time period. As the culture medium, a differentiation medium as discussed above may be used. Activin A is generally no longer useful, as the RPE fate has by this point already been induced.

During this continued culture, the population of replated cells expands and matures further forming a second population of cells comprising the desired RPE cells. The purity of the second population may be assessed e.g. using cell surface markers known in the art and disclosed herein or using single cell RNA sequencing.

The second population preferably comprises at least 70%, more preferably at least 80%, yet more preferably at least 90%, still more preferably at least 95%, most preferably at least 97% RPE cells.

The second population preferably comprises no more than 30%, more preferably no more than 20%, yet more preferably no more than 10%, still more preferably no more than 5%, most preferably no more than 3% of non-RPE eye field progenitor cells.

The second population preferably comprises less than 10%, more preferably less than 5%, yet more preferably less than 3%, still more preferably less than 2%, even more preferably less than 1%, most preferably less than 0.5% of cell of mesodermal lineage.

It is particularly preferred that the second population comprises at least 70% RPE-cells, less than 30% non-RPE eye field progenitor cells, and less than 10% cells of the mesodermal lineage. More preferably, the second population comprises at least 80% RPE-cells, less than 20% non-RPE eye field progenitor cells, and less than 5% cells of the mesodermal lineage. Even more preferably, the second population comprises at least 90% RPE-cells, less than 10% non-RPE eye field progenitor cells, and less than 5% cells of the mesodermal lineage. Still more preferably, the second population comprises at least 95% RPE-cells, less than 5% non-RPE eye field progenitor cells, and less than 1% cells of the mesodermal lineage. Most preferably, the second population comprises at least 95% RPE-cells, less than 3% non-RPE eye field progenitor cells, and less than 0.5% cells of the mesodermal lineage.

The RPE cells obtained can be harvested e.g. by dissociating the cells, as described above.

The duration of the second time period (i.e. culturing after the dissociation to obtain the RPE cells) may be at least 15 days, more preferably at least 20 days, yet more preferably at least 25 days, most preferably at least 30 days. The second time period may be 15-60 days, preferably 20-50 days, more preferably 25-40 days, most preferably 30-35 days. At shorter durations, the second population will contain a larger fraction of immature cells, which may be desired for some applications, and conversely longer durations will provide a population with higher fraction of mature cells, which may be desired in other applications.

It is particularly preferred that the resulting second population is as specified for the second aspect below.

In Vitro Generated RPE Cell Population and Uses Thereof

In a second aspect of the present invention, there is provided an RPE-cell population obtained or obtainable by the method according to the first aspect. In a further aspect of the present invention, there is provided an RPE-cells obtained or obtainable by the method according to the first aspect.

The RPE cell population preferably comprises at least 70%, more preferably at least 80%, yet more preferably at least 90%, still more preferably at least 95%, most preferably at least 97% RPE cells.

The RPE cell population preferably comprises no more than 30%, more preferably no more than 20%, yet more preferably no more than 10%, still more preferably no more than 5%, most preferably no more than 3% of non-RPE eye field progenitor cells.

The RPE cell population preferably comprises less than 10%, more preferably less than 5%, yet more preferably less than 3%, still more preferably less than 2%, even more preferably less than 1%, most preferably less than 0.5% of cells of mesodermal lineage.

It is particularly preferred that the RPE cell population comprises at least 70% RPE-cells, less than 30% non-RPE eye field progenitor cells, and less than 10% cells of the mesodermal lineage. More preferably, the RPE cell population comprises at least 80% RPE-cells, less than 20% non-RPE eye field progenitor cells, and less than 5% cells of the mesodermal lineage. Even more preferably, the RPE cell population comprises at least 90% RPE-cells, less than 10% non-RPE eye field progenitor cells, and less than 5% cells of the mesodermal lineage. Still more preferably, the RPE cell population comprises at least 95% RPE-cells, less than 5% non-RPE eye field progenitor cells, and less than 1% cells of the mesodermal lineage. Most preferably, the RPE cell population comprises at least 95% RPE-cells, less than 3% non-RPE eye field progenitor cells, and less than 0.5% cells of the mesodermal lineage.

The RPE cell population of the second aspect is preferably for use in the treatment of age-related macular degeneration. The treatment may comprise injecting the cells from said RPE cell population into an eye of the patient to be treated for age-related macular degeneration.

The RPE cell population of the second aspect may be for use in the treatment of Stargardt's macular dystrophy (SMD). The treatment may comprise injecting the cells of said RPE cell population into an eye of the patient to be treated for Stargardt's macular dystrophy (SMD).

The second aspect also encompasses a method of treatment of age-related macular degeneration or Stargardt's macular dystrophy, comprising injecting cells from an RPE cell population obtained or obtainable by the method according to the first aspect into an eye of the patient to be treated.

The injection preferably delivers about 50,000-400,000 of the RPE cells (more preferably about 100,000 to 200,000) to the eye.

Methods of Enriching RPE Cells or Progenitors of RPE Cells in a Mixture of Cells In a third aspect of the present invention, there is provided a method of enriching RPE cells or progenitors of RPE cells in a mixture of cells, comprising:

a. labeling a cell surface marker in a starting mixture of RPE cells or progenitors of RPE cells; and b. separating the cells that are positive for said cell surface marker from cells that are negative for said cell surface marker to obtain a final mixture of RPE cells or progenitors of RPE cells that is more enriched in RPE cells or progenitors of RPE cells compared to the starting mixture;

wherein said cell surface marker is CD140b, CD56, CD104, CD164, CD220, CD165, EGFR, GD2, CD184, CD10, CD30, CD49a, CD49b, CD50, CD171, TRA-1-60, or CD326.

The method of the third aspect may comprise selecting cells positive for CD140b, CD56, CD104, CD164, CD220, CD165 and/or EGFR, preferably CD140b and/or CD56, most preferably CD140b, for the enriched final mixture of cells. As evidenced by the appended Examples, these markers are able to distinguish pluripotent stem cells from progenitors of RPE cells or RPE cells. Preferably, 2, 3, 4, 5, 6, or 7 of these markers are used for the positive cell selection.

Additionally, or alternatively, the method of the third aspect may comprise selecting cells negative for GD2, CD184, CD10, CD30, CD49a, CD49b, CD50, CD171, TRA-1-60 and/or CD326, preferably GD2 and/or CD184, for the enriched final mixture of cells. As evidenced by the appended Examples, these markers are able to distinguish pluripotent stem cells from progenitors of RPE cells or RPE cells. Preferably, 2, 3, 4, 5, 6, 7 or 8 of these markers are used for the negative cell selection.

Preferably, two or more markers selected from CD140b, CD56, CD104, CD164, CD220, CD165 and/or EGFR, preferably CD140b and CD56 are used for positive selection, in combination with using two or more markers selected from GD2, CD184, CD10, CD30, CD49a, CD49b, CD50, CD171, TRA-1-60 and/or CD326, preferably GD2 and CD184 for negative selection.

Preferably, the method of the third aspect comprises selecting cells that are positive for CD140b and negative for GD2 for the enriched final mixture of cells.

Preferably, the method of the third aspect comprises selecting cells that are positive for CD140b and negative for CD184 for the enriched final mixture of cells.

The enriched final mixture of cells preferably comprises at least 70%, more preferably at least 80%, yet more preferably at least 90%, still more preferably at least 95%, most preferably at least 97% RPE cells.

The enriched final mixture of cells preferably comprises no more than 30%, more preferably no more than 20%, yet more preferably no more than 10%, still more preferably no more than 5%, most preferably no more than 3% of non-RPE eye field progenitor cells.

The enriched final mixture of cells preferably comprises less than 10%, more preferably less than 5%, yet more preferably less than 3%, still more preferably less than 2%, even more preferably less than 1%, most preferably less than 0.5% of cell of mesodermal lineage.

It is particularly preferred that the enriched final mixture of cells comprises at least 70% RPE-cells, less than 30% non-RPE eye field progenitor cells, and less than 10% cells of the mesodermal lineage. More preferably, the enriched final mixture of cells comprises at least 80% RPE-cells, less than 20% non-RPE eye field progenitor cells, and less than 5% cells of the mesodermal lineage. Even more preferably, the enriched final mixture of cells comprises at least 90% RPE-cells, less than 10% non-RPE eye field progenitor cells, and less than 5% cells of the mesodermal lineage. Still more preferably, the enriched final mixture of cells comprises at least 95% RPE-cells, less than 5% non-RPE eye field progenitor cells, and less than 1% cells of the mesodermal lineage. Most preferably, the enriched final mixture of cells comprises at least 95% RPE-cells, less than 3% non-RPE eye field progenitor cells, and less than 0.5% cells of the mesodermal lineage.

While any labelling technique known in the art may be used, the labelling is preferably performed using an antibody targeting the cell surface marker.

Rpe Cell Mixture and Uses Thereof

In a fourth aspect, the present invention provides an RPE cell mixture obtained or obtainable by a method according to the third aspect. The RPE cell mixture may be for use in the treatment of age-related macular degeneration or Stargardt's macular dystrophy. The treatment may comprise injecting the cells into an eye of the patient to be treated for age-related macular degeneration or Stargardt's macular dystrophy.

The fourth aspect also encompasses a method of treatment of age-related macular degeneration or Stargardt's macular dystrophy, comprising injecting the RPE cell mixture obtained or obtainable by the method according to the third aspect into an eye of the patient to be treated.

The injection preferably delivers about 50,000-400,000 of the RPE cells (more preferably about 100,000 to 200,000) to the eye.

Methods for Analyzing an In Vitro Cell Culture Comprising Mature RPE Cells

As a fifth aspect, the present invention provides a method for analyzing an in vitro cell culture comprising mature RPE cells, progenitors of RPE cells and/or undifferentiated stem cells (in particular pluripotent stem cells), comprising quantitating the number or fraction of cells expressing one or more cell surface markers selected from CD140b, CD56, CD104, CD164, CD220, EGFR, GD2, CD184, CD10, CD30, CD49a, CD49b, CD50, CD171, TRA-1-60 and CD326, preferably CD140b, CD56, GD2 and/or CD184, most preferably CD140b.

The expression of CD140b, CD56, CD104, CD164, CD220 and/or EGFR, preferably CD140b and/or CD56 may be regarded as indicative of the presence of mature RPE cells or progenitors of RPE cells. Preferably, 2, 3, 4, 5, 6, or 7 of these markers are used in combination for the analysis.

The expression of GD2, CD184, CD10, CD30, CD49a, CD49b, CD50, CD171, TRA-1-60 and/or CD326, preferably GD2 and/or CD184 may be regarded as indicative of undifferentiated precursor cells. Preferably, 2, 3, 4, 5, 6, 7 or 8 of these markers are used in combination for the analysis.

Preferably, two or more markers selected from CD140b, CD56, CD104, CD164, CD220, CD165 and/or EGFR, preferably CD140b and CD56 are used to quantitate cells in the method of the fifth aspect, in combination with using two or more markers selected from GD2, CD184, CD10, CD30, CD49a, CD49b, CD50, CD171, TRA-1-60 and/or CD326, preferably GD2 and CD184.

Preferably, the method of the fifth aspect comprises quantitating cells that are positive for CD140b and negative for GD2.

Preferably, the method of the fifth aspect comprises quantitating cells that are positive for CD140b and negative for CD184 for the enriched first population of cells.

Additional Methods of Obtaining Retinal Pigment Epithelium (RPE) Cells

The sixth aspect of the present invention provides a method of obtaining Retinal Pigment Epithelium (RPE) cells, comprising:
  culturing one or more human pluripotent stem cells on a first substrate comprising a single first laminin, wherein the laminin is an intact protein or protein fragment;
  exposing the stem cells to a first cell culture medium for a first time period, wherein the first cell culture medium maintains pluripotency;
  removing the first cell culture medium and exposing the stem cells to a second cell culture medium for a second time period of 3 days to 12 days, wherein the second cell culture medium is a differentiation medium and does not contain growth factors;
  removing the second cell culture medium and exposing the stem cells to a third cell culture medium that contains a growth factor being Activin A, for a third time period of 18 days to 35 days to obtain induced RPE cells;
  replating the induced RPE cells on a second substrate comprising a single second laminin; and
  culturing the induced RPE cells on the second substrate for 14 days to 28 days to obtain the RPE cells, wherein the total time for differentiation ranges from 42 days to 70 days.

The single first laminin and the single second laminin of the sixth aspect may independently be laminin-521, laminin-511, laminin-121, or laminin-111. In a preferred combination, the first laminin may be LN-111 or LN-521 and the second laminin LN-521. The first and second laminins may both be LN-521. Most preferably, the first laminin is LN-111 and the second laminin LN-521.

The single first laminin and the single second laminin may be coated at a concentration of about 5 µg/cm$^2$ to about 20 µg/cm$^2$. The first laminin and the second laminin are preferably recombinant laminins.

The first cell culture medium may comprise a Rho-kinase inhibitor that is present in the first cell culture medium at a concentration of about 5 µM to about 20 µM. The first cell culture medium may comprise at least one growth factor. The at least one growth factor in the first cell culture medium may comprise bFGF and TGFβ.

Preferably, the second cell culture medium does not contain growth factors or a Rho-kinase inhibitor. The Activin A may be present at a concentration of about 50 ng/mL to about 200 ng/mL.

The third cell culture medium comprises an effective amount of Activin A, preferably about 50 ng/mL to about 200 ng/mL. Preferably, the third cell culture medium does not contain other growth factors in addition to Activin A (in particular, is devoid of bFGF and TGFβ). Also preferably, the third cell culture medium does not contain a Rho-kinase inhibitor.

Preferably, the first cell culture medium, the second cell culture medium, and the third cell culture medium do not contain any differentiation inhibitors, feeder cells, or apoptosis inhibitors.

Preferably, the stem cells are plated onto the first substrate at a cell density of about $1.2 \times 10^4$ cells/cm$^2$ to $4.8 \times 10^4$ cells/cm$^2$. The induced RPE cells may be plated on the second substrate at a cell density from about $1.4 \times 10^6$ cells/cm$^2$ to about $1.4 \times 10^4$ cells/cm$^2$.

Particular Aspects

In a seventh aspect, the present disclosure relates to methods of culturing stem cells to obtain retinal pigment epithelium (RPE) cells. The stem cells are cultured on a first substrate of either LN-521, LN-511, LN-121, or LN-111, then differentiated. The differentiated cells are then replated onto a second substrate of either LN-521, LN-511, LN-121, or LN-111. Specified cell culture media are also used. It is specifically contemplated that the first and second substrates each contain only one particular laminin (i.e. a single laminin), though other ingredients may also be present in the substrate. The term "single" is used to indicate that only one laminin is present in the substrate.

Differentiated cells typically require two things to survive and reproduce: (1) a substrate or coating that provides a structural support for the cell; and (2) a cell culture medium to provide nutrition to the cell. The substrate or coating (1) is typically formed as a layer in a container, for example a petri dish or in the well of a multi-well plate. Application of different cell culture mediums at appropriate time intervals in combination with the substrates containing a single laminin result in mature RPE cells.

The stem cells that can be used with the methods and materials disclosed in the seventh aspect are pluripotent human stem cells. Such stem cells can include induced pluripotent stem cells, embryonic stem cells, adult stem cells, fetal stem cells, amniotic stem cells, and generally any pluripotent stem cell.

Initially, the pluripotent stem cells are plated on a first cell culture substrate. After being exposed to three different cell culture mediums, the cells are replated on a second cell culture substrate. The stem cells can be plated on the surface of the cell culture substrate to obtain conventional monolayer cultures (i.e. two-dimensional or 2D).

Both substrates of the seventh aspect comprise a single laminin, which is either LN-111, LN-121, LN-511, or LN-521. Each laminin can be an intact protein or a protein fragment, although in preferred embodiments the laminins are intact proteins. The laminin may be present at a concentration of about 5 μg/cm$^2$ to about 20 μg/cm$^2$, and in more specific embodiments a concentration of about 5.3 μg/cm$^2$ to about 15.8 μg/cm$^2$. LN-521 and LN-111 activate α6β1 integrins, which in turn leads to activation of the PI3K/Akt pathway. The first and second cell culture substrates are used in combination with multiple cell culture mediums to obtain the desired RPE cells. Three different cell culture mediums, which are described below, are used in the method of the seventh aspect The first cell culture medium maintains pluripotency and favors cell proliferation. In some embodiments, the first cell culture medium may contain a Rho-associated protein kinase (i.e. Rho-kinase or ROCK) inhibitor. The ROCK inhibitor may be present at a concentration of about 5 μM to about 20 μM. An example of a ROCK inhibitor is Y-27632 (Millipore). The first cell culture medium may also contain at least one growth factor. The first cell culture medium may include growth factors bFGF and TGFβ. The amounts of these growth factors are relatively low. For example, the concentration of the bFGF may range from greater than zero to about 4 ng/mL, and the concentration of the TGFβ is less than 5 ng/mL. For example, the first cell culture medium can be Nutristem™ XF medium (Biological Industries), which contains bFGF and TGFβ, which is supplemented with a ROCK inhibitor.

The second cell culture medium can be considered a differentiation medium. In some embodiments, the second cell culture does not contain a ROCK inhibitor. In addition, the second cell culture medium does not contain growth factors, such as bFGF or TGFβ. An example of a suitable second cell culture medium is Nutristem™ XF medium without bFGF or TGFβ (and not supplemented with a ROCK inhibitor).

The third cell culture medium contains a growth factor. However, the growth factor in the third cell culture medium is different from the growth factors which may be present in the first cell culture medium. For example, the growth factor may be Activin A, which may be present in a concentration of about 50 ng/mL to about 200 ng/mL. An example of a suitable third cell culture medium is Nutristem™ XF medium with Activin A added thereto (and without bFGF or TGFβ).

The stem cells are first plated onto the first cell culture substrate comprising a single laminin, as described above. The stem cells can be plated onto the first substrate at a cell density of about $1.2 \times 10^4$ cells/cm$^2$ to $4.8 \times 10^4$ cells/cm$^2$.

The stem cells are then exposed to the first cell culture medium for a first time period of about 12 hours to about 48 hours, including about 24 hours (i.e. two days). The stem cells are usually kept at 37° C., 5% $CO_2$/5% $O_2$ atmosphere.

Next, the first cell culture medium is removed, and the second cell culture medium is applied to the plated stem cells. The stem cells are exposed to the second cell culture medium for a second time period of about 72 hours (3 days) to about 288 hours (12 days), including about 144 hours (6 days). The medium may be periodically changed if desired.

Next, the second cell culture medium is removed, and the third cell culture medium is applied to the plated stem cells. The stem cells are exposed to the third cell culture medium for a third time period of about 432 hours (18 days) to about 1176 hours (49 days), including about 840 hours (35 days). The medium may be periodically changed if desired. After exposure to the third cell culture medium, these cells can be considered to be induced RPE cells.

The third cell culture medium is then removed, and the induced RPE cells are replated onto the second cell culture substrate, which also contains a single laminin (LN-111, LN-121, LN-511, or LN-521). The induced RPE cells can be replated, for example, by trypsinizing the monolayers from the first cell culture substrate using a medium without ROCK inhibitor or growth factors (e.g. the second cell culture medium) and then forming a single cell suspension that can be used for seeding the second cell culture substrate. The induced RPE cells can be plated on the second substrate at a cell density from about $1.4 \times 10^6$ cells/cm$^2$ to about $1.4 \times 10^4$ cells/cm$^2$.

The stem cells are then exposed to the second cell culture medium (i.e. without ROCK inhibitor or growth factors) on the second substrate for a fourth time period of about 336 hours (14 days) to about 2400 hours (100 days), including about 672 hours (28 days). The medium may be periodically changed if desired.

Preferably, the differentiation protocol may result in a total time of about nine (9) weeks from the beginning of differentiation to the maturation of the resulting RPE cells. Also preferably, the total time for differentiation can range from about 6 weeks (42 days) to about 10 weeks (70 days). Differentiation from stem cells to the desired RPE cells can be identified by the upregulation or downregulation of various markers, as described in the examples.

The methods of the seventh aspect of the present disclosure provide defined and xeno-free differentiation of RPE cells in monolayers without manual dissection that allows for easy and highly scalable production according to GMP. Antibody-based purification of retinal pigment epithelial cells can be used during production of retinal pigmented epithelial cell production from pluripotent stem cells (e.g. for RPE enrichment, quality control purposes, etc.). Release and quality control criteria for retinal pigmented epithelial cell purity are also described herein. Isolation of native RPE cells can also be used for autologous or allogenic transplantations.

These robust and reproducible 2D protocols using human recombinant LN-111, LN-121, LN-511, or LN-521 will allow the easy and efficient induction of a high yield of hPSC-RPE cells, and cell surface markers will allow for sensitive quality control at the single cell level and can be further used for purification and evaluation of RPE cells resulting from in vitro differentiation protocols, which will reduce batch to batch variability and increase the safety level of the final product to use for transplantation in AMD patients.

As an eighth aspect, described herein are various methods of using cell surface markers, which have been identified as being positive or negative selection markers for RPE cells. Positive selection markers include CD140b, CD104, CD164, CD220, or EGFR. Negative selection markers include GD2, CD184, CD10, CD30, CD49a, CD49b, CD50, CD171, TRA-1-60, or CD326. These cell surface markers can be used, for example to enrich RPE cells in a mixture of cells. The cell surface marker is labeled in a starting mixture of cells; and then one separates the cells that are positive for said cell surface marker from cells that are negative for said cell surface marker to obtain a final mixture that is more enriched in RPE cells.

As ninth aspect, disclosed herein are methods of treating a patient having macular degeneration, comprising: injecting retinal pigment epithelium (RPE) cells into an eye of the patient; wherein the RPE cells have been obtained from stem cells under completely chemically defined and xeno-free conditions. The RPE cells may be obtained according to the methods of the seventh aspect described above.

The methods of seventh to ninth aspects can be defined as follows:
1. A method of obtaining Retinal Pigment Epithelium (RPE) cells, comprising:
   culturing one or more human pluripotent stem cells on a first substrate comprising a single first laminin, wherein the laminin is an intact protein or protein fragment;
   exposing the stem cells to a first cell culture medium for a first time period;
   removing the first cell culture medium and exposing the stem cells to a second cell culture medium for a second time period;
   removing the second cell culture medium and exposing the stem cells to a third cell culture medium that contains a growth factor for a third time period to obtain induced RPE cells;
   replating the induced RPE cells on a second substrate comprising a single second laminin; and
   culturing the induced RPE cells on the second substrate to obtain the RPE cells.
2. The method of item 1, wherein the single first laminin and the single second laminin are independently laminin-521, laminin-511, laminin-121, or laminin-111.
3. The method of item 1, wherein the single first laminin and the single second laminin are coated at a concentration of about 5 μg/cm$^2$ to about 20 μg/cm$^2$.
4. The method of item 1, wherein the first laminin and the second laminin are recombinant laminins.
5. The method of item 1, wherein the first cell culture medium comprises a Rho-kinase inhibitor that is present in the first cell culture medium at a concentration of about 5 μM to about 20 μM.
6. The method of item 1, wherein the first cell culture medium comprises at least one growth factor.
7. The method of item 6, wherein the at least one growth factor in the first cell culture medium comprises bFGF and TGFβ.
8. The method of item 1, wherein the second cell culture medium does not contain growth factors or a Rho-kinase inhibitor.
9. The method of item 1, wherein the growth factor in the third cell culture medium comprises Activin A.
10. The method of item 9, wherein the Activin A is present at a concentration of about 50 ng/mL to about 200 ng/mL.
11. The method of item 1, wherein the substrate, the first cell culture medium, the second cell culture medium, and the third cell culture medium do not contain any differentiation inhibitors, feeder cells, or apoptosis inhibitors.
12. The method of item 1, wherein the first time period is about 12 hours to 48 hours.
13. The method of item 1, wherein the stem cells are plated onto the first substrate at a cell density of about $1.2 \times 10^4$ cells/cm$^2$ to $4.8 \times 10^4$ cells/cm$^2$.
14. The method of item 1, wherein the second time period is from about 72 hours (3 days) to about 288 hours (12 days).
15. The method of item 1, wherein the third time period is from about 432 hours (18 days) to about 1176 hours (49 days).
16. The method of item 1, wherein the induced RPE cells are cultured on the second substrate for a fourth time period of about 336 hours (14 days) to about 2400 hours (100 days).
17. The method of item 1, wherein the induced RPE cells are plated on the second substrate at a cell density from about $1.4 \times 10^6$ cells/cm$^2$ to about $1.4 \times 10^4$ cells/cm$^2$.
18. The method of item 1, wherein the RPE cells are obtained after a total of about nine weeks.
19. A method of enriching RPE cells in a mixture of cells, comprising:
   labeling a cell surface marker in a starting mixture of cells; and
   separating the cells that are positive for said cell surface marker from cells that are negative for said cell surface marker to obtain a final mixture that is more enriched in RPE cells.
20. The method of item 19, wherein said cell surface marker is CD140b, CD104, CD164, CD220, or EGFR.
21. The method of item 19, wherein said cell surface marker is GD2, CD184, CD10, CD30, CD49a, CD49b, CD50, CD171, TRA-1-60, or CD326.
22. A method of enriching RPE cells in a mixture of cells, comprising:
   labeling a starting mixture of cells with antibodies targeting a first cell surface marker on RPE cells; and separating the cells that are positive for the first cell surface marker from those that are negative for the first cell surface marker to obtain a first mixture that is more enriched in RPE cells.
23. The method of item 22, further comprising:
labeling the first mixture of cells with antibodies targeting a second cell surface marker on RPE cells; and
separating the cells that are positive for the second cell surface marker from those that are negative for the second cell surface marker to obtain a second mixture that is more enriched in RPE cells.
24. The method of item 23, further comprising:
labeling the second mixture of cells with antibodies targeting a third cell surface marker on RPE cells; and
separating the cells that are positive for the third cell surface marker from those that are negative for the third cell surface marker to obtain a third mixture that is more enriched in RPE cells.
25. The method of any one of items 22-24, wherein said cell surface marker is CD140b, CD104, CD164, CD220, or EGFR.
26. A method of enriching RPE cells in a mixture of cells, comprising:
labeling a starting mixture of cells with antibodies targeting a first cell surface marker on non-RPE cells; and
separating the cells that are positive for the first cell surface marker from those that are negative for the first cell surface marker to obtain a first mixture that is more enriched in RPE cells.
27. The method of item 26, further comprising:
labeling the first mixture of cells with antibodies targeting a second cell surface marker on non-RPE cells; and
separating the cells that are positive for the second cell surface marker from those that are negative for the second cell surface marker to obtain a second mixture that is more enriched in RPE cells.
28. The method of item 27, further comprising:
labeling the second mixture of cells with antibodies targeting a third cell surface marker on non-RPE cells; and
separating the cells that are positive for the third cell surface marker from those that are negative for the third cell surface marker to obtain a third mixture that is more enriched in RPE cells.
29. The method of any one of items 26-28, wherein said cell surface marker is GD2, CD184, CD10, CD30, CD49a, CD49b, CD50, CD171, TRA-1-60, or CD326.
30. A method of treating a patient having age-related macular degeneration, comprising: injecting RPE cells into an eye of the patient;
wherein said RPE cells have been obtained under completely chemically defined and xeno-free conditions; and
wherein said RPE cells are positive for at least one cell surface marker selected from the group consisting of CD140b, CD104, CD164, CD220, and EGFR.

The first through ninth aspects described above are related to each other. Any description of particular parameters, ingredients, ranges, etc. provided in any one of the aspects should be considered as applying to the other eight aspects as well.

GENERAL STATEMENTS CONCERNING THE PRESENT DISCLOSURE

A more complete understanding of the compositions and methods disclosed herein can be obtained by reference to the accompanying drawings. These figures are merely schematic representations based on convenience and the ease of demonstrating the present disclosure, and are, therefore, not intended to define or limit the scope of the exemplary embodiments.

The arrangement of the present disclosure into sections with headings and subheadings is merely to improve legibility and is not to be interpreted limiting in any way, in particular, the division does not in any way preclude or limit combining features under different headings and subheadings with each other.

The present disclosure is further illustrated in the following non-limiting working examples, it being understood that these examples are intended to be illustrative only and that the disclosure is not intended to be limited to the materials, conditions, process parameters and the like recited herein. Modifications and alterations will occur to others upon reading and understanding the preceding detailed description. It is intended that the present disclosure be construed as including all such modifications and alterations insofar as they come within the scope of the appended claims.

EXAMPLES

The following examples are not to be regarded as limiting. For further information on the experimental details, the skilled reader is directed to a separate section titled Materials and Methods.

Example 1: Identification of Cell Markers

Figure 37A:
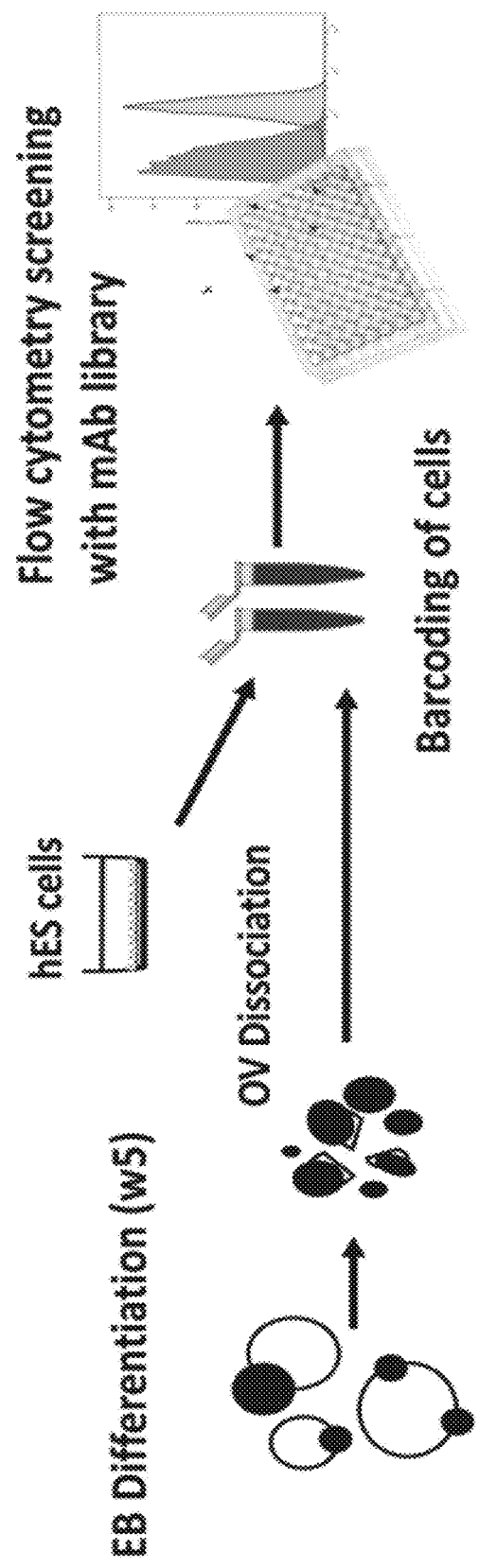
FIG. 37A and FIG. 37B illustrate schematically the experimental flow of Example 1.

With the aim of finding new surface markers for hPSC-derived RPE cells (hPSC-RPE), a previously published protocol to differentiate hPSC into RPE cells using 3D embryoid body (EB) differentiation was used (Plaza-Reyes et al. supra). After 5 weeks of culture, optical vesicles (OVs) emerge from the EBs containing the pigmented RPE cells mixed with other cell types. OVs were manually isolated and expression of cell surface markers was compared with undifferentiated human embryonic stem cells (hESCs) using an antibody library recognizing 242 CD antigens (BD Biosciences 560747) with flow cytometry (see FIG. 37A for schematic outline, and FIG. 3 and Table 2 for screening results).

Figure 3:
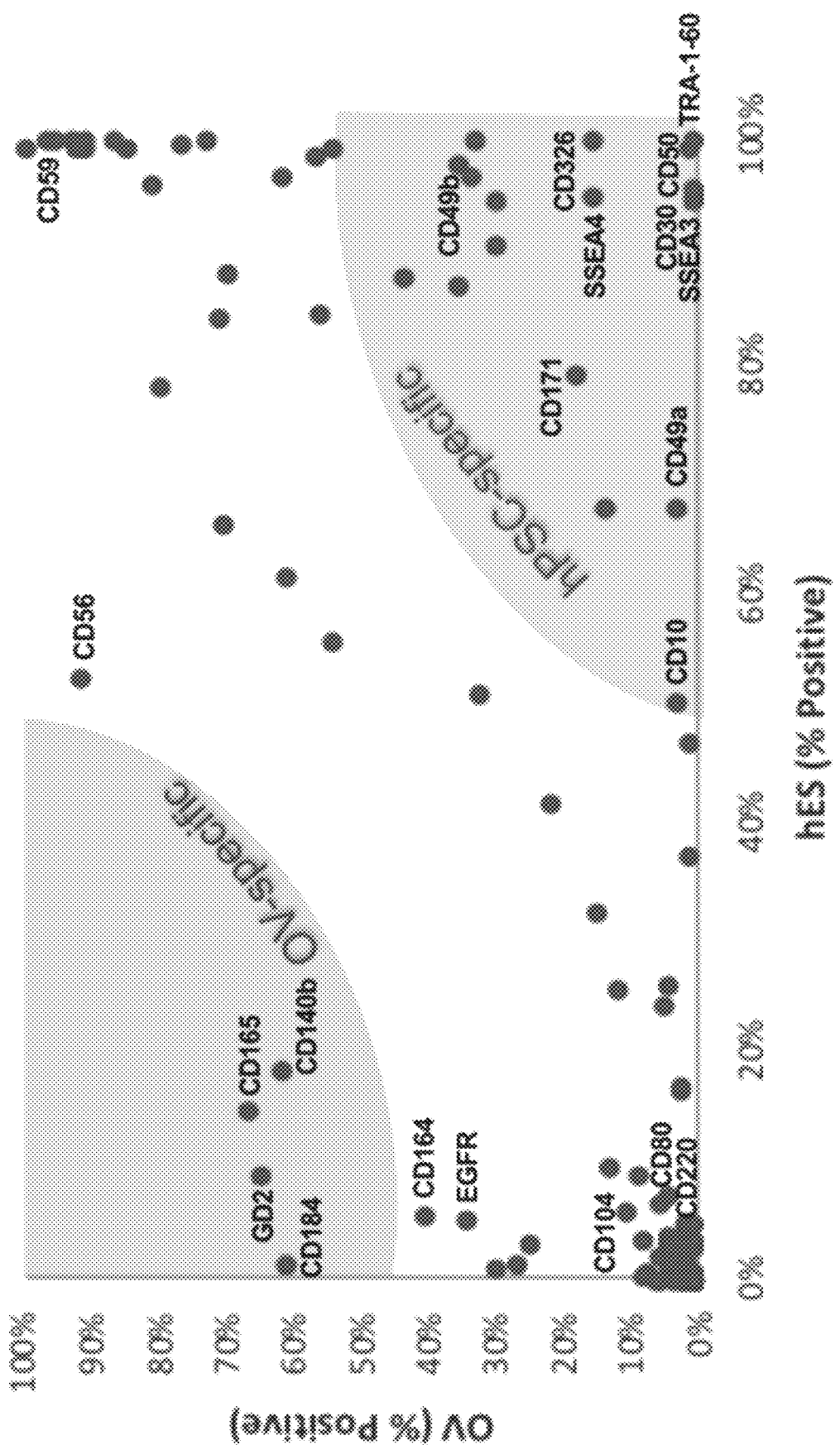
FIG. 3 is a dot plot graph displaying the relative degree of expression of some cell surface proteins between optical vesicles (OVs) and human embryonic stem cells (hES). Each dot represents a different cell surface protein, and their position along the x and y axes is determined by the percent positive value in OVs (y-axis) and hES (x-axis). The y-axis runs from 0% to 100% in increments of 10%. The x-axis runs from 0% to 100% in increments of 20%. The top left corner indicates OV-specific surface proteins (relative to hES), which include CD184, GD2, CD165, and CD140b. The bottom right corner indicates hES-specific surface proteins (relative to OVs), which include CD10, CD49a, CD171, TRA-1-60, CD49b, SSEA4, CD326, SSEA3, CD30, CD50, and TRA-1-60.
Figure 4:
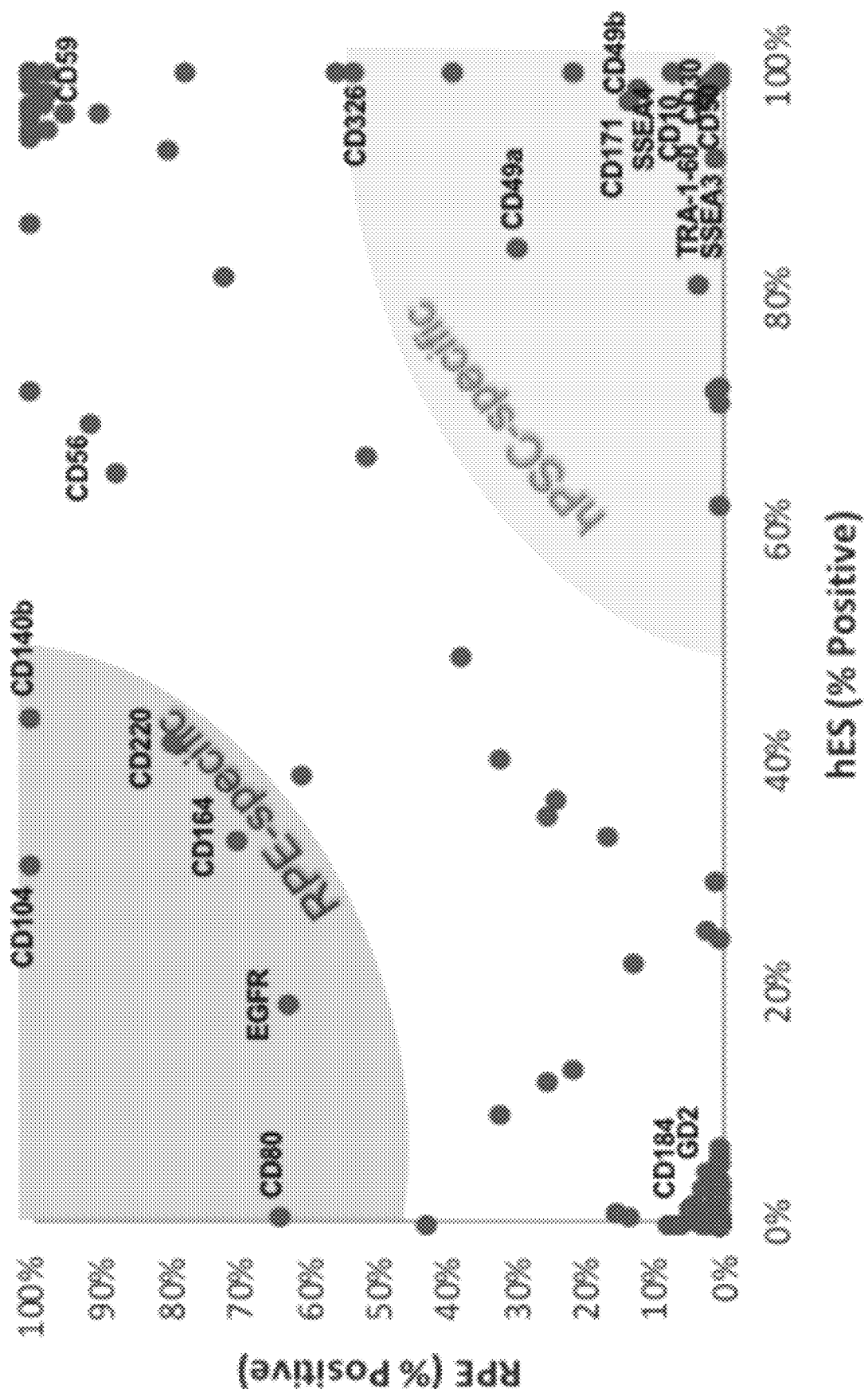
FIG. 4 is a dot plot graph displaying the relative degree of expression of some cell surface proteins between mature retinal pigment epithelium cells (RPE) and human pluripotent stem cells (hPSC). Each dot represents a different cell surface protein, and their position along the x and y axes is determined by the percent positive value in RPEs (y-axis) and hES (x-axis). The y-axis runs from 0% to 100% in increments of 10%. The x-axis runs from 0% to 100% in increments of 20%. The top left corner indicates RPE-specific surface proteins (relative to hES), which include CD80, EGFR, CD104, CD164, CD220, and CD140b. The bottom right corner indicates hPSC-specific surface proteins (relative to RPEs), which include TRA-1-60, SSEA3, CD49a, CD171, TRA-1-60, SSEZ4, CD10, CD50, CD30, CD49b, CD24, and CD326.
Figure 37B:
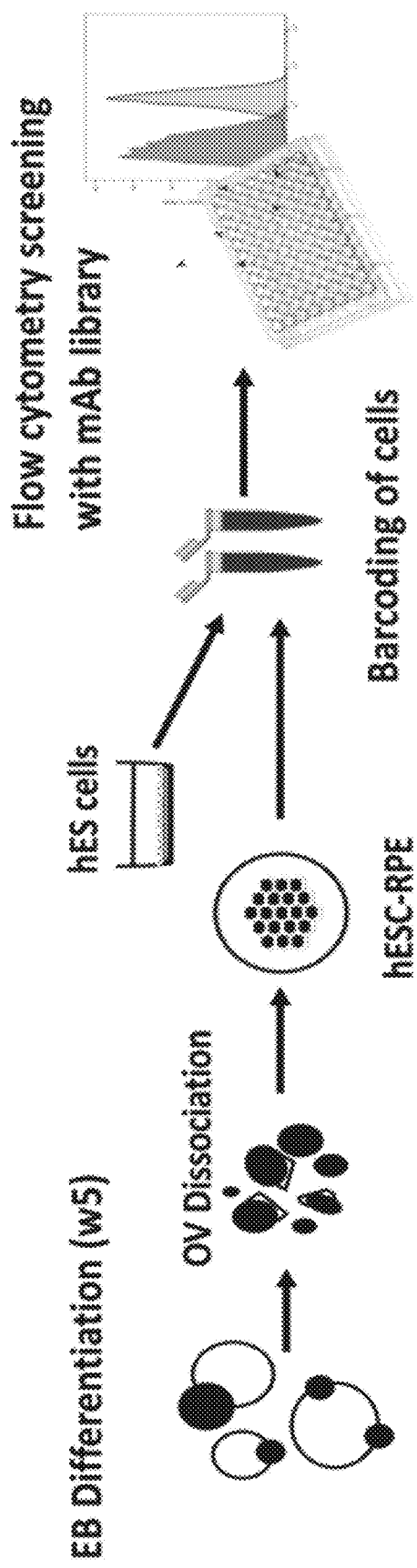
Figure 38:
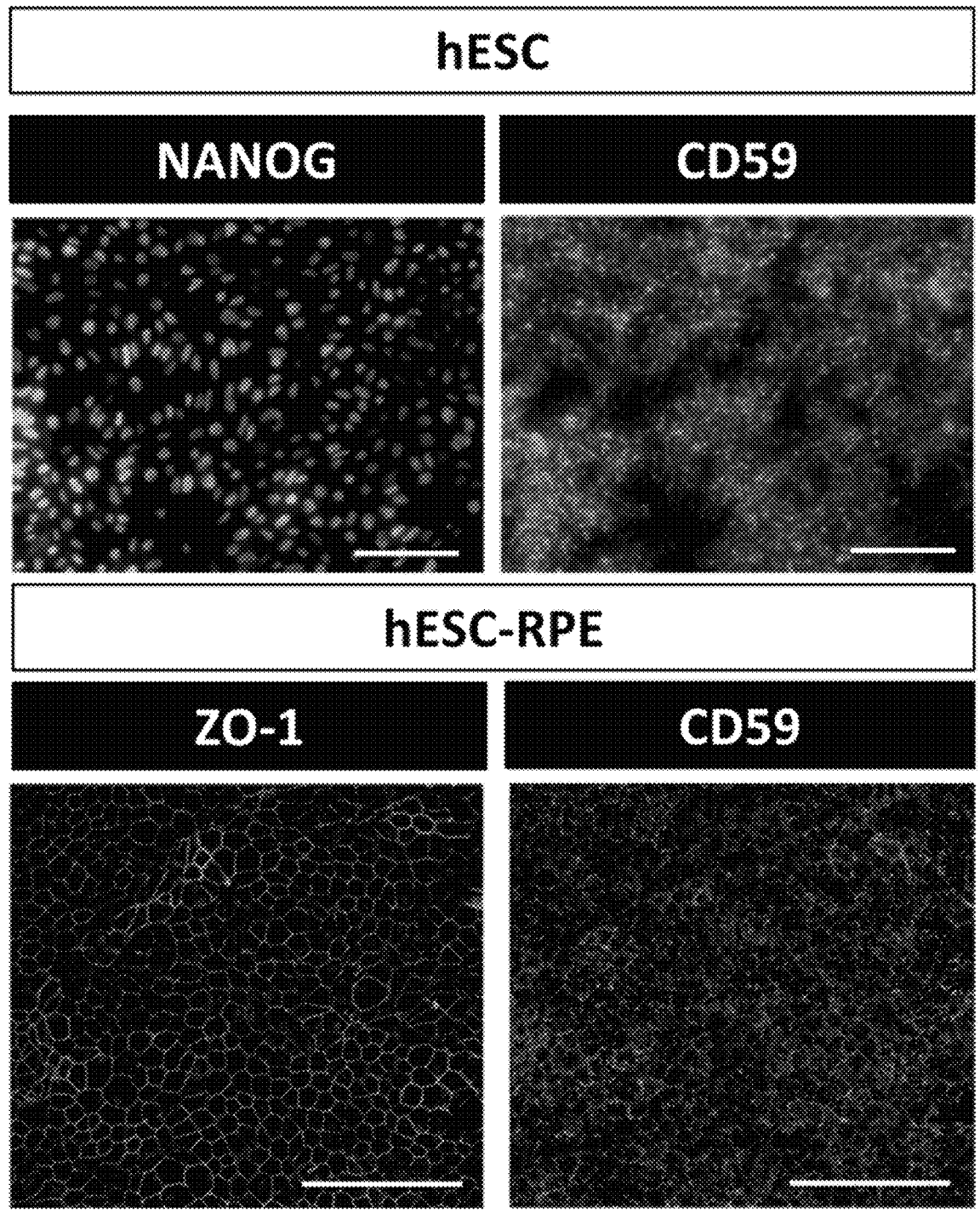
FIG. 38 demonstrates that CD59 is significantly expressed in undifferentiated stem cells (hESC, top panels), whereas hESC differentiated into RPE cells (hESC-RPE, lower bottom panels) do express less CD59.

The screening identified subsets of cell surface markers expressed in both cell types and specific for either the OVs or the hESCs. CD59 has been suggested to be a useful RPE marker, but both the present screen and immunostaining data show that it is expressed in both RPE and undifferentiated embryonic stem cells, then making it less suitable (FIGS. 3 and 4 and 38 of the present disclosure). In agreement with OVs consisting of several cell types homogenous labelling of all cells in the OV-sample was not detected. Instead, the OV-specific markers labeled a fraction of the cells, suggesting that they tag different cell types within the dissected OVs. To identify markers which could be RPE specific and those which may label alternative lineages, a second screening was performed, this time using more mature end-stage differentiation cultures which we previously showed to be highly pure in a previous study described in Plaza-Reyes et al. supra. See FIG. 37B for schematic outline, and FIG. 4 and Table 3 for screening results).

TABLE 1

Summary of the screening data

| Cell Surface Protein | Name | Other names | hPSC | OV | RPE |
|---|---|---|---|---|---|
| CD10 | Membrane metallo-endopeptidase | CALLA, NEP, SFE, CMT2T, SCA43 | X | | |
| CD30 | TNF receptor superfamily, member 8 (TNFRSF8) | D1S166E, Ki-1 | X | | |
| CD49a | Integrin alpha 1 | ITGA1, VLA1 | X | | |
| CD49b | Integrin alpha 2 | ITGA2, BR, GPla, HPA-5, VLA-2, VLAA2 | X | | |
| CD50 | Intercellular adhesion molecule 3 | ICAM3, CDW50, ICAM-R | X | | |
| CD104 | Integrin beta 4 | ITGB4, GP150 | | | X |
| CD140b | Beta-type platelet-derived growth factor receptor | IBGC4, IMF1, JTK12, PDGFR, PDGFR-1, PDGFR1, KOGS, PENTT | | X | X |
| CD164 | Sialomucin core protein 24 | MGC-24, MUC-24, endolyn, DFNA66 | | X | X |
| CD171 | L1 cell adhesion molecule | L1CAM, CAML1, HSAS, HSAS1, MASA, MIC5, NCAM-L1, S10, SPG1 | X | | |
| CD184 | C-X-C chemokine receptor type 4 | D25201E, FB22, HM89, HSY3RR, LAP-3, LAP3, LCR1, LESTR, NPY3R, NPYR, NPYRL, NPYY3R, WHIM, WHIMS | X | | |
| CD220 | Insulin receptor | IR, INSR, HHF5 | | | X |
| CD326 | Epithelial cell adhesion molecule | DIAR5, EGP-2, EGP314, EGP40, ESA, HNPCC8, KS1/4, KSA, M4S1, MIC18, MK-1, TACSTD1, TROP1 | X | | |
| EGFR | Epidermal growth factor receptor | ERBB, ERBB1, HER1, NISBD2, PIG61, Mena | | | X |
| GD2 | Ganglioside GD2 | Disialoganglioside GD2 | | X | |

TABLE 2 data underlying FIG. 3

| | hESC | | OVs | |
|---|---|---|---|---|
| Surface Marker | % Positive | Median Fluorescent Intensity | % Positive | Median Fluorescent Intensity |
| CD1a | 2.08% | 34 | 4.93% | 29.1 |
| CD1b | 0.20% | 21 | 0.37% | 16.1 |
| CD1d | 0.80% | 30.1 | 0.86% | 16.6 |
| CD2 | 0.22% | 20.5 | 0.20% | 17.9 |
| CD3 | 0.24% | 20 | 0.24% | 15.4 |
| CD4 | 3.03% | 39.3 | 0.24% | 18.2 |
| CD4v4 | 0.49% | 27.8 | 0.32% | 17.9 |
| CD5 | 0.46% | 21.5 | 0.26% | 17.4 |
| CD6 | 0.32% | 23.1 | 0.40% | 17.7 |
| CD7 | 4.06% | 48.9 | 1.20% | 24.9 |
| CD8a | 0.17% | 20.2 | 0.15% | 14.1 |
| CD8b | 0.46% | 15.9 | 0.32% | 12.5 |
| CD9 | 99.10% | 1828 | 53.60% | 191 |
| CD10 | 50.80% | 160 | 2.86% | 16.9 |
| CD11a | 1.23% | 20.2 | 0.87% | 15.1 |
| CD11b | 0.23% | 20.8 | 0.15% | 15.4 |
| CD11c | 0.24% | 20 | 0.21% | 14.8 |
| CD13 | 16.70% | 78.4 | 1.63% | 18.7 |
| CD14 | 0.23% | 19.5 | 0.17% | 15.1 |
| CD15 | 1.07% | 25.9 | 29.30% | 73.2 |
| CD15s | 0.30% | 22.6 | 0.14% | 15.6 |
| CD16 | 0.07% | 20.5 | 0.15% | 15.9 |
| CD18 | 0.30% | 19.5 | 0.26% | 13.6 |
| CD19 | 0.21% | 13.8 | 0.11% | 12.5 |
| CD20 | 0.33% | 19.2 | 0.29% | 14.8 |
| CD21 | 5.08% | 58.1 | 1.34% | 27.2 |
| CD22 | 0.06% | 18.7 | 0.28% | 13.8 |
| CD23 | 0.21% | 20.8 | 0.17% | 15.4 |
| CD24 | 100% | 52869 | 90.50% | 1664 |
| CD25 | 0.83% | 21.8 | 0.53% | 16.6 |
| CD26 | 2.05% | 52.4 | 1.98% | 27.5 |
| CD27 | 0.29% | 21.8 | 0.16% | 16.9 |
| CD28 | 0.22% | 21.8 | 0.24% | 18.2 |
| CD29 | 87.90% | 354 | 43.20% | 135 |
| CD30 | 94.80% | 713 | 0.15% | 16.1 |
| CD31 | 0.33% | 17.9 | 2.24% | 16.4 |
| CD32 | 0.23% | 15.6 | 0.23% | 13.1 |
| CD33 | 0.39% | 19.5 | 0.22% | 15.1 |
| CD34 | 0.33% | 22.8 | 0.82% | 16.1 |
| CD35 | 0.56% | 22.1 | 0.25% | 16.1 |
| CD36 | 1.35% | 21.3 | 0.98% | 17.7 |
| CD37 | 0.16% | 20.5 | 0.23% | 15.9 |
| CD38 | 0.54% | 22.6 | 0.44% | 17.7 |
| CD39 | 0.53% | 27.5 | 3.40% | 21.8 |
| CD40 | 37.30% | 127 | 0.54% | 19 |
| CD41a | 0.23% | 21 | 0.23% | 17.7 |
| CD41b | 0.32% | 20.8 | 0.28% | 15.6 |
| CD42a | 94.40% | 467 | 29.40% | 75.2 |
| CD42b | 0.73% | 18.7 | 0.30% | 14.8 |
| CD43 | 0.18% | 21.3 | 1.42% | 19.5 |
| CD44 | 84.50% | 369 | 55.40% | 213 |
| CD45 | 4.02% | 24.6 | 3.96% | 21.8 |
| CD45RA | 0.16% | 24.1 | 0.68% | 19.7 |
| CD45RB | 3.20% | 22.3 | 1.72% | 15.6 |
| CD45RO | 0.23% | 21.3 | 0.65% | 16.6 |
| CD46 | 99.30% | 2895 | 90.60% | 1551 |
| CD47 | 99.00% | 654 | 99.00% | 1802 |
| CD48 | 0.33% | 25.2 | 0.36% | 18.2 |
| CD49a | 67.60% | 214 | 2.83% | 27.8 |
| CD49b | 96.50% | 516 | 33.30% | 90.6 |
| CD49c | 97.60% | 647 | 34.70% | 97.9 |
| CD49d | 3.47% | 53.5 | 3.64% | 30.6 |

TABLE 2-continued data underlying FIG. 3

| Surface Marker | hESC % Positive | hESC Median Fluorescent Intensity | OVs % Positive | OVs Median Fluorescent Intensity |
|---|---|---|---|---|
| CD49e | 88.20% | 401 | 69.40% | 277 |
| CD50 | 94.70% | 793 | 0.35% | 22.3 |
| CD51/61 | 0.28% | 29.6 | 0.84% | 18.7 |
| CD53 | 0.47% | 22.3 | 7.63% | 24.4 |
| CD54 | 51.30% | 161 | 32.10% | 68.7 |
| CD55 | 99.80% | 1621 | 72.50% | 296 |
| CD56 | 52.90% | 167 | 90.70% | 1354 |
| CD57 | 100% | 17613 | 92.00% | 1405 |
| CD58 | 99.20% | 767 | 84.00% | 409 |
| CD59 | 100.00% | 2694 | 96.00% | 3894 |
| CD61 | 7.51% | 54 | 3.82% | 29.8 |
| CD62E | 0.20% | 22.6 | 0.29% | 17.9 |
| CD62L | 0.90% | 25.2 | 1.52% | 23.1 |
| CD62P | 0.76% | 34.8 | 0.38% | 21.5 |
| CD63 | 84.30% | 306 | 70.70% | 305 |
| CD64 | 0.19% | 22.8 | 0.15% | 16.4 |
| CD66 (a.c.d.e) | 17.10% | 69.8 | 2.07% | 24.1 |
| CD66b | 0.58% | 28 | 0.20% | 20.8 |
| CD66f | 0.82% | 28.8 | 0.32% | 19.2 |
| CD69 | 1.32% | 30.1 | 0.69% | 22.1 |
| CD70 | 0.58% | 27.2 | 0.64% | 21 |
| CD71 | 56.10% | 183 | 53.60% | 179 |
| CD72 | 3.61% | 30.9 | 7.78% | 38.7 |
| CD73 | 0.13% | 23.6 | 1.76% | 23.1 |
| CD74 | 0.26% | 25.4 | 0.21% | 16.4 |
| CD75 | 1.50% | 28 | 2.21% | 29.3 |
| CD77 | 2.73% | 36.6 | 1.93% | 24.6 |
| CD79b | 1.66% | 29.6 | 2.22% | 27 |
| CD80 | 2.71% | 34.3 | 2.60% | 29.6 |
| CD81 | 99.20% | 3089 | 91.50% | 2247 |
| CD83 | 9.43% | 39 | 7.94% | 28.3 |
| CD84 | 10.10% | 48.3 | 12.50% | 51.3 |
| CD85 | 6.15% | 41.7 | 10.10% | 50.5 |
| CD86 | 2.06% | 18.4 | 1.92% | 18.4 |
| CD87 | 0.80% | 15.9 | 0.56% | 17.7 |
| CD88 | 0.11% | 10.7 | 0.16% | 15.4 |
| CD89 | 0.03% | 13.1 | 0.11% | 16.6 |
| CD90 | 99.90% | 3570 | 85.70% | 631 |
| CD91 | 1.44% | 28.5 | 26.20% | 94.2 |
| CDw93 | 0.60% | 12 | 1.25% | 20 |
| CD94 | 0.19% | 8.18 | 0.09% | 13.6 |
| CD95 | 0.72% | 24.1 | 6.91% | 45.9 |
| CD97 | 0.21% | 14.3 | 0.24% | 14.1 |
| CD98 | 100.00% | 7799 | 94.90% | 2077 |
| CD99 | 67.60% | 235 | 13.10% | 45.4 |
| CD99R | 0.51% | 13.1 | 0.64% | 18.4 |
| CD100 | 47.20% | 151 | 0.67% | 20 |
| CD102 | 0.23% | 10.5 | 0.23% | 12.5 |
| CD103 | 0.25% | 12 | 0.28% | 15.6 |
| CD105 | 0.69% | 20 | 1.49% | 18.7 |
| CD106 | 0.10% | 9.21 | 0.31% | 15.1 |
| CD107a | 0.46% | 7.67 | 0.38% | 13.1 |
| CD107b | 0.17% | 7.67 | 1.16% | 19.7 |
| CD108 | 0.81% | 28.8 | 0.40% | 16.6 |
| CD109 | 0.18% | 17.4 | 0.15% | 11 |
| CD112 | 0.21% | 24.6 | 3.23% | 46.5 |
| CD114 | 0.79% | 12 | 0.51% | 15.4 |
| CD116 | 0.23% | 11.5 | 0.19% | 14.6 |
| CD117 | 0.82% | 33.2 | 0.55% | 17.4 |
| CD118 | 0.32% | 14.6 | 0.25% | 15.6 |
| CD119 | 1.00% | 44.1 | 2.33% | 38.7 |
| CD120a | 0.58% | 14.8 | 0.69% | 20 |
| CD121a | 0.06% | 5.37 | 0.08% | 11 |
| CD121b | 0.09% | 4.6 | 0.07% | 9.97 |
| CD122 | 0.03% | 5.11 | 0.04% | 10.5 |
| CD123 | 0.22% | 8.69 | 0.31% | 12.5 |
| CD124 | 0% | 7.16 | 0.15% | 9.97 |
| CD126 | 0.03% | 5.11 | 0.08% | 9.72 |
| CD127 | 0.46% | 12.3 | 0.48% | 15.4 |
| CD128b | 0.22% | 7.93 | 0.09% | 13.1 |
| CD130 | 0.76% | 15.9 | 0.95% | 25.7 |
| CD134 | 0.15% | 10.2 | 0.11% | 13.1 |
| CD135 | 0.23% | 10.2 | 0.15% | 13.6 |
| CD137 | 0.79% | 9.97 | 0.50% | 13.1 |
| CD137 Ligand | 0.09% | 8.44 | 0.08% | 12.8 |
| CD138 | 0.03% | 7.67 | 0.10% | 11 |
| CD140a | 0.06% | 7.16 | 0.74% | 13.3 |
| CD140b | 18.50% | 81.4 | 61.10% | 290 |
| CD141 | 0.24% | 11.3 | 5.09% | 18.4 |
| CD142 | 6.90% | 67.6 | 5.11% | 31.1 |
| CD144 | 0.72% | 12 | 0.44% | 15.4 |
| CD146 | 61.80% | 192 | 60.30% | 210 |
| CD147 | 100 | 8211 | 97.00% | 4218 |
| CD150 | 1.43% | 23.3 | 2.33% | 34.3 |
| CD151 | 78.20% | 328 | 79.30% | 418 |
| CD152 | 0.14% | 13.6 | 1.14% | 25.9 |
| CD153 | 0.06% | 6.65 | 0.10% | 11 |
| CD154 | 0.06% | 6.14 | 0.10% | 11.3 |
| CD158a | 0.31% | 7.41 | 0.10% | 10.2 |
| CD158b | 0.47% | 13.3 | 0.22% | 15.4 |
| CD161 | 0.03% | 7.41 | 0.07% | 10.2 |
| CD162 | 0% | 7.16 | 0.05% | 10.5 |
| CD163 | 0.45% | 20.5 | 0.45% | 22.8 |
| CD164 | 5.76% | 37.4 | 40.00% | 107 |
| CD165 | 15.10% | 91.5 | 66.00% | 233 |
| CD166 | 87.20% | 718 | 34.80% | 88.5 |
| CD171 | 79.30% | 317 | 17.80% | 48.6 |
| CD172b | 1.90% | 45.9 | 2.62% | 47 |
| CD177 | 1.22% | 23.9 | 0.98% | 14.1 |
| CD178 | 0% | 6.65 | 0.08% | 9.72 |
| CD180 | 0% | 4.6 | 0.09% | 8.69 |
| CD181 | 2.86% | 17.4 | 1.68% | 17.4 |
| CD183 | 0.06% | 5.88 | 0.10% | 9.72 |
| CD184 | 1.62% | 15.1 | 60.50% | 261 |
| CD193 | 0.33% | 11 | 0.43% | 14.8 |
| CD195 | 0.06% | 8.44 | 0.13% | 13.6 |
| CD196 | 1.33% | 13.6 | 0.96% | 15.4 |
| CD197 | 1.19% | 18.2 | 1.57% | 23.1 |
| CD200 | 95.80% | 544 | 80.10% | 353 |
| CD205 | 1.39% | 33 | 3.66% | 18.2 |
| CD206 | 0.03% | 6.39 | 0.06% | 8.69 |
| CD209 | 0.12% | 8.44 | 0.25% | 12.3 |
| CD220 | 0.67% | 30.4 | 0.65% | 22.8 |
| CD221 | 66.40% | 203 | 69.90% | 257 |
| CD226 | 0.47% | 11.5 | 1.16% | 16.4 |
| CD227 | 32.20% | 80.5 | 14.50% | 46.2 |
| CD229 | 1.75% | 15.9 | 1.37% | 17.4 |
| CD231 | 0.14% | 10.2 | 0.53% | 16.4 |
| CD235a | 1.54% | 21.8 | 1.56% | 21.8 |
| CD243 | 2.85% | 22.3 | 3.56% | 28.3 |
| CD244 | 0.31% | 13.8 | 0.48% | 15.6 |
| CD255 | 1.69% | 16.1 | 1.43% | 17.2 |
| CD268 | 0.36% | 17.9 | 0.45% | 23.6 |
| CD271 | 42.00% | 135 | 21.30% | 42.7 |
| CD273 | 1.08% | 12.8 | 0.76% | 15.9 |
| CD274 | 2.89% | 24.9 | 3.74% | 29.3 |
| CD275 | 3.13% | 29.8 | 24.40% | 53.7 |
| CD278 | 0.86% | 15.4 | 1.31% | 18.2 |
| CD279 | 0.38% | 16.1 | 0.12% | 13.1 |
| CD282 | 0.09% | 12.3 | 0.17% | 19.5 |
| CD305 | 0.09% | 10.2 | 0.25% | 12.8 |
| CD309 | 4.95% | 46.7 | 0.24% | 19 |
| CD314 | 0% | 9.21 | 0 | 11.8 |
| CD321 | 99.80% | 1679 | 32.40% | 99.2 |
| CDw327 | 0.18% | 11.5 | 0.04% | 12 |
| CDw328 | 0% | 8.95 | 0.03% | 11.5 |
| CDw329 | 0% | 9.97 | 0.15% | 12 |
| CD335 | 0.10% | 7.67 | 0.07% | 10.7 |
| CD336 | 0.10% | 8.44 | 0.11% | 9.97 |
| CD337 | 0.08% | 12.3 | 0.06% | 12.5 |
| CD338 | 3.82% | 51.6 | 0.14% | 12.5 |
| CD304 | 99.40% | 3393 | 75.90% | 440 |
| αβTCR | 0.23% | 13.6 | 0.18% | 12 |
| β2-microglobulin | 90.60% | 380 | 29.20% | 72.1 |

TABLE 2-continued data underlying FIG. 3

| | hESC | | OVs | |
|---|---|---|---|---|
| Surface Marker | % Positive | Median Fluorescent Intensity | % Positive | Median Fluorescent Intensity |
| BLTR-1 | 0.39% | 15.9 | 0.10% | 13.3 |
| CLIP | 0.08% | 9.21 | 0.06% | 11.3 |
| CMRF-44 | 0% | 12 | 0.07% | 23.1 |
| CMRF-56 | 0% | 7.67 | 0.06% | 10.7 |
| EGF Receptor | 5.46% | 54.3 | 33.60% | 85.8 |
| fMLP Receptor | 0.15% | 1.53 | 0.24% | 7.93 |
| γδTCR | 0.08% | 7.67 | 0.17% | 11.5 |
| HPC | 0.08% | 19 | 1.16% | 23.6 |
| HLA-A.B.C | 98.50% | 804 | 55.80% | 197 |
| HLA-A2 | 0.27% | 12.5 | 0.17% | 13.1 |
| HLA-DQ | 0% | 10.5 | 5.90% | 26.2 |
| HLA-DR | 0% | 10.2 | 0.19% | 10.5 |
| HLA-DR.DP.DQ | 0.08% | 8.18 | 0.37% | 12.8 |
| Invariant NK T | 0.26% | 9.21 | 0.21% | 12.5 |
| Disialoganglioside GD2 | 9.29% | 25.9 | 64.40% | 350 |
| MIC A/B | 25.80% | 112 | 3.99% | 36.6 |
| NKB1 | 0% | 9.46 | 0.23% | 10.7 |
| SSEA-1 | 25.60% | 78.7 | 11.40% | 25.4 |
| SSEA-4 | 94.90% | 19635 | 15.10% | 30.1 |
| TRA-1-60 | 99.80% | 11871 | 0.25% | 11.8 |
| TRA-1-81 | 99.30% | 9444 | 0.68% | 13.8 |
| Vβ 23 | 0.16% | 9.97 | 0.15% | 11 |
| Vβ 8 | 0.16% | 8.95 | 0.18% | 11.3 |
| CD326 | 99.90% | 6850 | 14.90% | 60 |
| CD49f | 96.60% | 578 | 61.00% | 272 |
| CD104 | 0.41% | 23.3 | 2.77% | 24.9 |
| CD120b | 0.24% | 13.6 | 0.08% | 11.8 |
| CD132 | 0% | 9.46 | 0.26% | 9.21 |
| CD201 | 24.00% | 101 | 4.51% | 16.6 |
| CD210 | 0% | 7.93 | 0.04% | 7.93 |
| CD212 | 0% | 7.93 | 0.23% | 8.18 |
| CD267 | 0.16% | 6.65 | 0.15% | 7.67 |
| CD294 | 0 | 8.69 | 0.11% | 7.93 |
| SSEA-3 | 95.50% | 728 | 0.04% | 8.69 |
| Cutaneous Lymph. Anf. | 0.08% | 7.16 | 0.23% | 10.5 |
| Integrin β7 | 0.09% | 5.62 | 0.18% | 9.72 |

TABLE 3 data underlying FIG. 4

| | hESC | | RPE | |
|---|---|---|---|---|
| Surface Marker | % Positive | Median Fluorescent Intensity | % Positive | Median Fluorescent Intensity |
| CD1a | 0.11% | 253 | 0.01% | 325 |
| CD1b | 0.16% | 355 | 0.06% | 329 |
| CD1d | 0.12% | 329 | 0.02% | 345 |
| CD2 | 0.13% | 266 | 0.05% | 329 |
| CD3 | 0.15% | 263 | 0.04% | 325 |
| CD4 | 4.06% | 432 | 0.03% | 332 |
| CD4v4 | 1.82% | 425 | 0.08% | 342 |
| CD5 | 0.11% | 319 | 0.04% | 345 |
| CD6 | 0.09% | 279 | 0.03% | 372 |
| CD7 | 5.49% | 645 | 0.08% | 355 |
| CD8a | 0.41% | 292 | 0.06% | 325 |
| CD8b | 0.10% | 335 | 0.04% | 335 |
| CD9 | 98.70% | 61761 | 99.90% | 113464 |
| CD10 | 98.20% | 14842 | 1.95% | 924 |
| CD11a | 0.65% | 601 | 13.20% | 1353 |
| CD11b | 0.10% | 302 | 0.05% | 349 |
| CD11c | 0.14% | 296 | 0.06% | 422 |
| CD13 | 24.70% | 1155 | 0.26% | 365 |
| CD14 | 0.15% | 408 | 0.64% | 813 |
| CD15 | 2.68% | 445 | 0.34% | 577 |

TABLE 3-continued data underlying FIG. 4

| | hESC | | RPE | |
|---|---|---|---|---|
| Surface Marker | % Positive | Median Fluorescent Intensity | % Positive | Median Fluorescent Intensity |
| CD15s | 0.06% | 279 | 0.02% | 349 |
| CD16 | 0.09% | 276 | 0.02% | 345 |
| CD18 | 0.07% | 266 | 0.02% | 335 |
| CD19 | 0.03% | 269 | 0.07% | 553 |
| CD20 | 0.08% | 269 | 0.03% | 352 |
| CD21 | 25.60% | 1336 | 2.18% | 385 |
| CD22 | 0.08% | 286 | 0.03% | 359 |
| CD23 | 0.06% | 272 | 0.05% | 342 |
| CD24 | 100.00% | 1400000 | 55.70% | 3117 |
| CD25 | 0.04% | 263 | 0.02% | 349 |
| CD26 | 1.71% | 536 | 3.94% | 601 |
| CD27 | 0.10% | 272 | 0.03% | 349 |
| CD28 | 0.08% | 279 | 0.03% | 355 |
| CD29 | 96.20% | 6731 | 89.50% | 4867 |
| CD30 | 99.80% | 24708 | 0.10% | 445 |
| CD31 | 0.13% | 276 | 0.09% | 368 |
| CD32 | 0.15% | 289 | 0.05% | 349 |
| CD33 | 0.06% | 279 | 0.05% | 362 |
| CD34 | 0.46% | 368 | 0.04% | 418 |
| CD35 | 0.94% | 282 | 0.07% | 355 |
| CD36 | 0.16% | 309 | 0.20% | 368 |
| CD37 | 0.05% | 279 | 0.03% | 349 |
| CD38 | 0.66% | 382 | 2.08% | 388 |
| CD39 | 4.58% | 1034 | 2.06% | 489 |
| CD40 | 72.70% | 3310 | 0.18% | 392 |
| CD41a | 0.06% | 282 | 9.39E−05 | 372 |
| CD41b | 0.05% | 286 | 0.05% | 345 |
| CD42a | 0.11% | 567 | 0.03% | 365 |
| CD42b | 0.04% | 269 | 9.14E−05 | 349 |
| CD43 | 0.50% | 449 | 3.53% | 584 |
| CD44 | 97.10% | 14930 | 97.60% | 237727 |
| CD45 | 0.07% | 276 | 0.68% | 422 |
| CD45RA | 0.17% | 312 | 7.59% | 607 |
| CD45RB | 0.06% | 269 | 0.06% | 352 |
| CD45RO | 0.10% | 359 | 0.17% | 418 |
| CD46 | 99.90% | 72892 | 100.00% | 125682 |
| CD47 | 99.90% | 18113 | 100.00% | 33220 |
| CD48 | 0.05% | 272 | 0.02% | 355 |
| CD49a | 84.50% | 4653 | 29.30% | 1225 |
| CD49b | 98.60% | 9656 | 11.70% | 1026 |
| CD49c | 96.10% | 9929 | 99.90% | 21655 |
| CD49d | 4.40% | 669 | 0.72% | 425 |
| CD49e | 94.80% | 8163 | 96.90% | 8527 |
| CD50 | 99.30% | 25248 | 0.19% | 462 |
| CD51/61 | 0.05% | 302 | 0.37% | 385 |
| CD53 | 0.08% | 279 | 0.34% | 362 |
| CD54 | 72.20% | 3551 | 99.90% | 89262 |
| CD55 | 99.70% | 35718 | 99.80% | 17843 |
| CD56 | 69.50% | 3508 | 91.10% | 10927 |
| CD57 | 100% | 233798 | 77.20% | 7388 |
| CD58 | 99.90% | 15698 | 99.90% | 11868 |
| CD59 | 100% | 95000 | 100.00% | 210157 |
| CD61 | 0.11% | 279 | 0.55% | 385 |
| CD62E | 0.10% | 292 | 0.26% | 382 |
| CD62L | 0.11% | 479 | 0.11% | 506 |
| CD62P | 0.05% | 286 | 0.02% | 372 |
| CD63 | 65.10% | 2803 | 87.20% | 5106 |
| CD64 | 0.06% | 269 | 0% | 362 |
| CD66 (a.c.d.e) | 33.60% | 1260 | 16.40% | 756 |
| CD66b | 0.07% | 296 | 0.03% | 405 |
| CD66f | 0.08% | 299 | 0.02% | 378 |
| CD69 | 0.10% | 296 | 0.03% | 372 |
| CD70 | 0% | 299 | 0.34% | 368 |
| CD71 | 38.90% | 1716 | 60.60% | 3351 |
| CD72 | 0.20% | 292 | 1.63% | 465 |
| CD73 | 0.24% | 342 | 2.61% | 415 |
| CD74 | 0.08% | 339 | 0.04% | 405 |
| CD75 | 0.21% | 292 | 0.10% | 375 |
| CD77 | 2.20% | 375 | 0.11% | 392 |
| CD79b | 0.26% | 286 | 0.15% | 365 |
| CD80 | 0.72% | 362 | 63.80% | 3383 |
| CD81 | 98.70% | 33115 | 99.90% | 193383 |

TABLE 3-continued data underlying FIG. 4

| | hESC | | RPE | |
|---|---|---|---|---|
| Surface Marker | % Positive | Median Fluorescent Intensity | % Positive | Median Fluorescent Intensity |
| CD83 | 0.26% | 711 | 0.30% | 673 |
| CD84 | 0.16% | 299 | 0.23% | 721 |
| CD85 | 0.18% | 279 | 0.01% | 359 |
| CD86 | 0.97% | 329 | 0.01% | 322 |
| CD87 | 0.08% | 259 | 0.06% | 329 |
| CD88 | 0.03% | 253 | 6.95E−05 | 329 |
| CD89 | 0.05% | 263 | 0.06% | 332 |
| CD90 | 100.00% | 336451 | 21.30% | 1140 |
| CD91 | 9.76% | 763 | 31.90% | 1665 |
| CDw93 | 0.09% | 309 | 0.02% | 349 |
| CD94 | 0.05% | 259 | 0.04% | 332 |
| CD95 | 49.40% | 2110 | 37.70% | 1876 |
| CD97 | 0.04% | 289 | 0.05% | 352 |
| CD98 | 100% | 311545 | 100.00% | 136960 |
| CD99 | 86.90% | 5984 | 100.00% | 67416 |
| CD99R | 0.29% | 266 | 42.60% | 2196 |
| CD100 | 71.30% | 2857 | 0.24% | 587 |
| CD102 | 3.34% | 359 | 0.07% | 335 |
| CD103 | 0.06% | 276 | 7.54E−05 | 342 |
| CD105 | 6.29% | 774 | 0.16% | 352 |
| CD106 | 0.07% | 276 | 0.11% | 342 |
| CD107a | 1.20% | 428 | 0.72% | 452 |
| CD107b | 1.13% | 368 | 1.93% | 502 |
| CD108 | 72.10% | 2934 | 0.67% | 479 |
| CD109 | 5.49% | 1004 | 0.13% | 472 |
| CD112 | 36.90% | 1800 | 23.80% | 1916 |
| CD114 | 9.00E−05 | 263 | 0.02% | 332 |
| CD116 | 0.05% | 253 | 0.09% | 339 |
| CD117 | 3.67% | 611 | 0.05% | 352 |
| CD118 | 0.09% | 359 | 0.03% | 345 |
| CD119 | 96.20% | 5742 | 94.40% | 4595 |
| CD120a | 0.33% | 482 | 0.16% | 502 |
| CD121a | 0.09% | 269 | 0.08% | 339 |
| CD121b | 0.05% | 276 | 0.03% | 342 |
| CD122 | 0.04% | 309 | 8.20E−05 | 339 |
| CD123 | 0.08% | 263 | 0.12% | 352 |
| CD124 | 0.11% | 342 | 0.07% | 345 |
| CD126 | 0.73% | 676 | 0.29% | 649 |
| CD127 | 0.03% | 256 | 0.02% | 335 |
| CD128b | 1.06% | 365 | 8.25E−05 | 335 |
| CD130 | 1.17% | 732 | 15.00% | 1511 |
| CD134 | 0.04% | 279 | 0.05% | 375 |
| CD135 | 0.13% | 342 | 5.54% | 1038 |
| CD137 | 0.03% | 279 | 0.06% | 349 |
| CD137 Ligand | 0.05% | 266 | 0.10% | 342 |
| CD138 | 0.39% | 418 | 0.07% | 422 |
| CD140a | 0.05% | 286 | 0.43% | 368 |
| CD140b | 44.10% | 1891 | 99.90% | 82248 |
| CD141 | 2.34% | 690 | 0.90% | 382 |
| CD142 | 82.30% | 3383 | 71.80% | 3568 |
| CD144 | 22.60% | 1444 | 12.40% | 1316 |
| CD146 | 98.20% | 16074 | 98.00% | 10958 |
| CD147 | 100.00% | 339845 | 100.00% | 236148 |
| CD150 | 0.04% | 269 | 0.02% | 349 |
| CD151 | 94.30% | 7427 | 99.40% | 12284 |
| CD152 | 0.05% | 296 | 0.23% | 405 |
| CD153 | 0.09% | 279 | 0.06% | 345 |
| CD154 | 0.18% | 279 | 0.05% | 352 |
| CD158a | 0.10% | 269 | 0.08% | 342 |
| CD158b | 0.05% | 319 | 0.04% | 349 |
| CD161 | 0.11% | 279 | 0% | 355 |
| CD162 | 0.09% | 272 | 2.15% | 536 |
| CD163 | 0.19% | 611 | 0.04% | 683 |
| CD164 | 33.40% | 1456 | 69.90% | 4688 |
| CD165 | 94.90% | 4664 | 99.90% | 30426 |
| CD166 | 97.10% | 26944 | 99.70% | 17369 |
| CD171 | 97.20% | 8389 | 13.00% | 625 |
| CD172b | 0.04% | 282 | 9.19E−05 | 368 |
| CD177 | 6.95% | 614 | 0.05% | 345 |
| CD178 | 0.08% | 286 | 0.02% | 375 |
| CD180 | 0.04% | 276 | 0% | 352 |
| CD181 | 0.73% | 279 | 0.66% | 428 |
| CD183 | 0.18% | 269 | 0.14% | 342 |
| CD184 | 0.17% | 325 | 1.59% | 523 |
| CD193 | 0.13% | 332 | 0.02% | 355 |
| CD195 | 3.31% | 1071 | 2.83% | 1120 |
| CD196 | 0.09% | 279 | 0.03% | 355 |
| CD197 | 0.02% | 269 | 0.02% | 385 |
| CD200 | 100.00% | 41994 | 38.50% | 1940 |
| CD205 | 40.60% | 1809 | 32.10% | 1486 |
| CD206 | 0.07% | 282 | 0.03% | 349 |
| CD209 | 0.44% | 322 | 0.09% | 378 |
| CD220 | 42.00% | 1930 | 79.10% | 3375 |
| CD221 | 98.20% | 7368 | 97.10% | 5145 |
| CD226 | 0.05% | 286 | 0.04% | 355 |
| CD227 | 66.50% | 3517 | 51.40% | 2632 |
| CD229 | 0.03% | 279 | 0.02% | 342 |
| CD231 | 0.06% | 253 | 0.03% | 349 |
| CD235a | 0.05% | 272 | 0.08% | 349 |
| CD243 | 0.29% | 342 | 6.41% | 425 |
| CD244 | 0.04% | 272 | 0.02% | 352 |
| CD255 | 0.02% | 289 | 0.04% | 352 |
| CD268 | 0.14% | 465 | 0.14% | 563 |
| CD271 | 97.20% | 12249 | 2.25% | 442 |
| CD273 | 0.07% | 282 | 0.04% | 365 |
| CD274 | 0.08% | 312 | 0.54% | 662 |
| CD275 | 13.40% | 997 | 21.10% | 964 |
| CD278 | 0.06% | 266 | 0.01% | 345 |
| CD279 | 2.64% | 580 | 0.34% | 442 |
| CD282 | 0.05% | 269 | 0.03% | 342 |
| CD305 | 0.10% | 249 | 8.17E−05 | 325 |
| CD309 | 35.50% | 1529 | 25.10% | 1828 |
| CD314 | 0.07% | 253 | 7.94E−05 | 322 |
| CD321 | 100% | 55690 | 96.90% | 6985 |
| CDw327 | 0.08% | 253 | 0.02% | 322 |
| CDw328 | 0.02% | 253 | 0.03% | 329 |
| CDw329 | 0.17% | 239 | 0.09% | 322 |
| CD335 | 0.03% | 243 | 0.04% | 319 |
| CD336 | 0.09% | 243 | 7.89E−05 | 319 |
| CD337 | 0.16% | 263 | 0.02% | 322 |
| CD338 | 62.40% | 2645 | 7.80E−05 | 365 |
| CD304 | 100.00% | 90736 | 100.00% | 15241 |
| αβTCR | 0.36% | 746 | 0.07% | 428 |
| β2-microglobulin | 96.70% | 11178 | 99.80% | 34175 |
| BLTR-1 | 0.04% | 279 | 0.06% | 332 |
| CLIP | 0.05% | 302 | 0.04% | 335 |
| CMRF-44 | 0.12% | 289 | 0.31% | 526 |
| CMRF-56 | 0.14% | 289 | 0.07% | 325 |
| EGF Receptor | 19.20% | 1086 | 62.60% | 3383 |
| fMLP Receptor | 0.03% | 259 | 0.03% | 335 |
| γδTCR | 0.02% | 266 | 8.62E−05 | 329 |
| HPC | 12.60% | 788 | 24.70% | 1427 |
| HLA-A.B.C | 100.00% | 39782 | 100% | 118043 |
| HLA-A2 | 0.05% | 345 | 0.03% | 368 |
| HLA-DQ | 1.63% | 395 | 3.19% | 704 |
| HLA-DR | 3.52% | 502 | 0.14% | 349 |
| HLA-DR.DP.DQ | 0.15% | 442 | 0.03% | 329 |
| Invariant NK T | 0.05% | 259 | 0.03% | 335 |
| Disialoganglioside GD2 | 1.45% | 286 | 4.46% | 398 |
| MIC A/B | 93.30% | 6875 | 80.00% | 4629 |
| NKB1 | 0.07% | 259 | 0.05% | 335 |
| SSEA-1 | 29.90% | 1163 | 0.40% | 349 |
| SSEA-4 | 100% | 407000 | 7.09% | 529 |
| TRA-1-60 | 99.10% | 158973 | 0.91% | 445 |
| TRA-1-81 | 99.10% | 155326 | 1.03% | 523 |
| Vβ 23 | 0.05% | 279 | 8.60E−05 | 372 |
| Vβ 8 | 0.14% | 496 | 0.05% | 342 |
| CD326 | 100% | 227647 | 52.80% | 2697 |
| CD49f | 99.80% | 46069 | 100.00% | 55511 |
| CD104 | 31.10% | 1529 | 99.70% | 21655 |
| CD120b | 0.91% | 492 | 0.06% | 415 |
| CD132 | 0.05% | 286 | 0.03% | 388 |
| CD201 | 81.50% | 4372 | 3.05% | 516 |

TABLE 3-continued data underlying FIG. 4

| | hESC | | RPE | |
|---|---|---|---|---|
| Surface Marker | % Positive | Median Fluorescent Intensity | % Positive | Median Fluorescent Intensity |
| CD210 | 0.11% | 276 | 9.36E−05 | 332 |
| CD212 | 0.06% | 259 | 0.07% | 342 |
| CD267 | 0.04% | 256 | 0.03% | 335 |
| CD294 | 0.06% | 263 | 0.03% | 342 |
| SSEA-3 | 92.40% | 11633 | 0.48% | 445 |
| Cutaneous Lymph. Anf. | 0.06% | 259 | 0.06% | 329 |
| Integrin β7 | 0.09% | 259 | 0.04% | 342 |

The analysis identified a set of markers that specifically label undifferentiated hPSCs, which will be useful to discriminate potential lingering undifferentiated cells during differentiation, and useful markers for early and mature RPE fate. Compiling the most promising results from both screenings, CD140b was identified as a marker of early as well as more mature hESC-RPE cells whereas GD2 and CD184 label alternative lineages in the early cultures. CD56 was found to be expressed in the early stages of hPSC-RPE cells, but to a lower degree than in the mature cultures.

Figure 5:
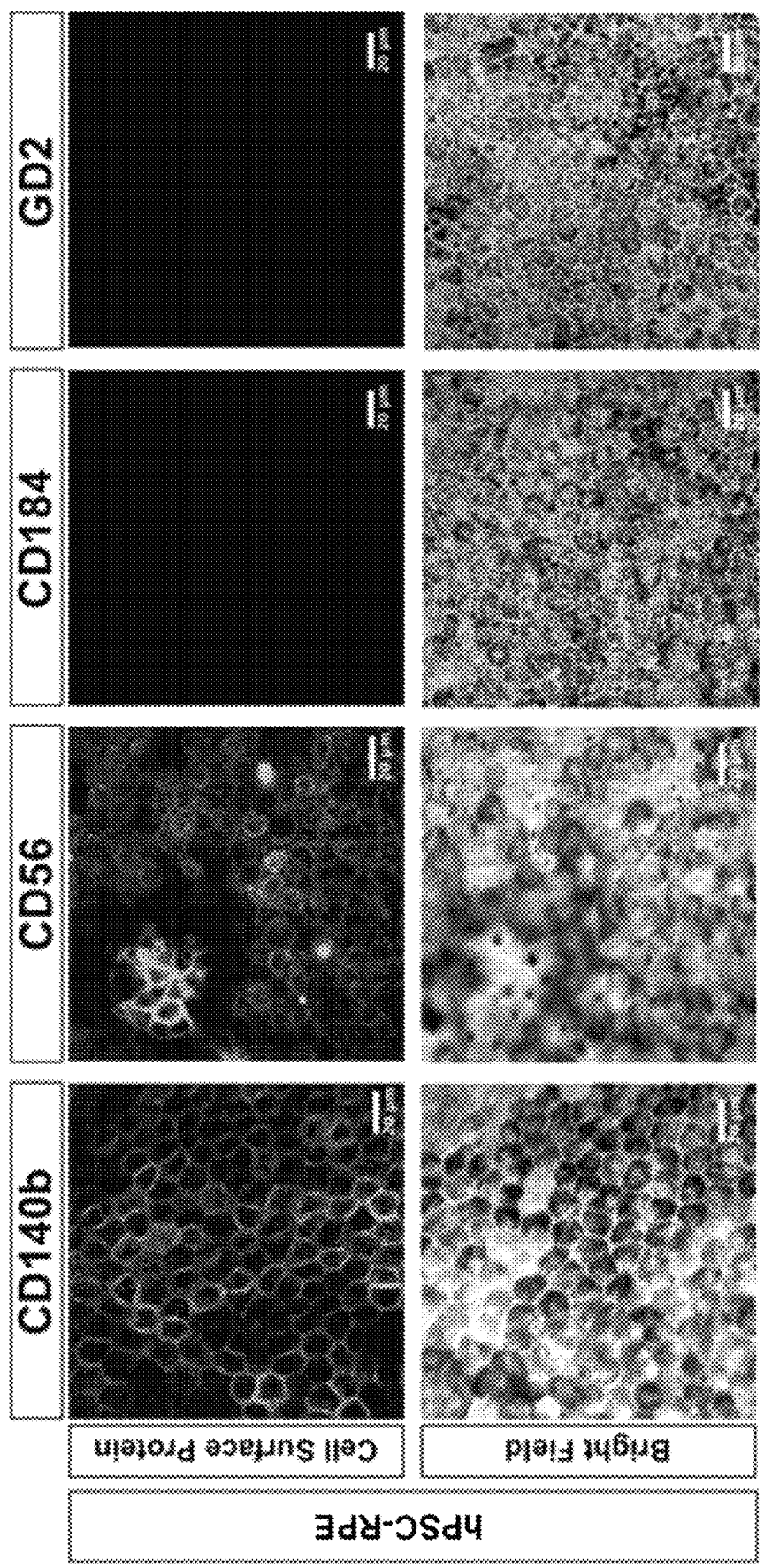
FIG. 5 is a set of representative immunostainings displaying the expression pattern of CD140b, CD56, CD184 and GD2 cell surface proteins in mature human PSC-derived RPE cells (hPSC-RPE cells). The top row is cell surface protein expression, and the bottom row is bright field pictures. The scale bar is 20 micrometers (μm).
Figure 6:
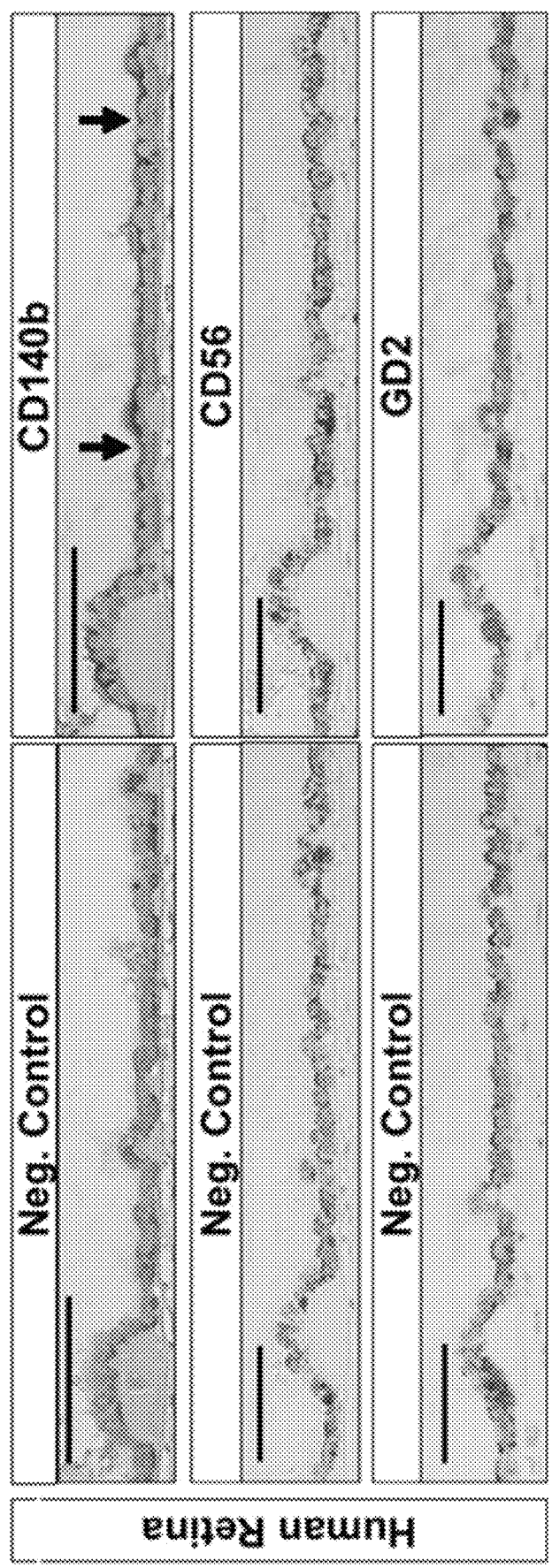
FIG. 6 is a set of immunohistochemistry pictures displaying the expression pattern of CD140b, CD56 and GD2 in a healthy human retina tissue section (right side). The left side is a negative control. The scale bar is 50 μm.
Figure 7:
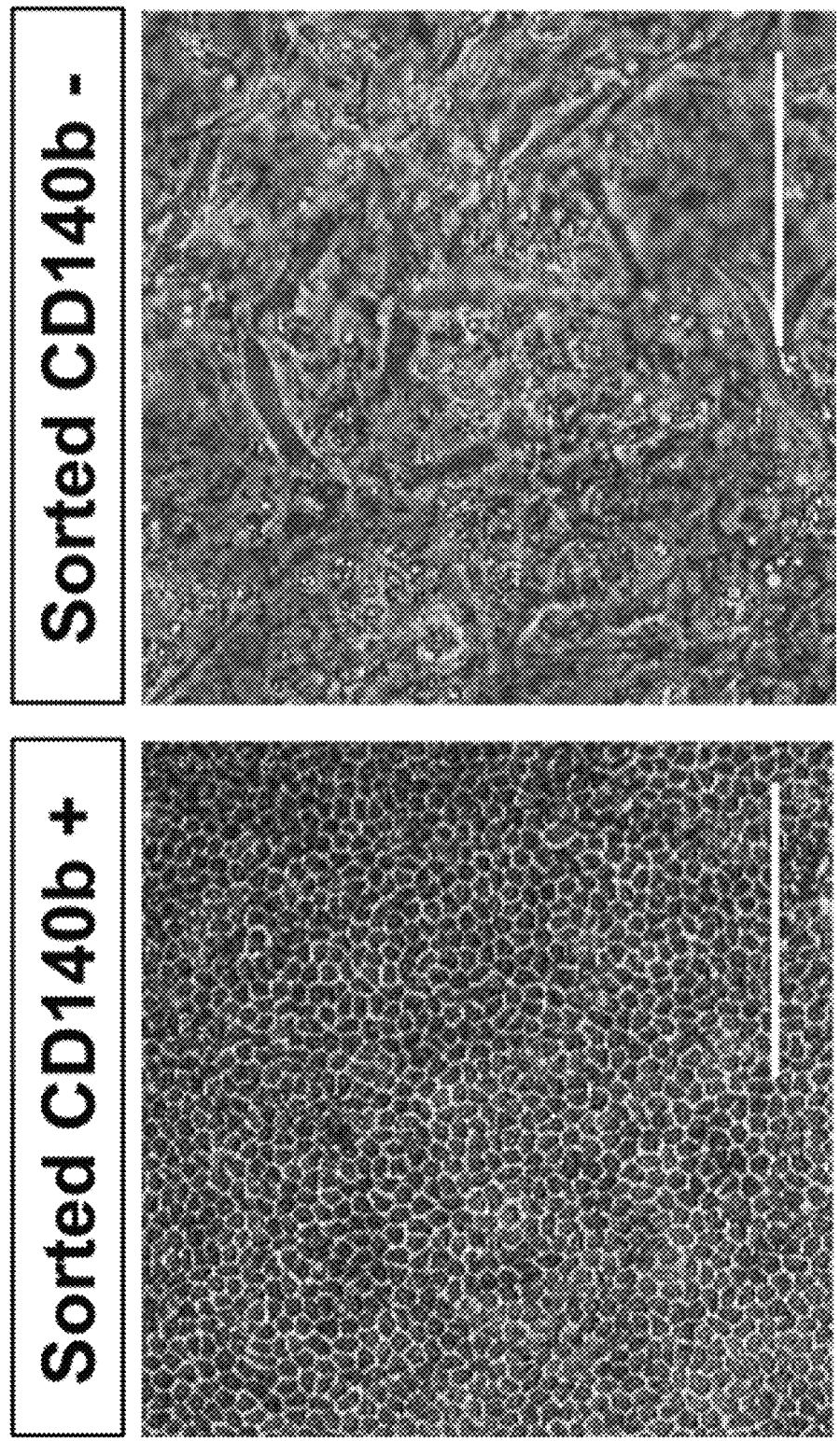
FIG. 7 is a set of two bright field pictures of cell cultures with CD140b positive and negative cells, sorted after 3 weeks of hPSC-RPE differentiation, using flow cytometry. Following isolation, the positive and negative cells were cultured for 30 days on LN-521. The CD140b+population is shown on the left and the CD140b− population is shown on the right. The scale bar is 100 μm.
Figure 26:
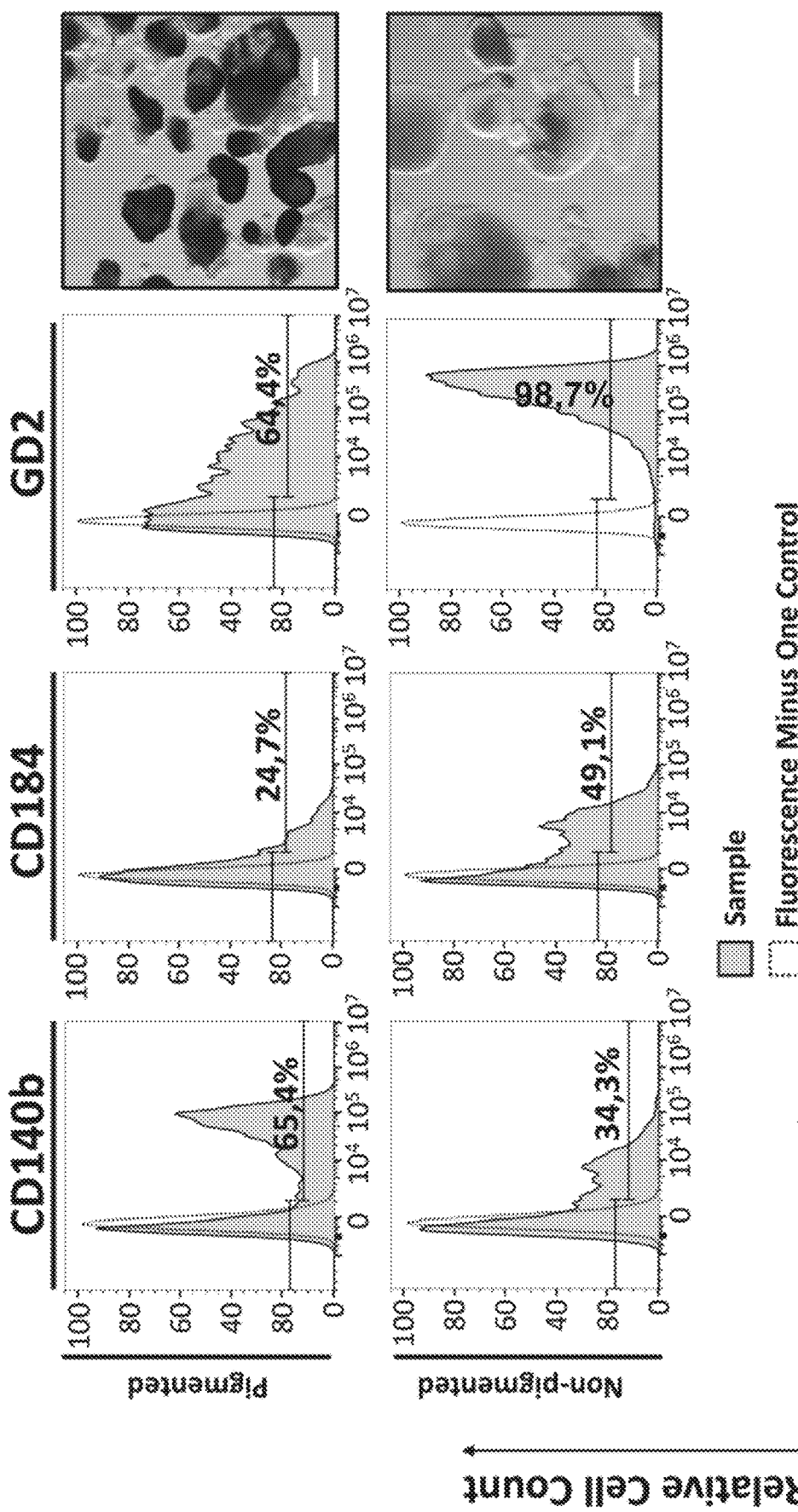
FIG. 26 shows flow cytometry analysis of expression of CD140b, CD184 and GD2 in the pigmented and non-pigmented fractions of the EBs after 30 days of differentiation. Representative bright field pictures depicting the pigmented and non-pigmented fractions of the EBs that were analyzed by flow cytometry. The y-axis shows the relative cell count on a scale of 0-100. The x-axis represents the marker expression on a logarithmic scale.
Figure 27:
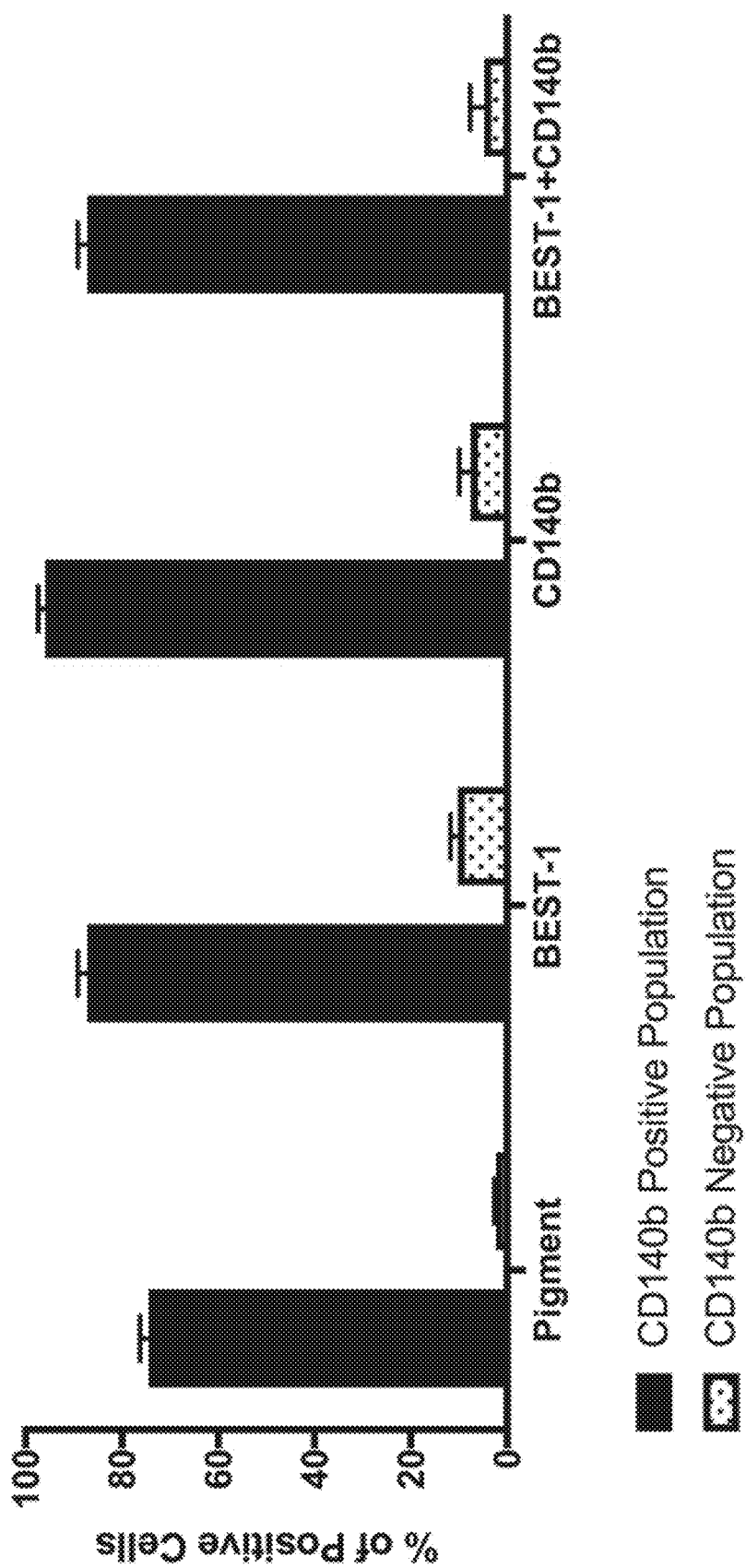
FIG. 27 shows the percentage of cells being positive for pigment, BEST-1, CD140b and double positive for BEST1 and CD140b in FACS sorted CD140b positive and negative populations.

In agreement with this finding, CD140b proved to be more restricted to the dissected pigmented OVs over the remaining non-pigmented EB structures, whereas GD2 and CD184 were detected at higher levels in the non-pigmented structures (FIG. 26). Additionally, CD140b positive cells were present in mature hESC-derived RPE cell (hESC-RPE) cultures while GD2 and CD184 expressing cells were completely absent, as immunofluorescence staining confirmed in hESC-RPE cells in culture (FIG. 5). Histology of transplanted hESC-RPE into albino rabbit subretina showed apical expression of CD140b on pigmented and basal BEST1 positive hESC-RPE cells. The apical expression of CD140b was also confirmed by immunohistochemistry in adult human RPE (FIG. 6) in agreement with known expression pattern in the mouse. Functionally, it was seen that after cell sorting using flow cytometry, only the CD140b positive, but not the negative cell fraction of early differentiations, expanded into hESC-RPE cells with cobblestone and homogeneous morphology, evidencing that this cell surface marker selectively captures the early hESC-RPE cells during in vitro differentiation (FIG. 7).

In conclusion, several markers were identified that could be used to distinguish differentiated RPE cells from non-differentiated cells.

Example 2: Monolayer Differentiation on Human Recombinant Laminin Potently Increase RPE Differentiation Compared to Suspension Culture hESCs were plated at a cell density of $2.4 \times 10^4$ cells/cm$^2$ on LN-111 and LN-521 substrates and evaluated 30 days after plating. Prominent pigmentation was observed on both substrates (data not shown). In agreement with previous studies suggesting that Activin A is a potent retinal fate inducer, a significant increase of pigmentation together with corresponding transcriptional maturation towards RPE fate with addition of Activin A was observed (data not shown).

Flow cytometry analysis using the new markers derived from Example 1 supported this result with increased CD140b positive fraction from approximately 40% to 90% with Activin A addition on both substrates (data not shown).

Next, monolayer differentiation was compared to previously established suspension differentiation as EBs prepared as in Plaza-Reyes et al, supra.

Figure 8:
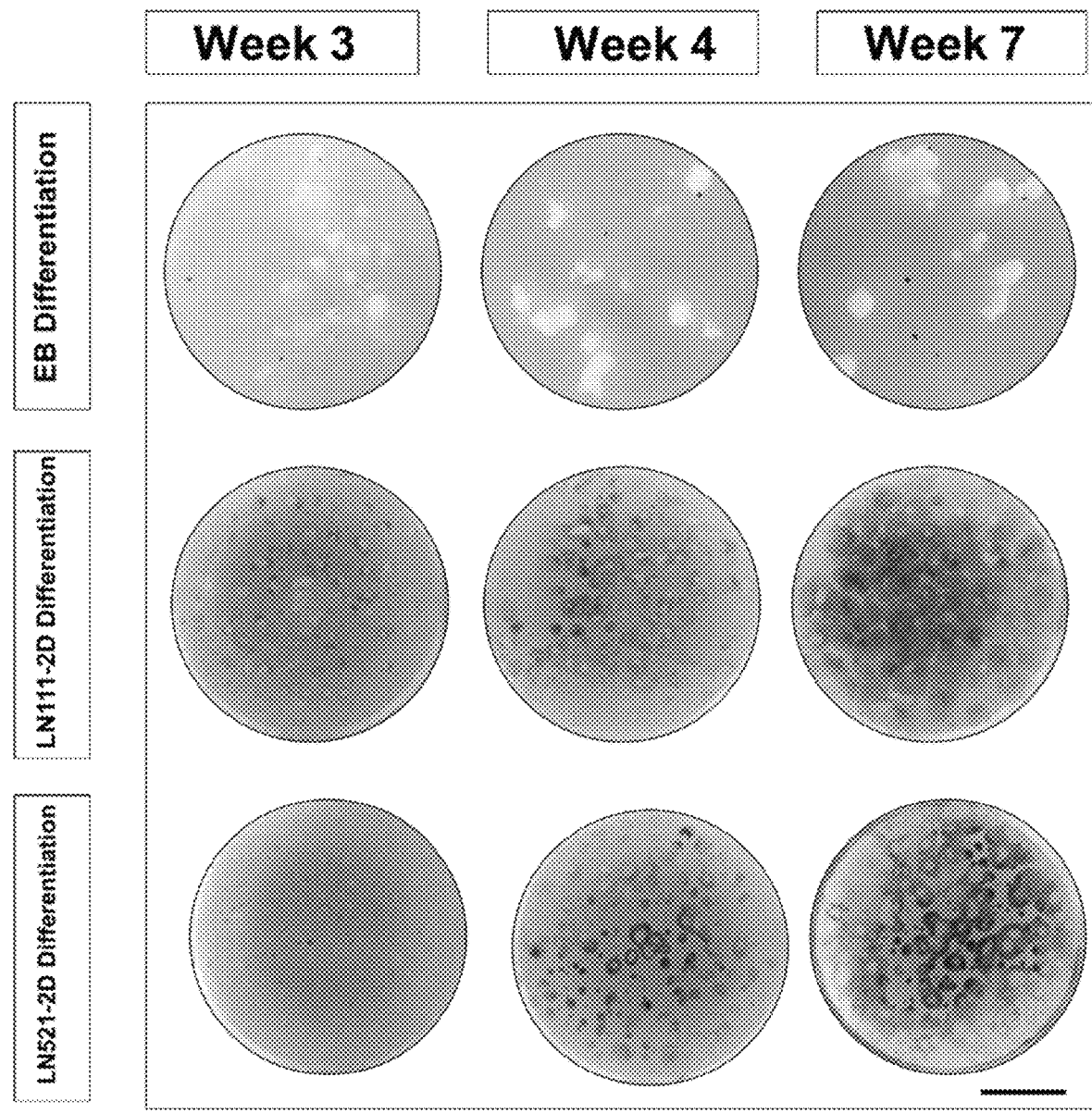
FIG. 8 is a set of nine bright field pictures showing the progression of differentiation of RPE cells on various substrates. The three columns are weeks 3, 4, and 7. The three rows are, from top to bottom, on embryoid bodies (EB), on LN-111, and on LN-521.

Monolayer culture on LN-111 or LN-521 efficiently supported the initial induction of RPE fate from the undifferentiated pluripotent state. In three weeks, these cultures generated robust pigmentation and induction of RPE markers genes at levels clearly surpassing the EB differentiation protocol, while both showed strong reduction of pluripotency markers (FIG. 8 and FIGS. 9A-9F). While suspension EB cultures did generate some pigmented structures as described before, the monolayers were dominated by pigmented cells at the end of 7 weeks of differentiation (FIG. 8).

Figure 9A:
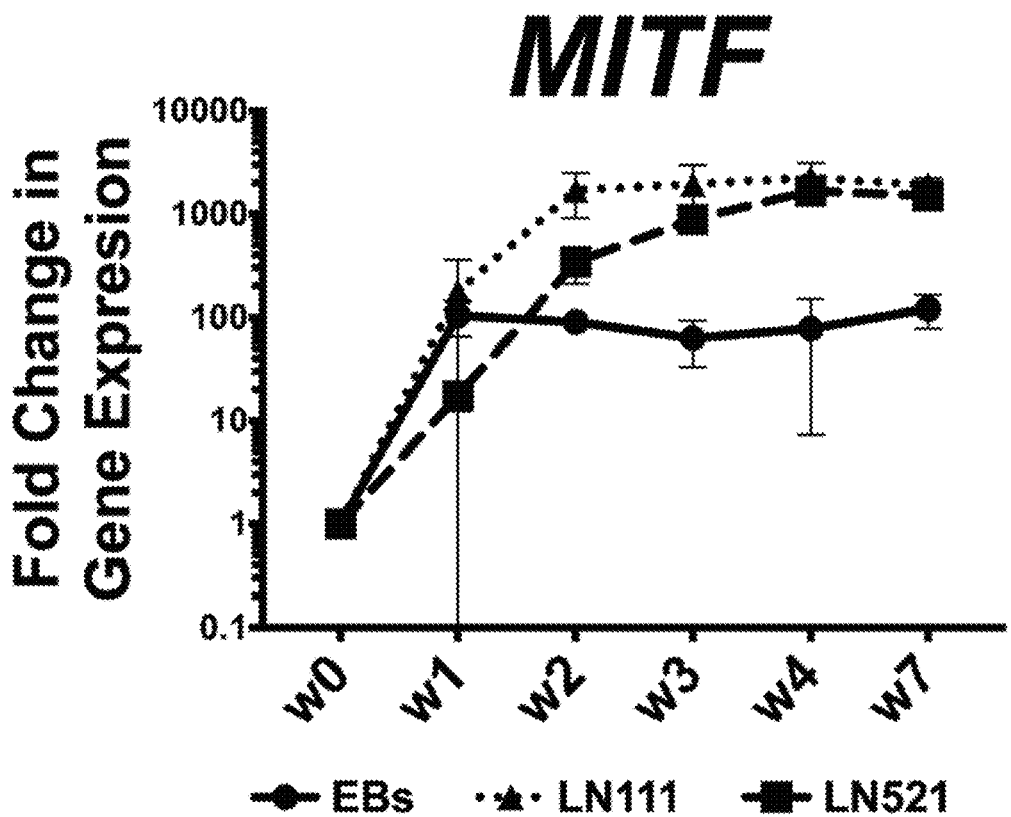
FIGS. 9A-9F are graphs showing the gene expression analysis of RPE, pluripotent, and neural specific genes on the three substrates of FIG. 8. In all graphs, EB is indicated with solid line and circles, LN-521 is indicated with dash-dot line and squares, and LN-111 is indicated with dashed line and triangles. For all graphs, the y-axis is fold change in expression, and is logarithmic.
Figure 9B:
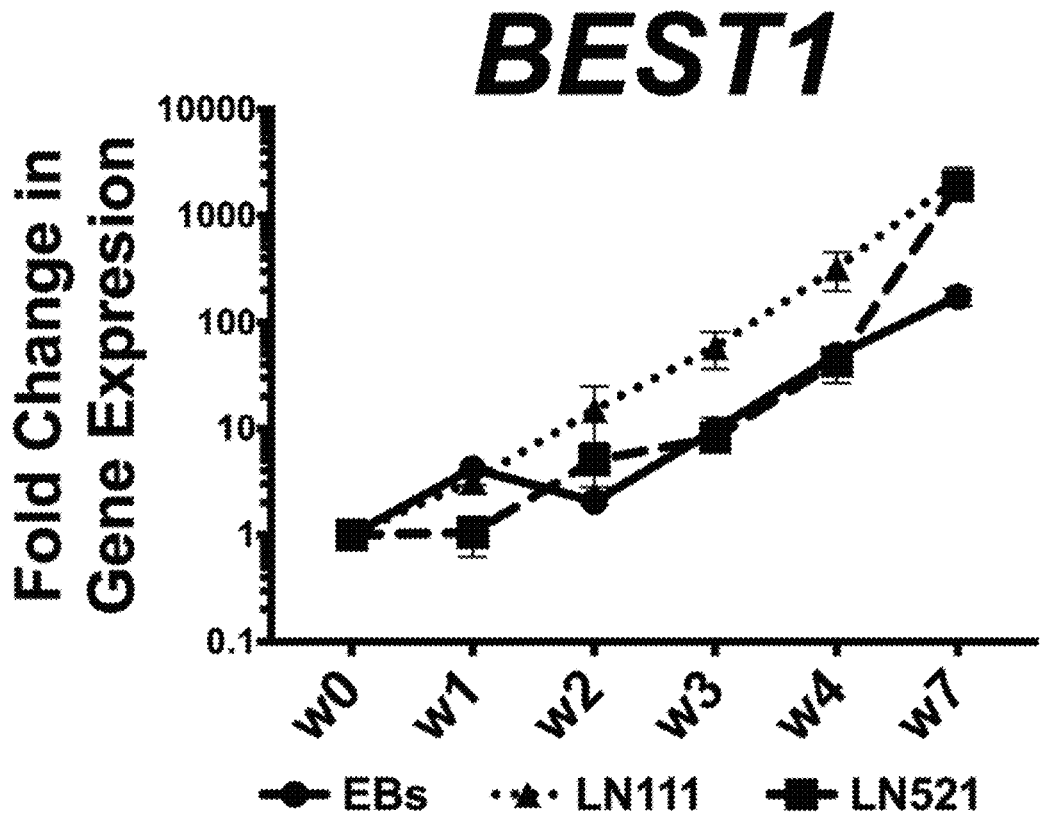
Figure 9C:
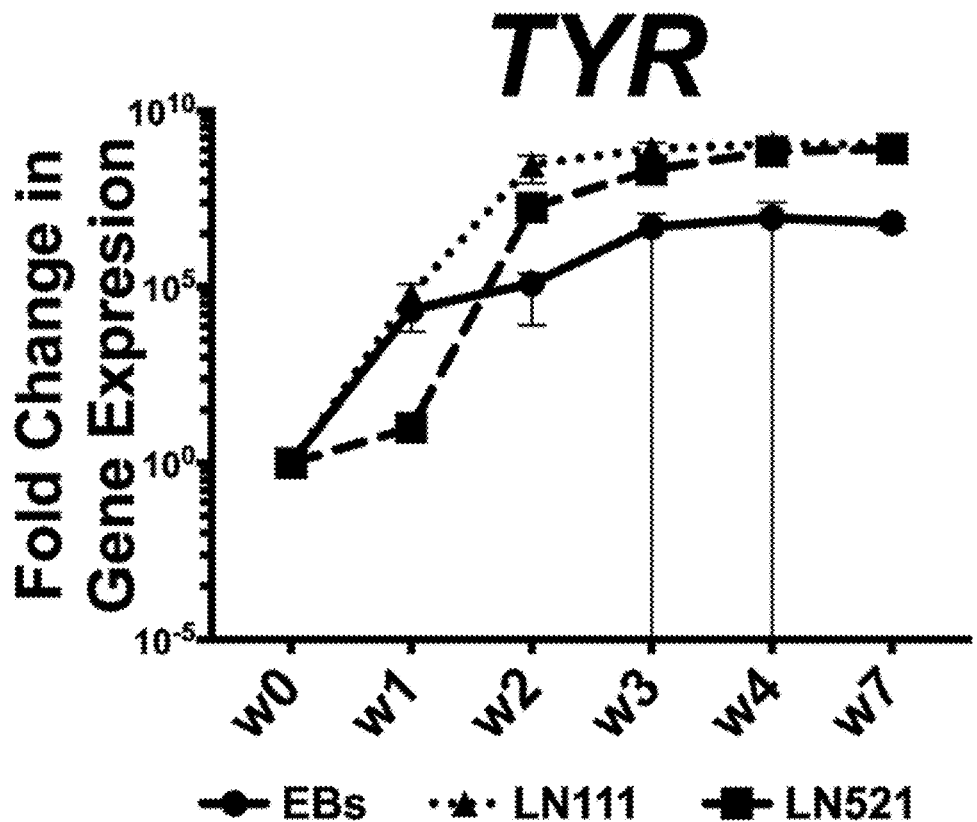
Figure 9D:
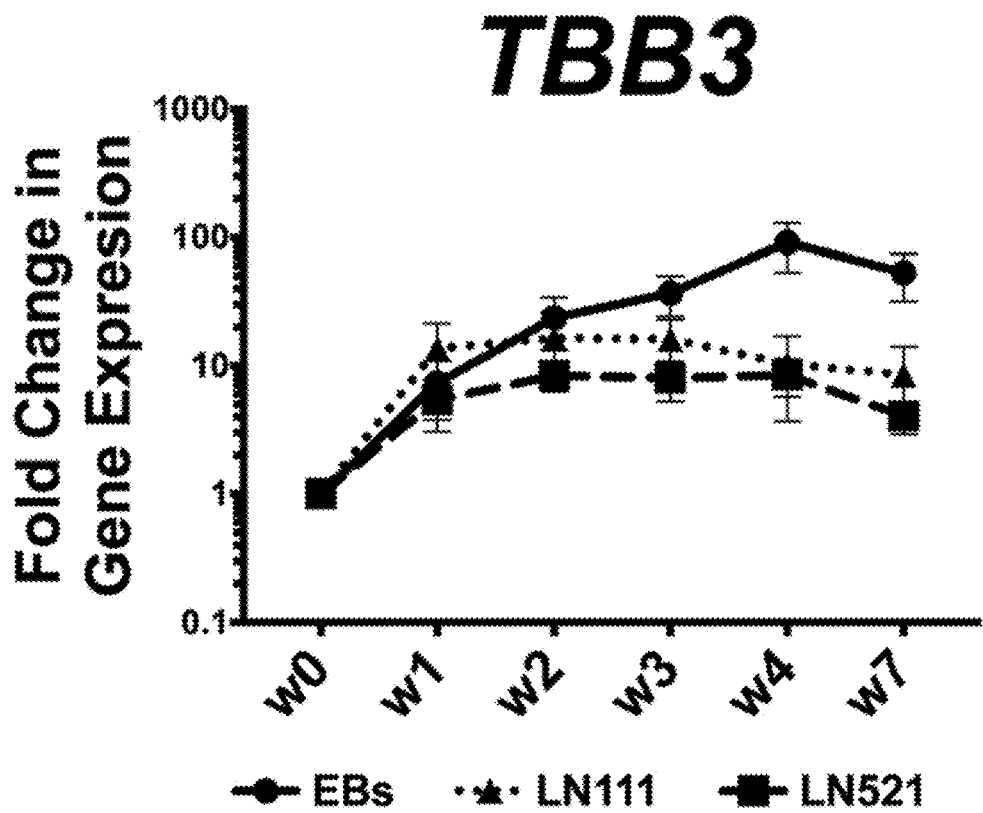
Figure 9E:
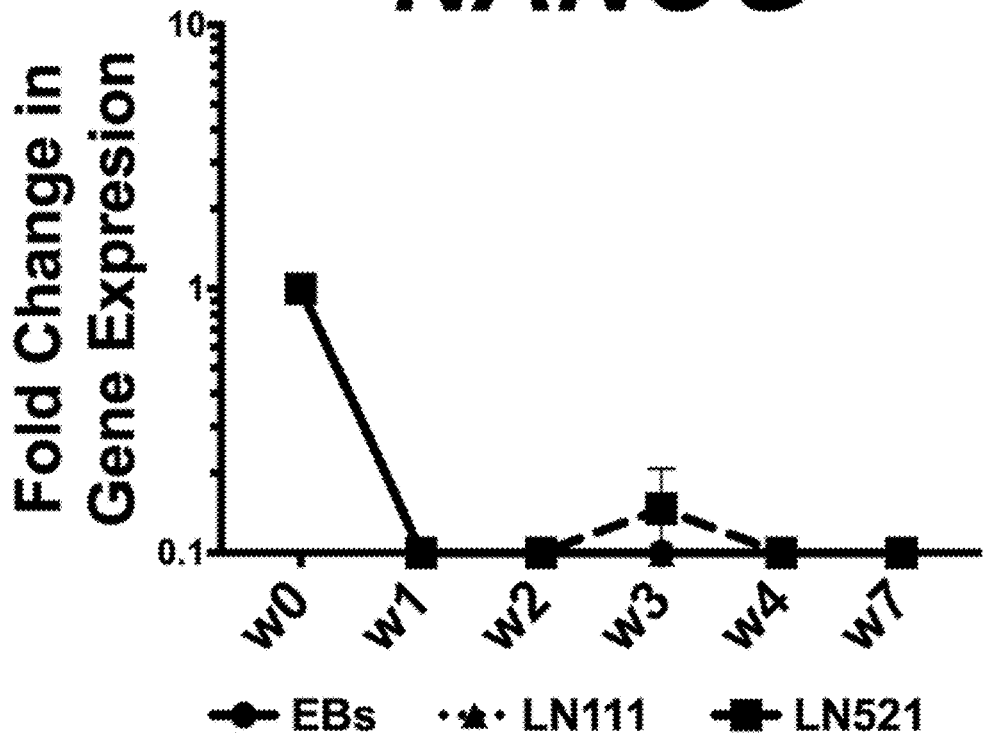
Figure 9F:
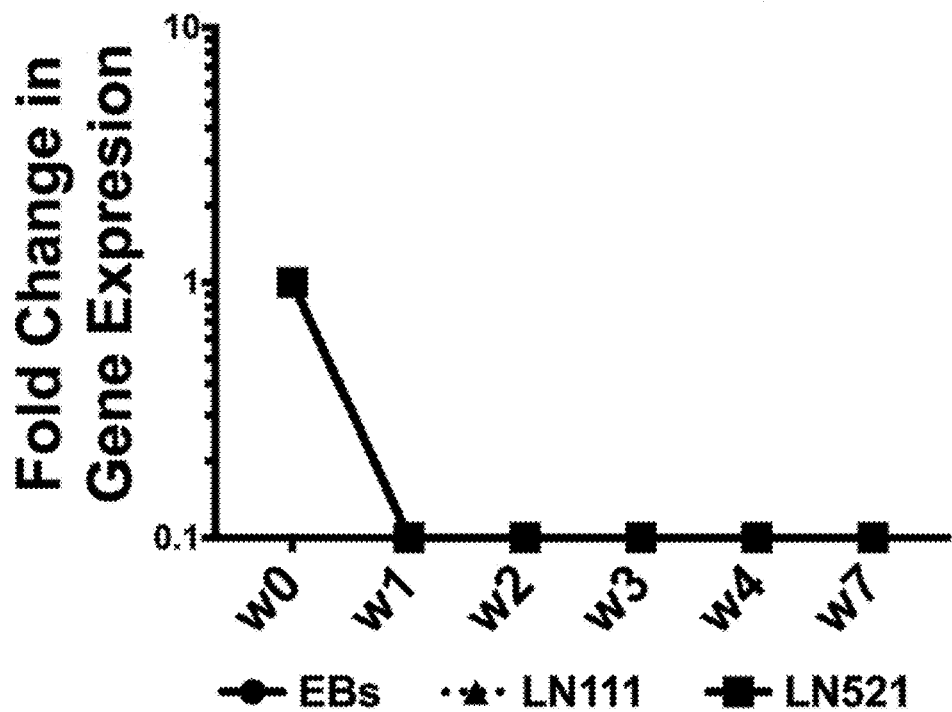

The strong RPE induction was further validated by measuring gene expression for various RPE markers (FIG. 9A-C).

LN-111 generally induced pigmentation and RPE markers faster, but LN-521 caught up between 4 and 7 weeks. The expression of pluripotency marker TRA-1-60 (FIG. 11A) was strongly reduced over time, supporting the conclusion that robust differentiation occurred.

Figure 10:
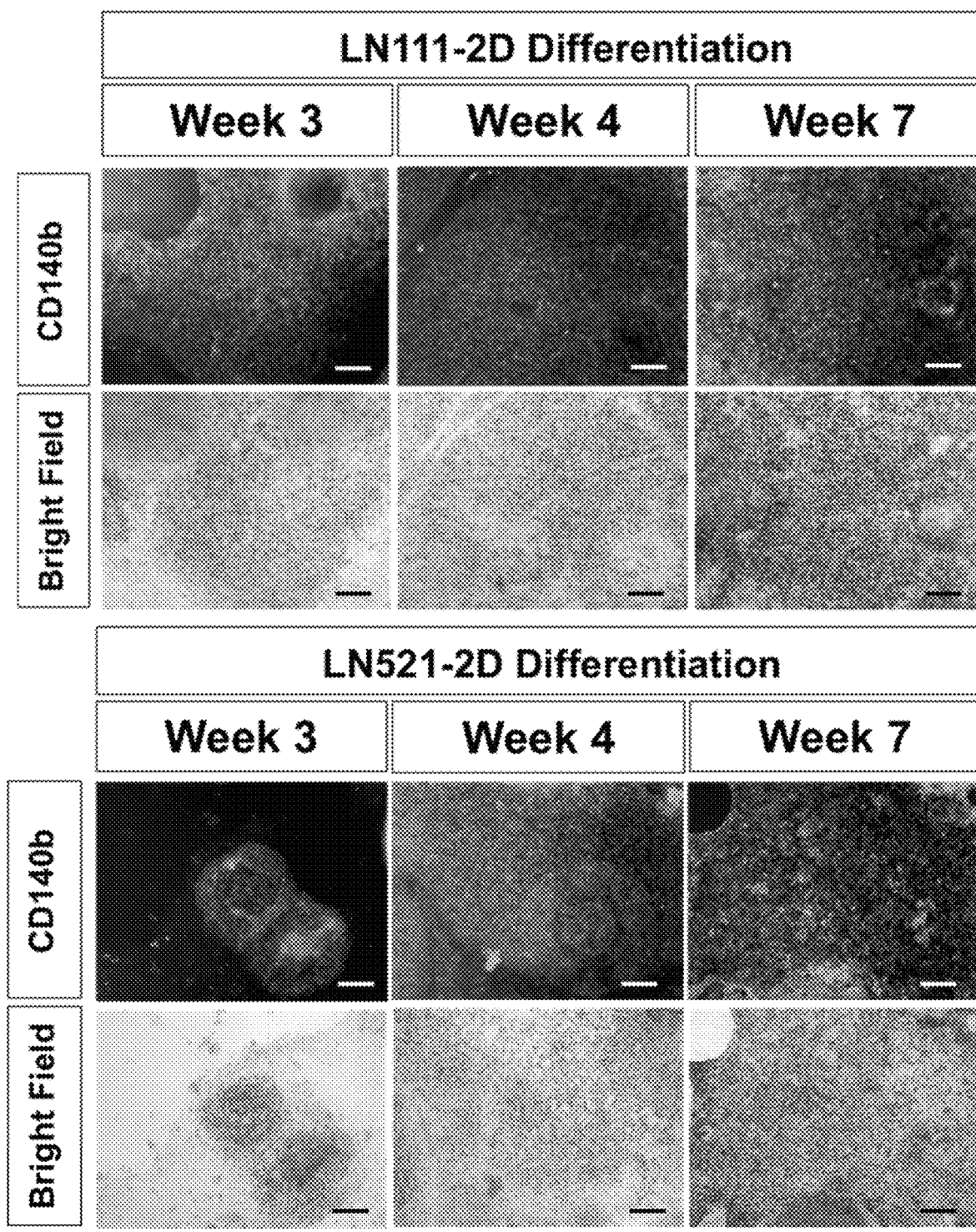
FIG. 10 is a set of 12 immunofluorescence and bright field pictures showing the increase of CD140b expression and pigmentation level during RPE differentiation on laminin-521 and laminin-111. The three columns are for weeks 3, 4, and 7 of differentiation. The top row is for CD140b expression on LN-111. The second row is bright field pictures on LN-111. The third row is for CD140b expression on LN-521. The bottom row is bright field pictures on LN-521. The scale bar is 100 μm.
Figure 11A:
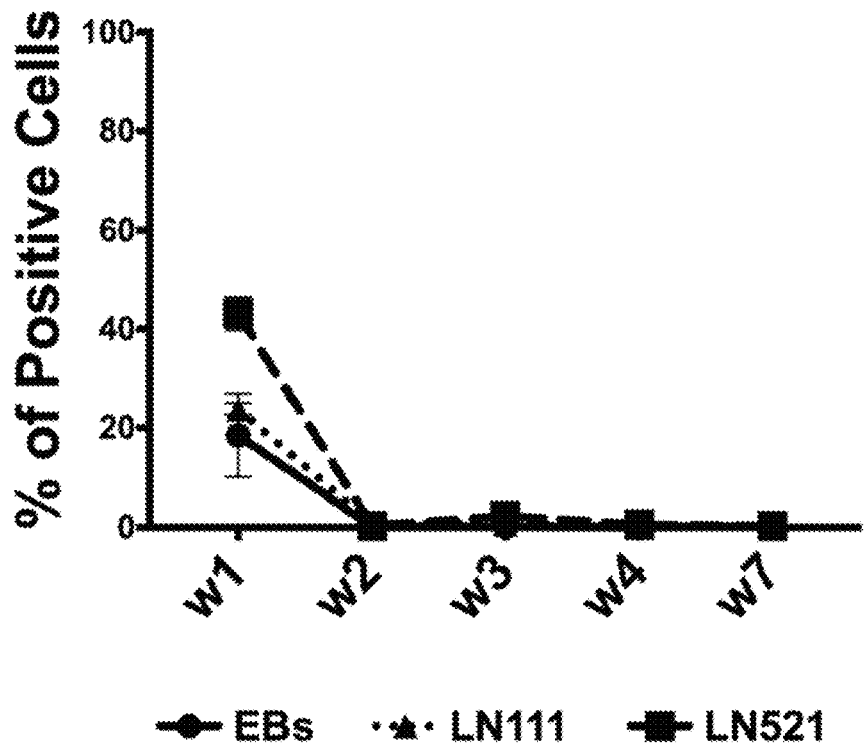
FIGS. 11A-11C are graphs showing the percentage of positive cells for certain surface markers measured by flow cytometry during the RPE differentiation upon the three different substrates tested (EB, LN-521 and LN-111). The bars represent mean±SEM from three independent experiments. In all graphs, EB is indicated with solid line and circles, LN-521 is indicated with dash-dot line and squares, and LN-111 is indicated with dashed line and triangles. In all graphs, the y-axis runs from 0% to 100% in increments of 20%. The x-axis is in weeks, and includes weeks 1, 2, 3, 4, and 7.
Figure 11B:
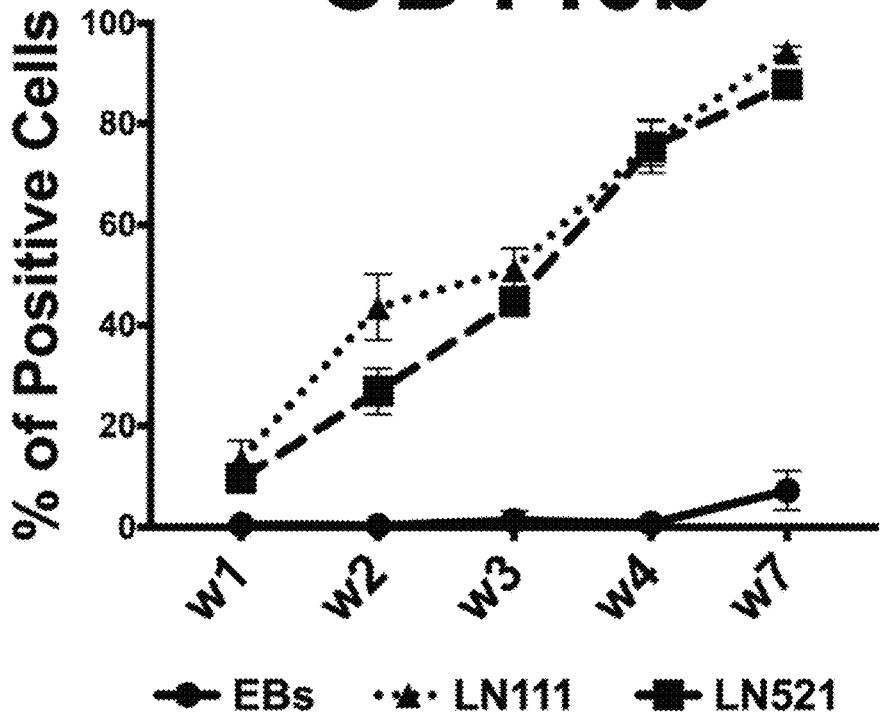
Figure 11C:
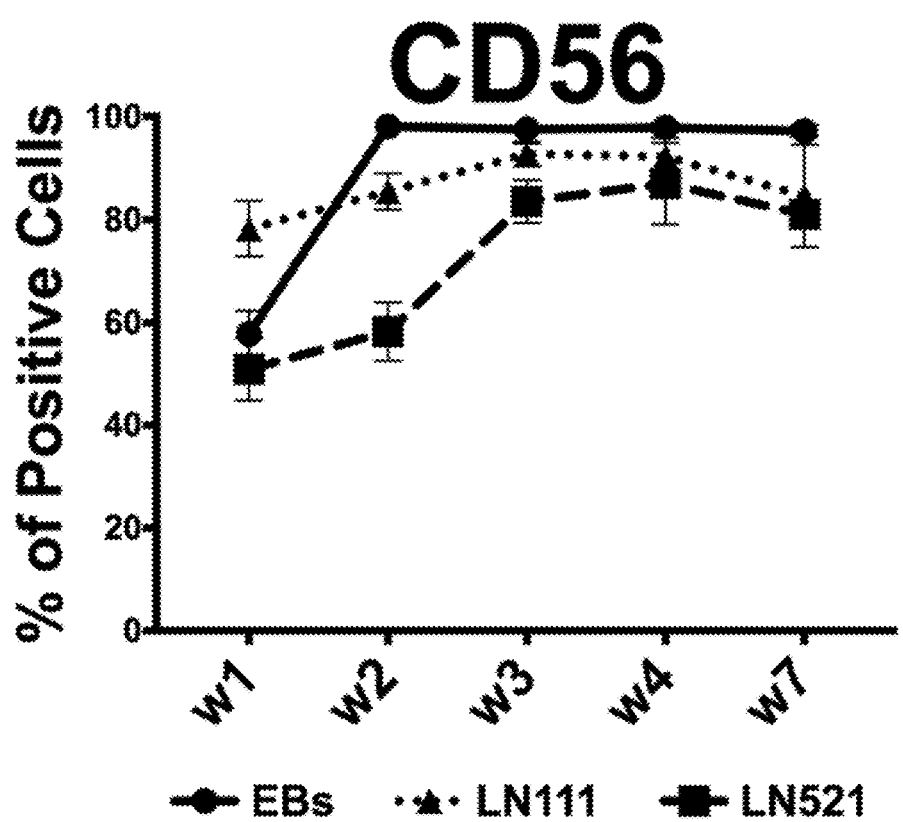

This increase was mirrored in CD140b protein expression through time (FIG. 10). Evaluating purity based on pigmented cells is difficult, particularly in EB cultures, but quantification of CD140b positive cells indicated that EB cultures contain approximately 10% of prospective RPE cells while the monolayer laminin cultures reached levels of 90% (FIGS. 11A-11C). Additionally, transcriptional dynamics showed approximately ten times increase in RPE associated transcripts such as MITF, BEST1 and TYR while reducing expression of neuronal transcript TBB3 on both laminins compared to suspension EB differentiation (FIGS. 9A-9F).

Replating Following Initial hESC-RPE Induction Gives High Yield of Pure, Homogeneous and Functional hESC-RPE Cells As the laminin monolayer cultures were permissive for hESC-RPE differentiation with >80% of the cells being CD140b positive at 4 and 7 weeks, it was explored whether a purer final hESC-RPE product could be achieved by introducing a replating strategy. This would eliminate the need for manual dissection of pigmented cells, which is a very labor-intensive procedure that introduces variation and contamination risks in the production process.

Following 30 days of hESC-RPE monolayer differentiation on hrLN-111 or hrLN-521 the cultures were dissociated to single cell suspension and plated them on hrLN-521 at four different dilutions 1:1 ($1.4 \times 10^6$ cells/cm$^2$), 1:20 ($7 \times 10^4$ cells/cm$^2$), 1:50 ($2.8 \times 10^4$ cells/cm$^2$) and 1:100 ($1.4 \times 10^4$ cells/cm$^2$) (See FIG. 35 for a schematic illustration).

Figure 12:
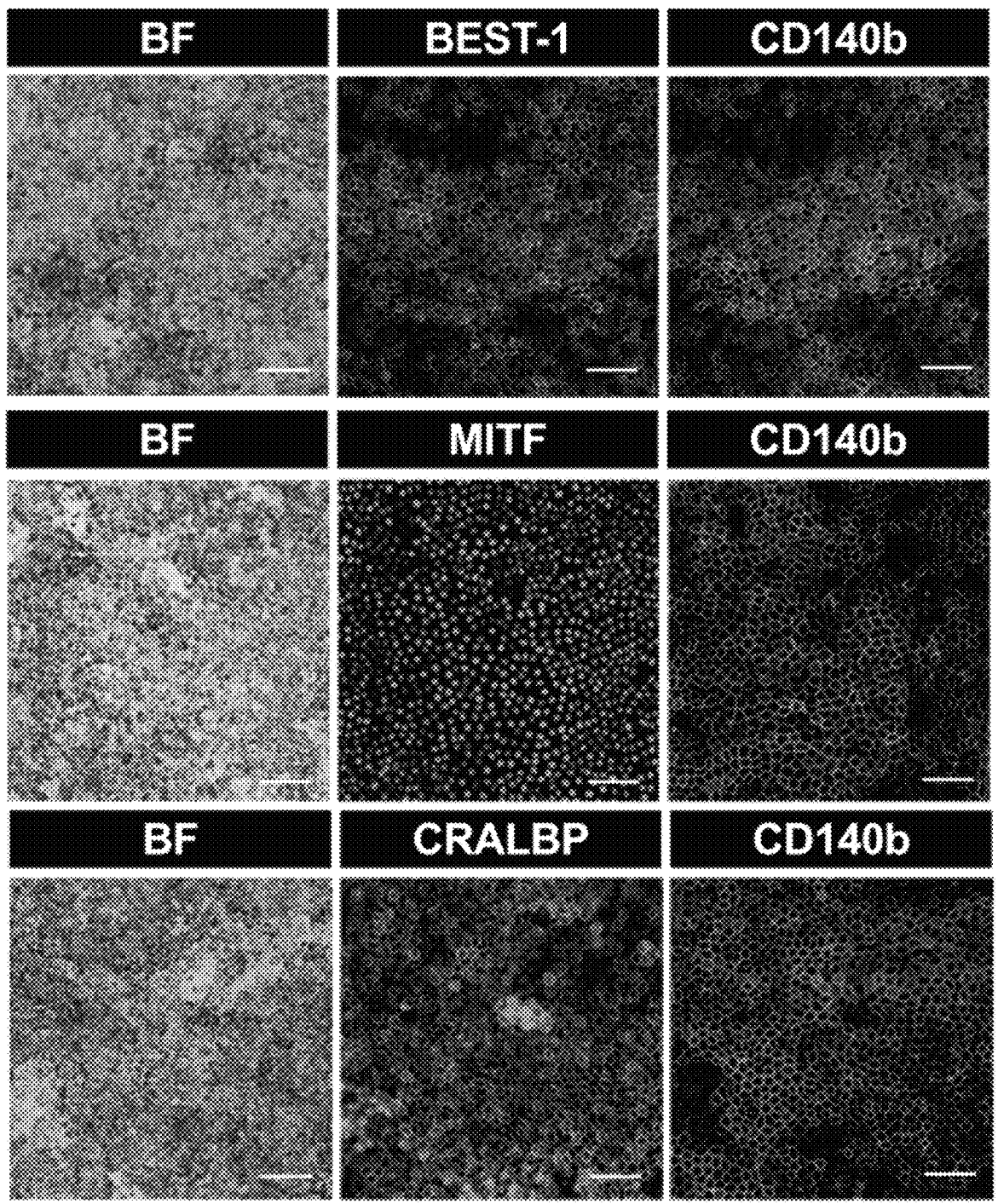
FIG. 12 is a set of three bright field pictures showing pigmentation of the hPSC-RPE cells and six immunofluorescence stainings showing the expression of three RPE specific markers (BEST1, MITF and CRALBP). The pictures are taken at day 30 after the RPE cultures have been replated at a cell density of $7 \times 10^4$ cells/cm$^2$ onto a laminin-521 substrate.
Figure 13A:
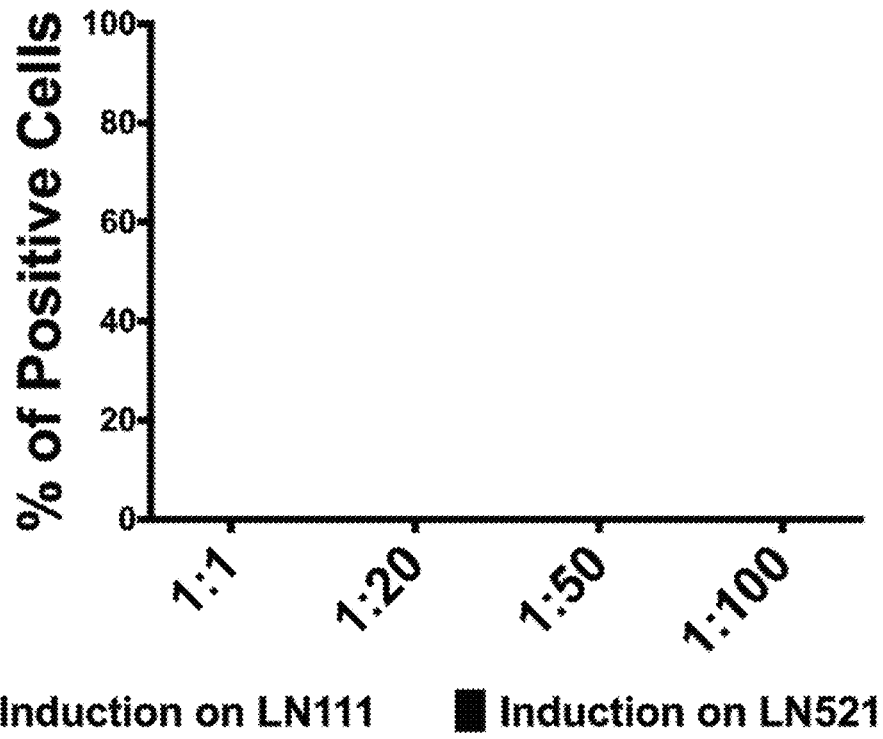
FIG. 13A and FIG. 13B are graphs comparing flow cytometry results for the resulting RPE cultures, depending on whether the cultures were induced on LN-111 or LN-521 substrate. The flow cytometry was performed four weeks after re-plating of the RPE cultures onto LN-521 at four different cell density ranges of: $1.4 \times 10^6$ cells/cm$^2$ (1:1), $7 \times 10^4$ cells/cm$^2$ (1:20), $2.8 \times 10^4$ cells/cm$^2$ (1:50), and $1.4 \times 10^4$ cells/cm$^2$ (1:100).
Figure 13B:
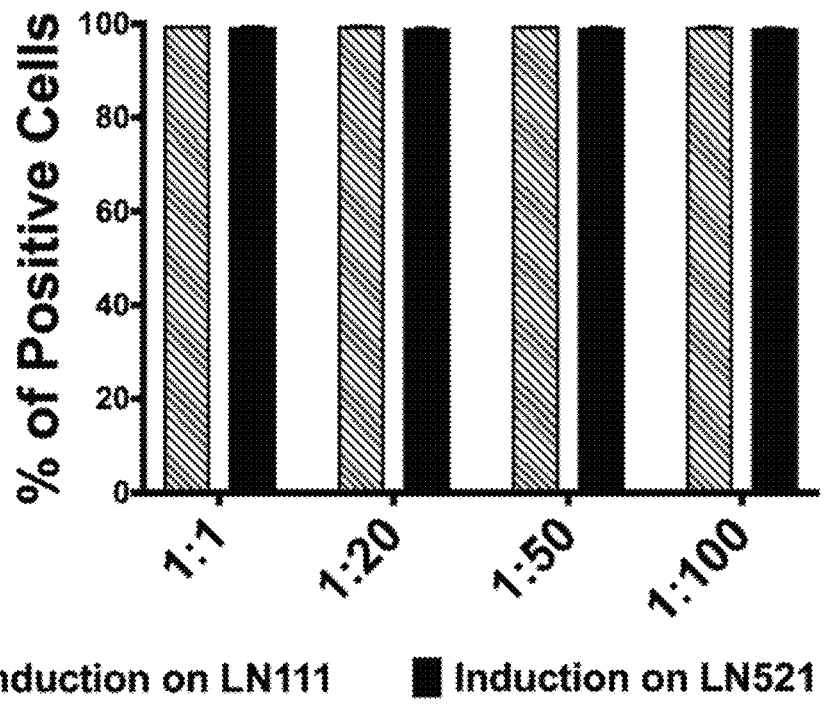
Figure 14A:
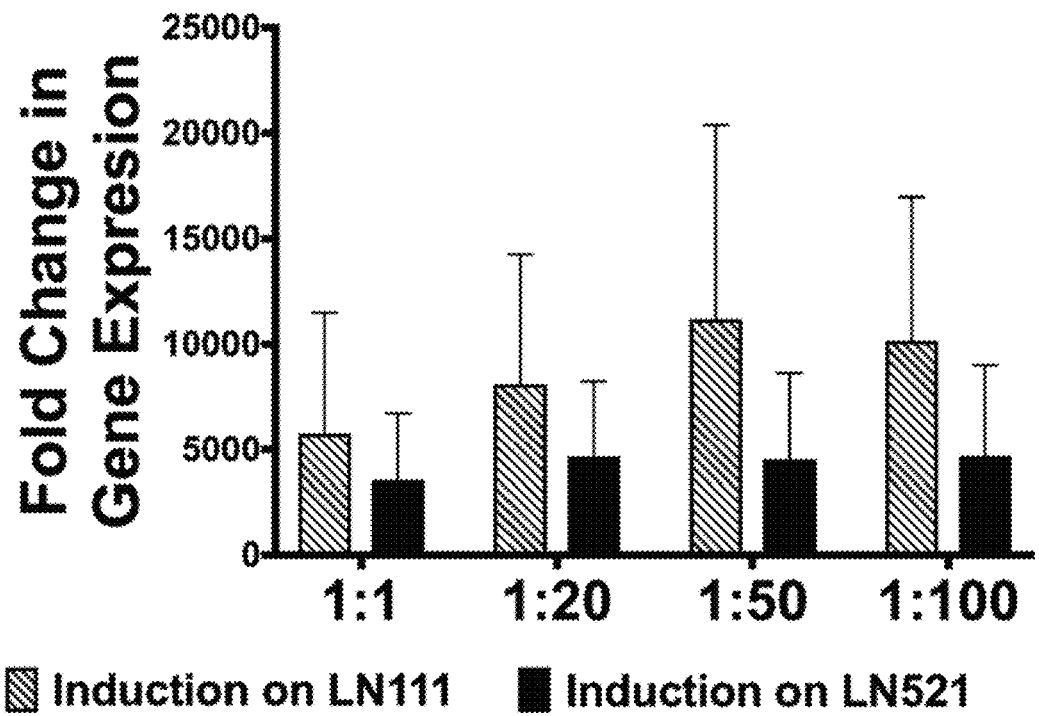
FIGS. 14A-14F are graphs showing gene expression analysis of RPE, pluripotent, and neural specific genes, depending on whether the cultures were induced on LN-111 or LN-521 substrate and their replating at four different cell density ranges of: $1.4 \times 10^6$ cells/cm$^2$ (1 to 1), $7 \times 10^4$ cells/cm$^2$ (1 to 20), $2.8 \times 10^4$ cells/cm$^2$ (1 to 50), and $1.4 \times 10^4$ cells/cm$^2$ (1 to 100). Values are normalized to GAPDH and displayed as relative to undifferentiated hPSC. The y-axis for all graphs is fold change in expression.
Figure 14B:
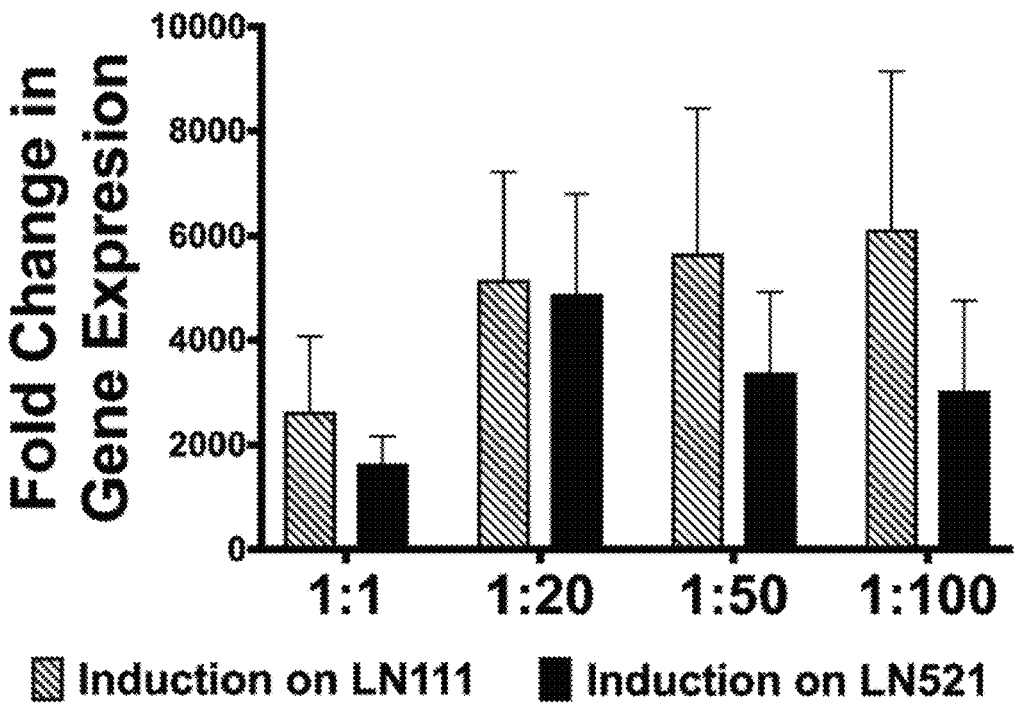
Figure 14C:
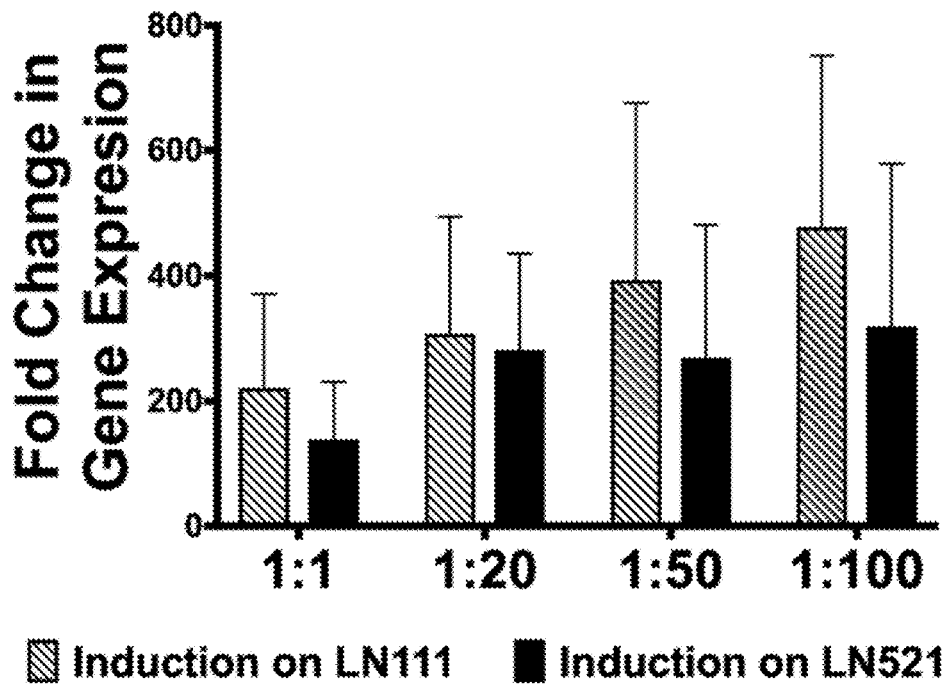
Figure 14D:
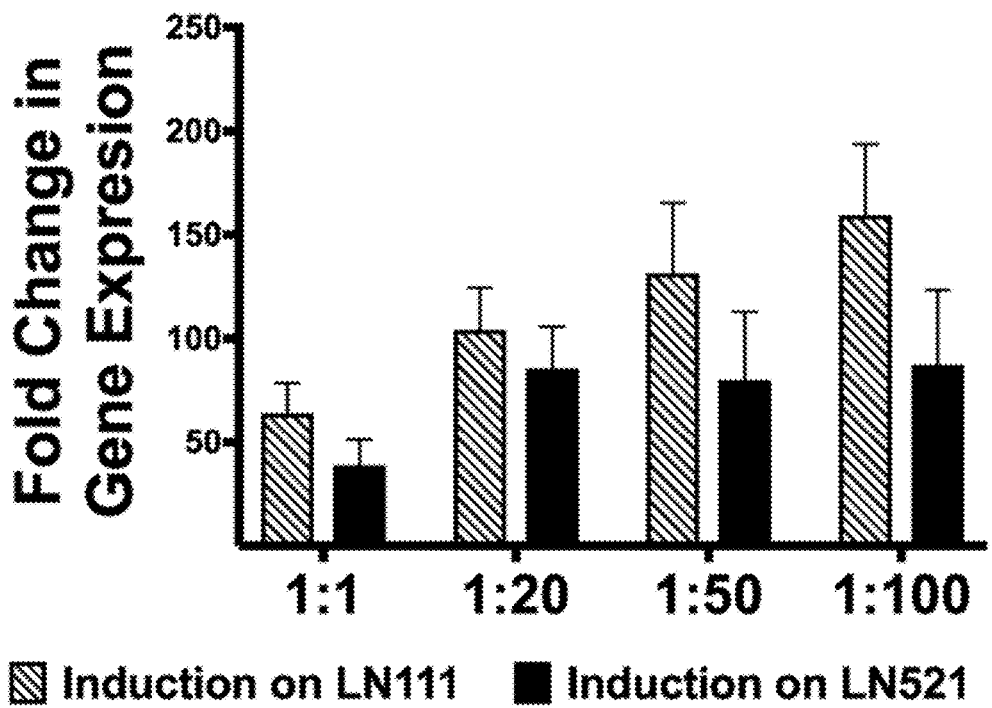
Figure 14E:
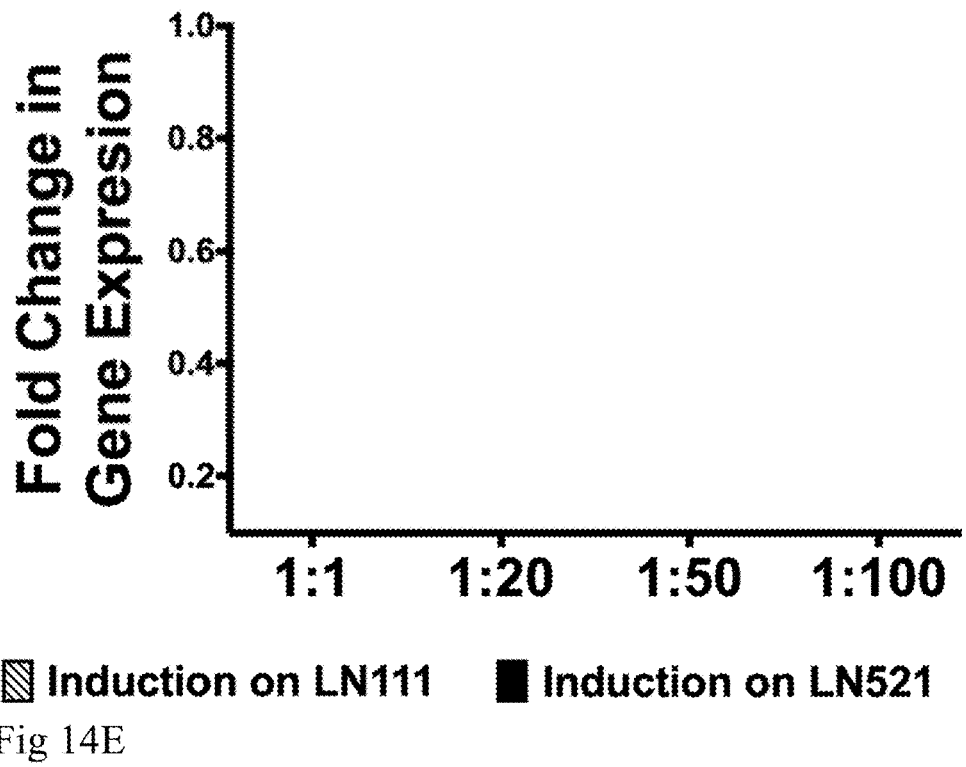
Figure 14F:
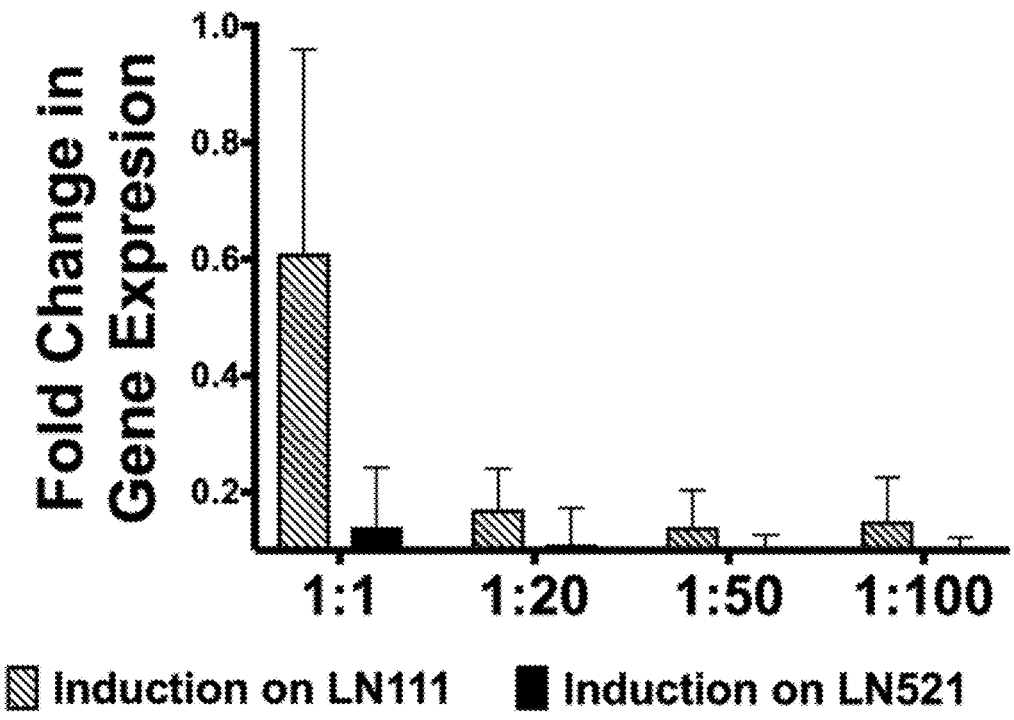

Following an additional 30 days we observed robustly pigmented cultures of hexagonal epithelial cells that also expressed BEST1, MITF and CRALB (FIG. 12). Flow cytometry analysis showed homogenous cultures of hESC-RPE, now with >99% of the cells being CD140b positive and TRA-1-60 negative (FIGS. 13A-13F). Transcriptional analysis also showed robust induction of RPE-related markers such as MITF, BEST1, RPE65 and down-regulation of pluripotent transcripts NANOG and POU5F1 (latter also known as OCT-4) with similar patterns in all dilutions independently of the initial laminin coating (FIGS. 14A-15B).

Figure 15A:
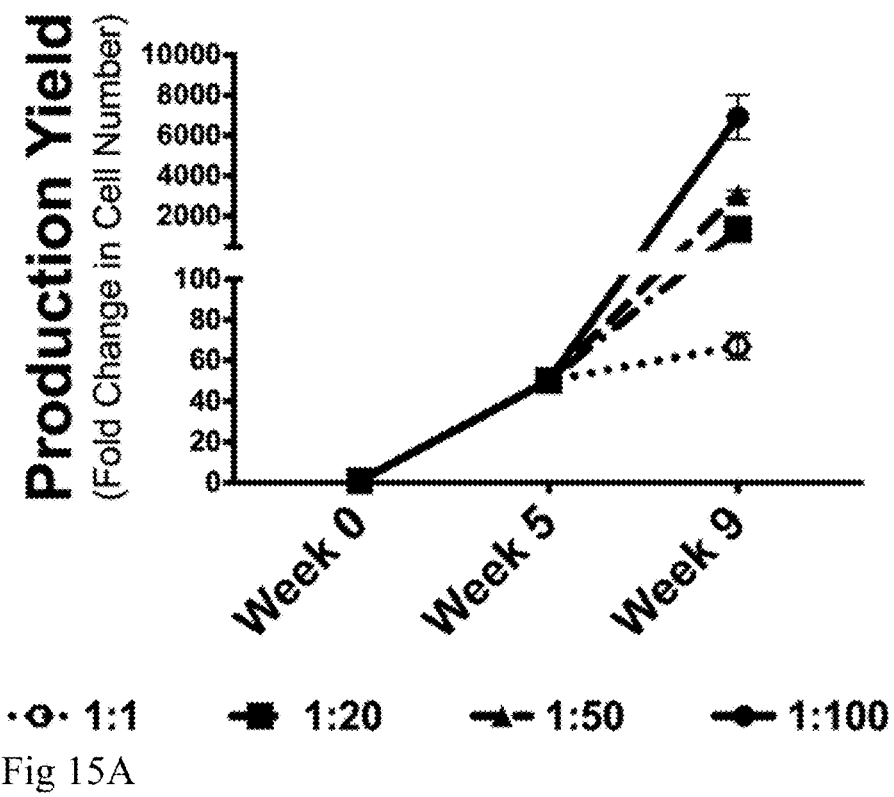
FIG. 15A and FIG. 15B show the relative cell yield during the differentiation protocol at various re-plating densities of 1:1 (dotted line, hexagons), 1:20 (dash dot line, squares), 1:50 (dashed line, triangles), and 1:100 (solid line, circles) at weeks 0, 5, and 9. Week 0 is the start of differentiation.
Figure 15B:
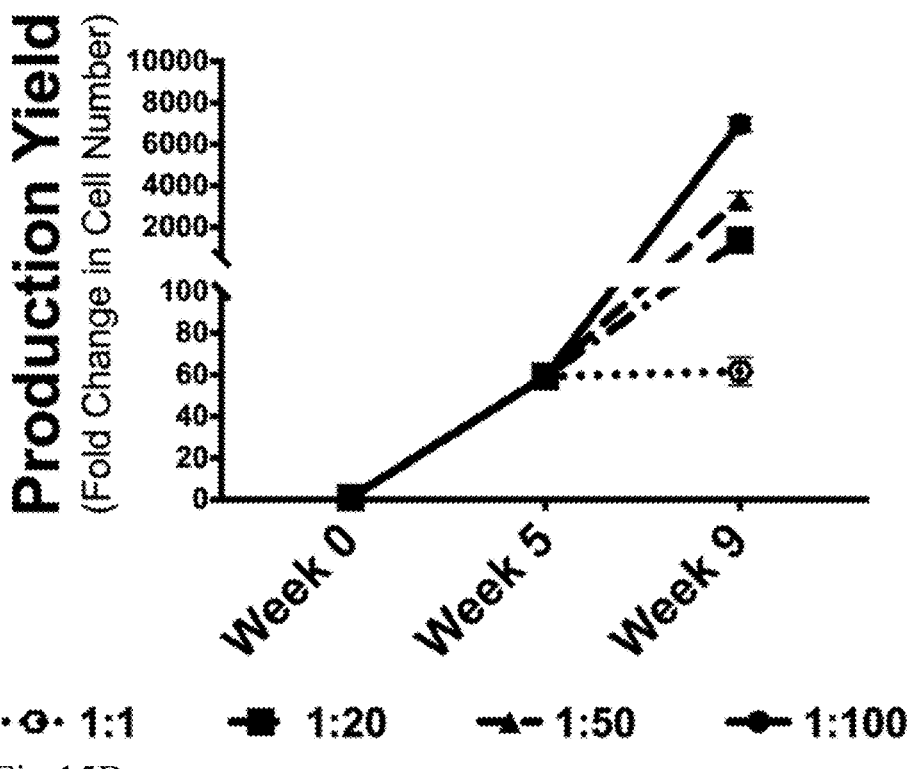
Figure 16A:
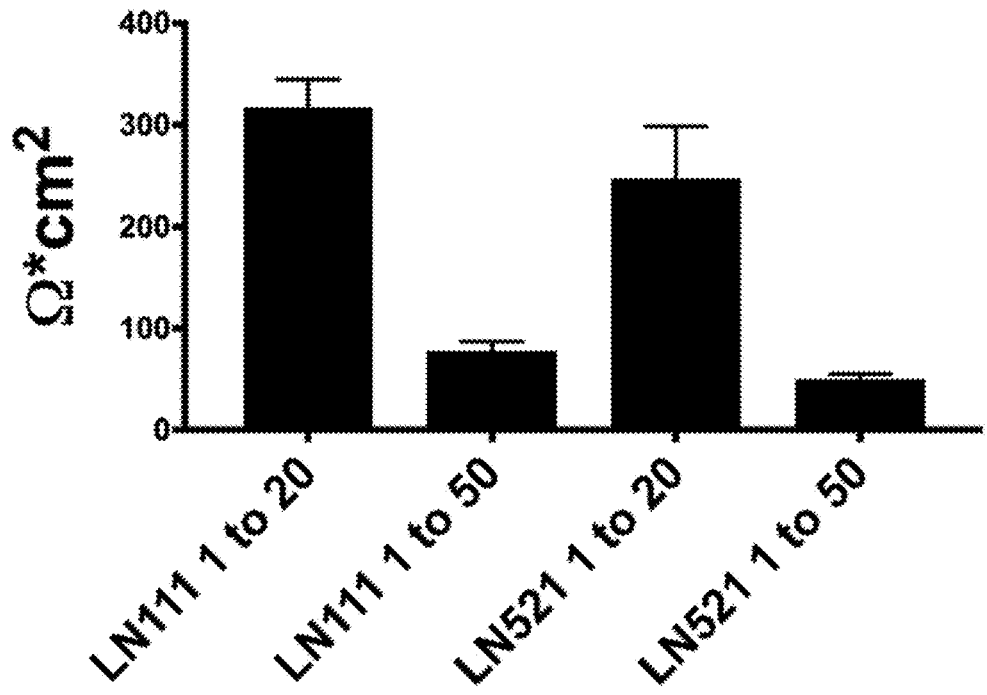
Figure 16B:
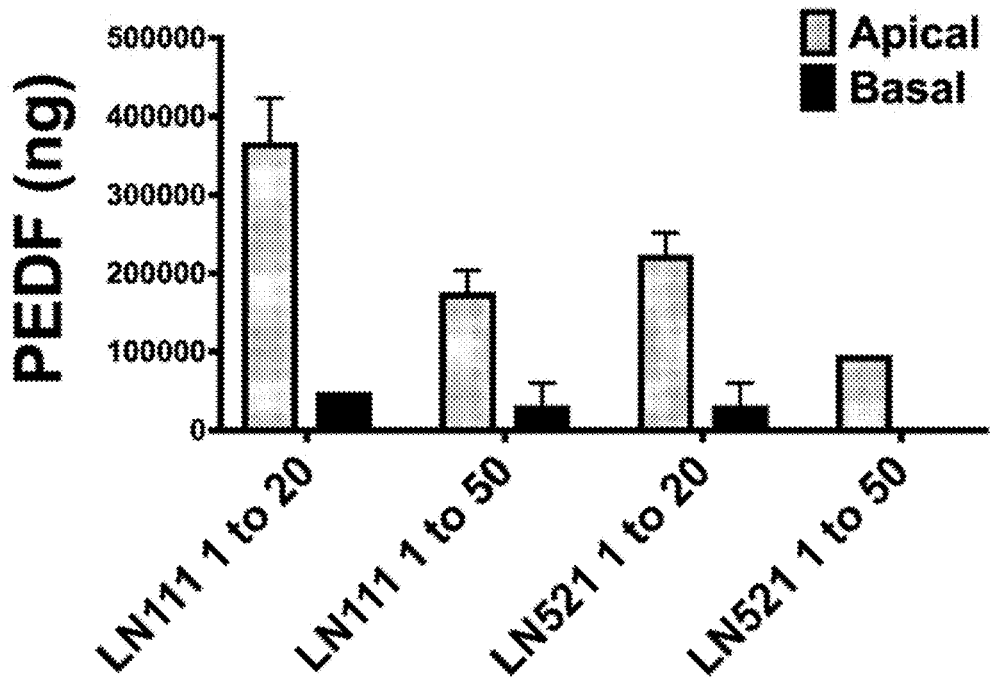
Figures 17A, 17B:
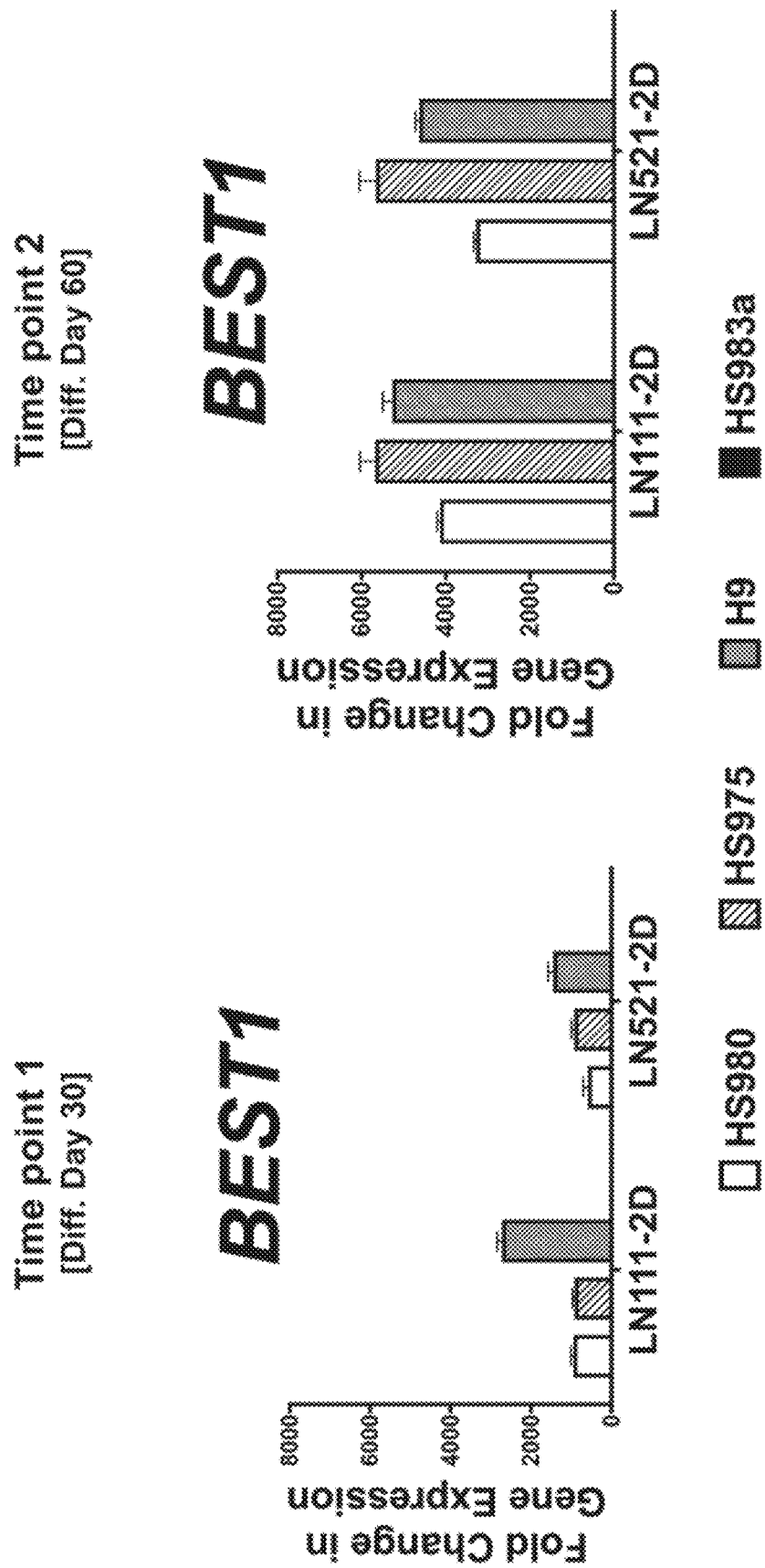
Figure 18B:
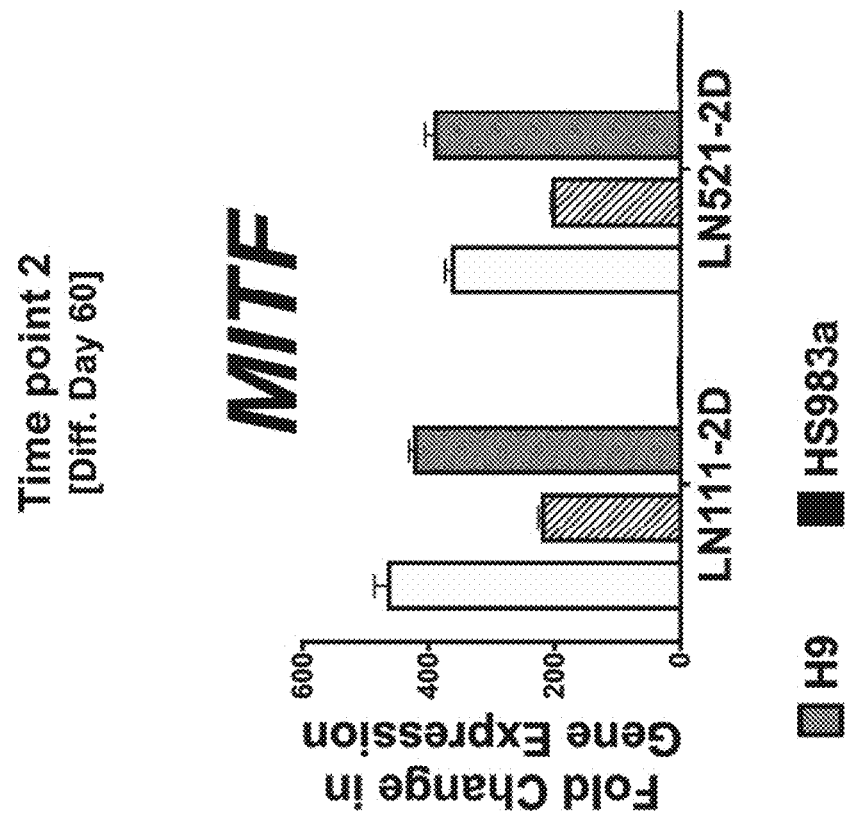
FIG. 18B is a bar graph for the MITF gene at time point 2. The y-axis runs from 0 to 600 in increments of 200.
Figure 18A:
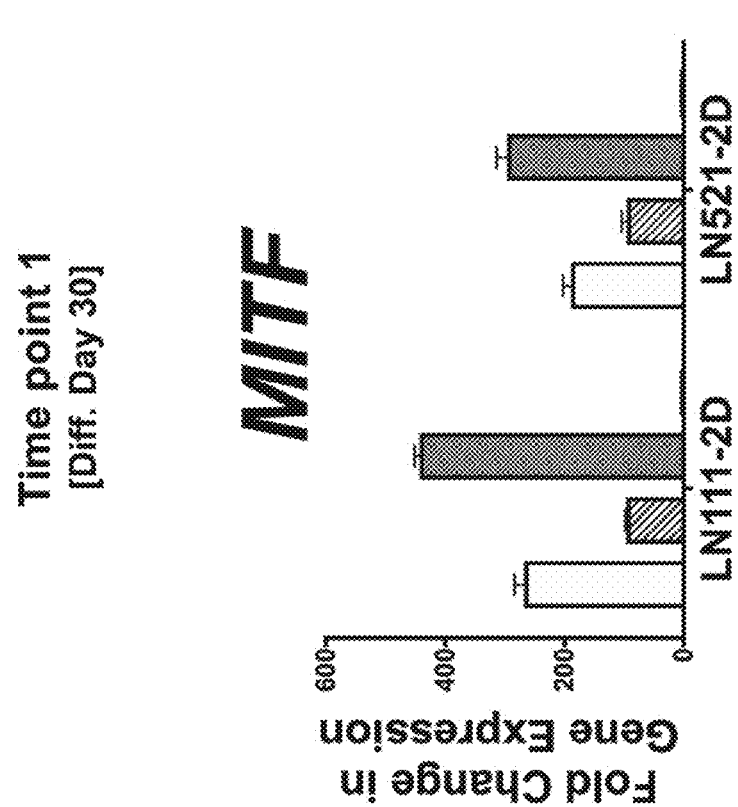
FIG. 18A is a bar graph for the MITF gene at time point 1. The y-axis runs from 0 to 500 in increments of 100.
Figures 19A, 19B:
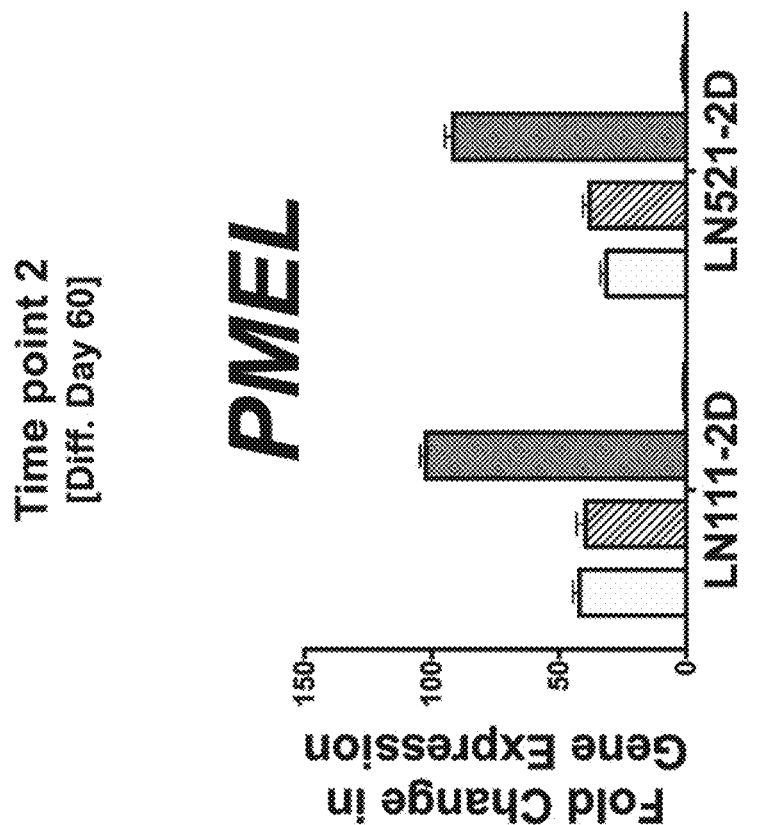
FIG. 19A is a bar graph for the PMEL gene at time point 1. The y-axis runs from 0 to 100 in increments of 20.
FIG. 19B is a bar graph for the PMEL gene at time point 2. The y-axis runs from 0 to 150 in increments of 50.
Figure 20A:
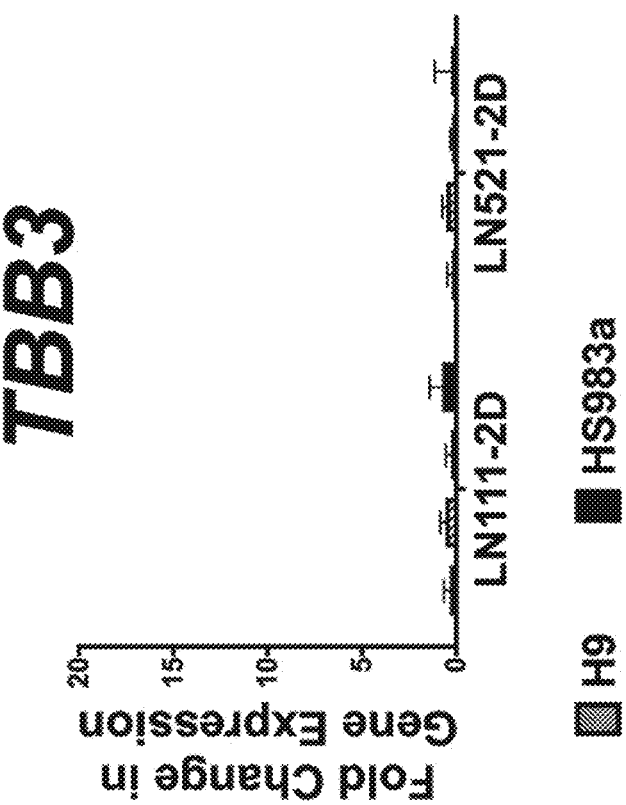
FIG. 20A is a bar graph for the TBB3 gene at time point 1. The y-axis runs from 0 to 40 in increments of 10.
Figure 20B:
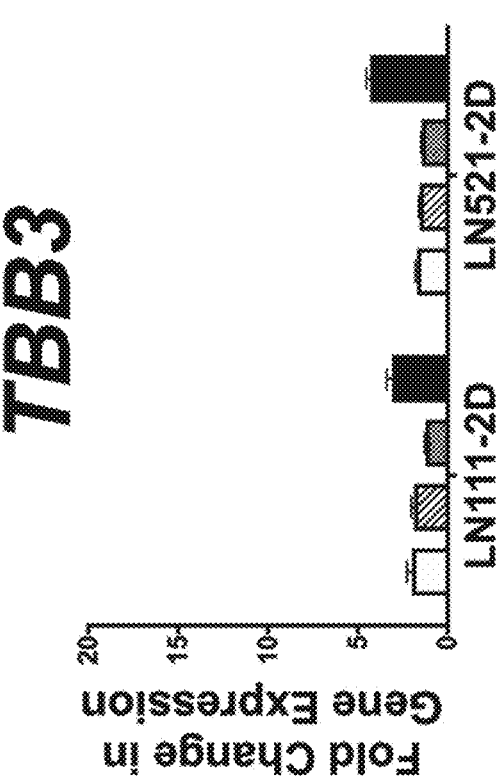
Figures 21A, 21B:
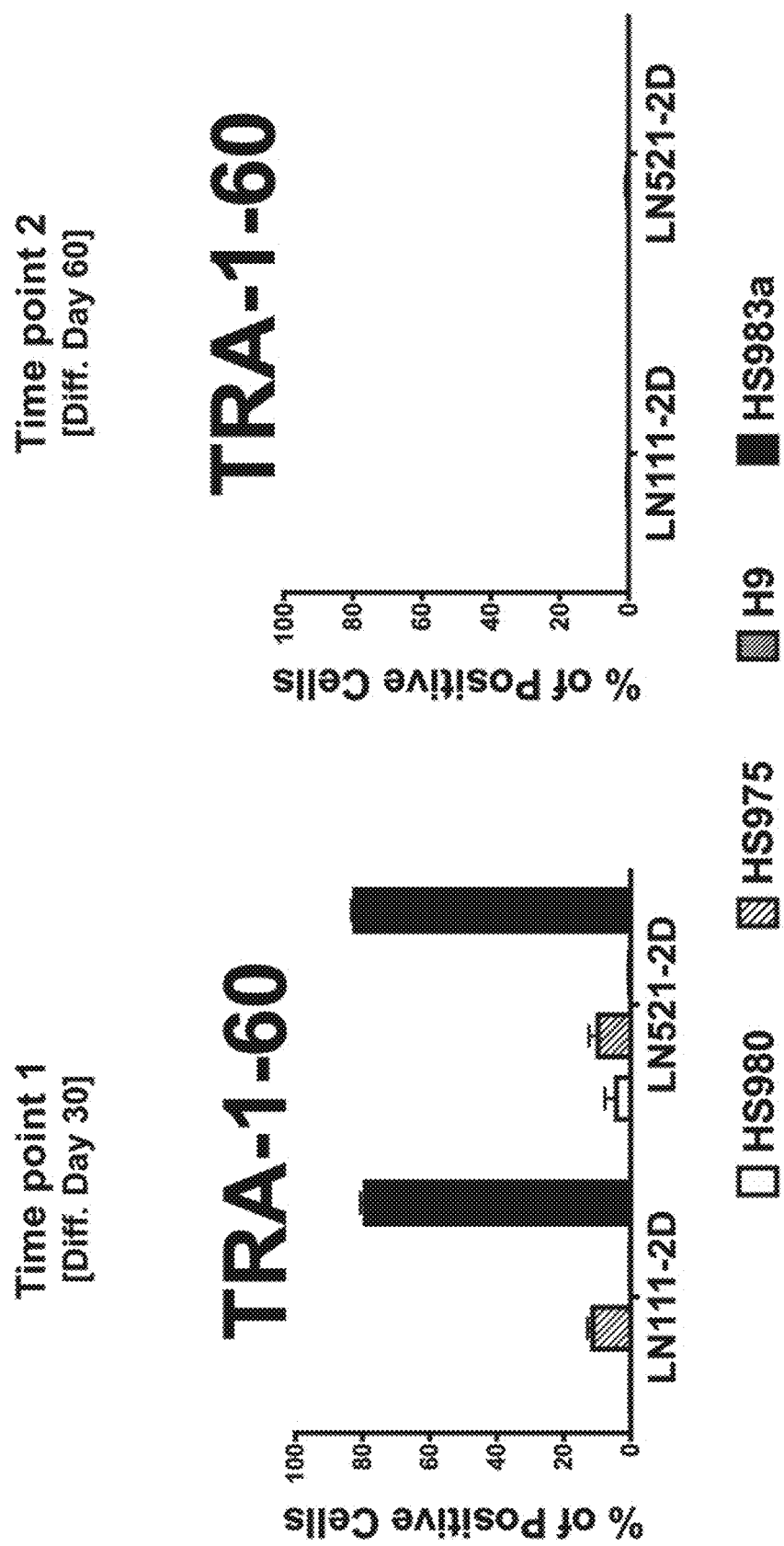
Figures 22A, 22B:
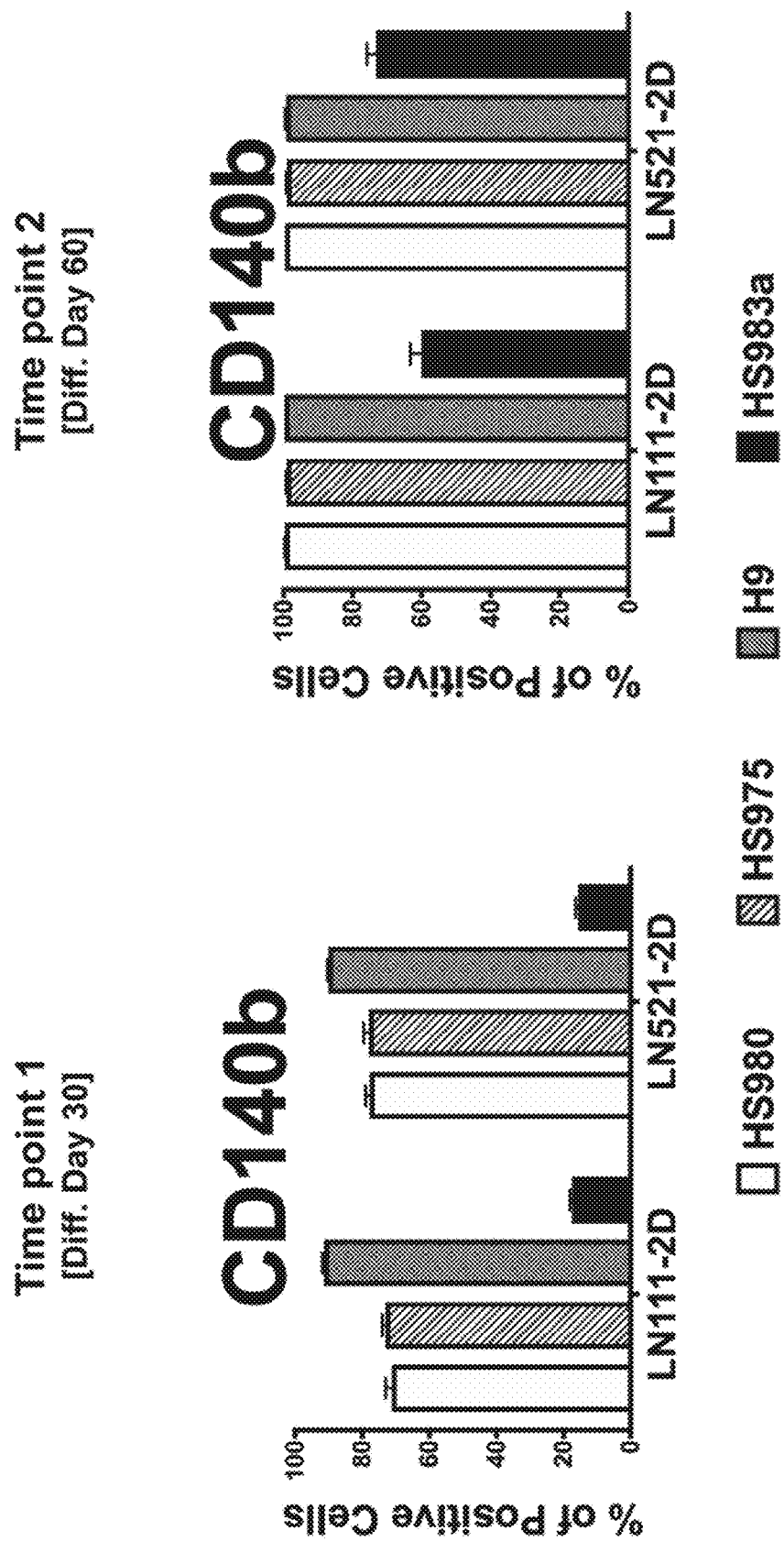
FIG. 22A is a bar graph for the CD140b gene at time point 1.
FIG. 22B is a bar graph for the CD140b gene at time point 2.
Figures 23A, 23B:
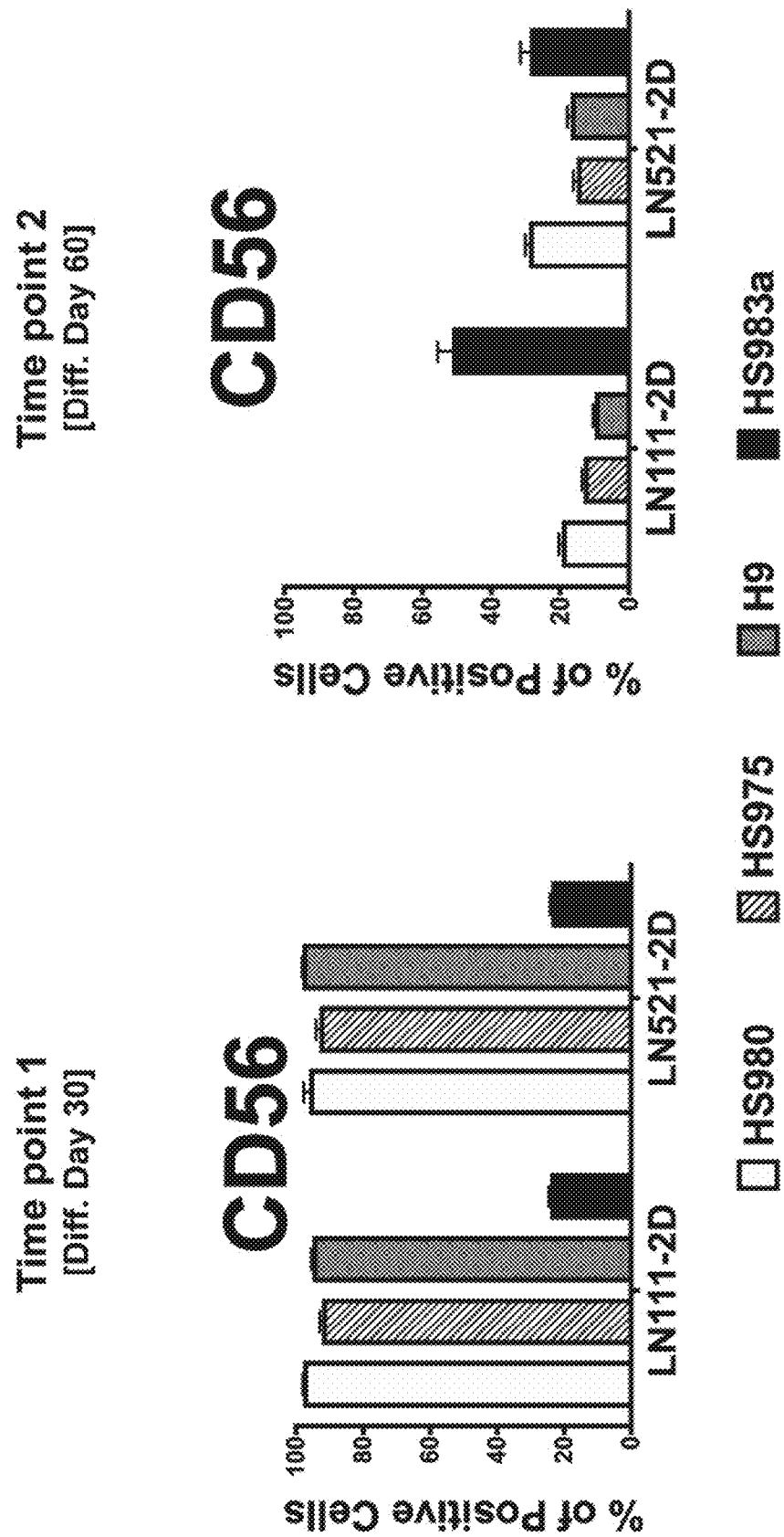
FIG. 23A is a bar graph for the CD56 gene at time point 1.
FIG. 23B is a bar graph for the CD56 gene at time point 2.
Figure 25A:
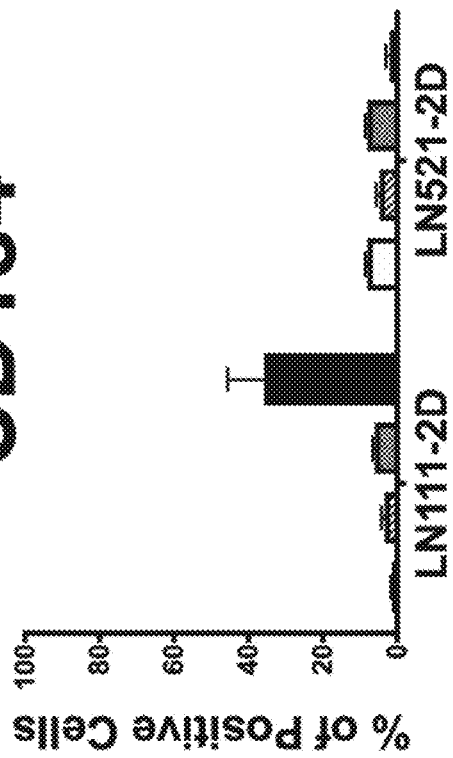
FIG. 25A is a bar graph for the CD184 gene at time point 1.
Figure 25B:
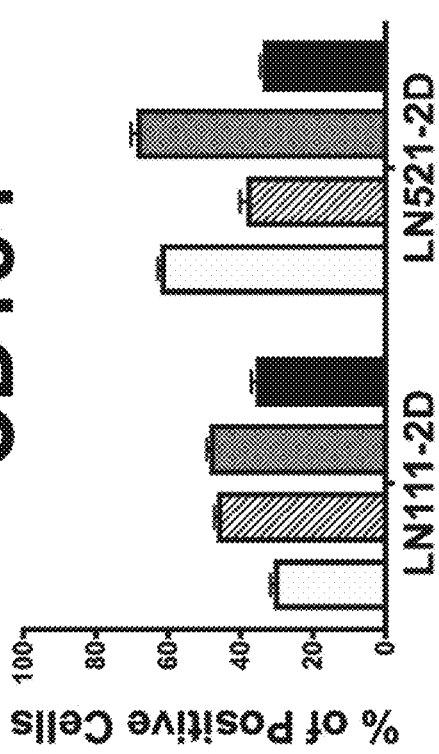

Titration experiments were conducted, where dissociated cells were re-plated at increasing dilutions from 1:1 to 1:100. The final yield of CD140b positive hESC-RPE cells followed the increasing dilutions to a maximum of 8000-fold yield relative to the number of starting pluripotent stem cells (FIG. 15B). This means that with a very modest starting point of 1 million hPSCs, $8 \times 10^9$ hPSC-RPE cells could be derived in about 60 days, an equivalent of 80,000 clinical treatment doses.

The final product further passed functional in vitro testing with monolayer integrity measured by transepithelial resistance (TEER), polarized secretion of pigment epithelium-derived factor (PEDF) measured by ELISA and phagocytosis of photoreceptor outer segments (POS) (FIGS. 16A-16D and data not shown). Replating cultures at 1:20 dilution in cells that were initially plated on hrLN-111 showed a higher degree of maturation in all the tests.

Successful retinal integration of replated hESC-RPE was confirmed within a preclinical large-eyed animal model (see Plaza-Reyes et al. supra). Multi-color enface and spectral domain-optical coherence tomography (SD-OCT) sagittal imaging in transplanted albino rabbits showed integration of pigmented cells and conserved retinal structure with hESC-RPE initially derived on hrLN-521 and hrLN-111 (FIG. 16D).

Example 3: Single Cell RNA Sequencing Analysis Ensures hESC-RPE Differentiation Purity Although the method demonstrated in Example 2 did generate seemingly pure hESC-RPE cells, there was still the question whether using isolation with the identified cell surface markers (Example 1) could further improve the purity of the final product. Another aim was to ensure that there were no contaminating pluripotent cells or other alternative cell type in the final culture with or without the use of cell isolation.

Figure 28:
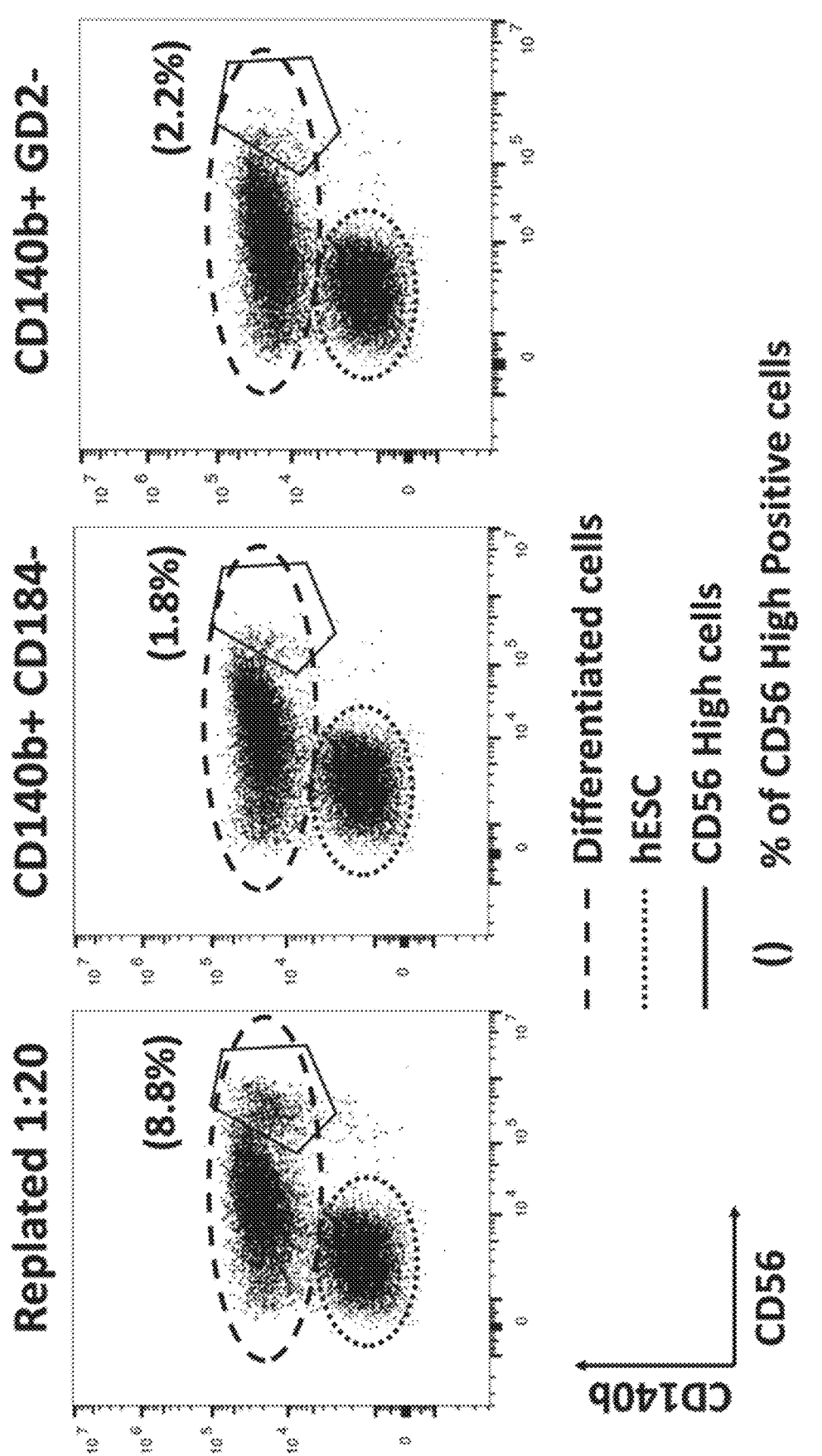
FIG. 28: Flow cytometry dot plots comparing percentage of cells expressing high levels of CD56 cell surface protein at day 60 of differentiation in cells that were either replated or enriched for CD140b+CD184− or CD140b+GD2− after 30 days of differentiation. The x-axis represents the marker expression on a logarithmic scale.
Figure 29:
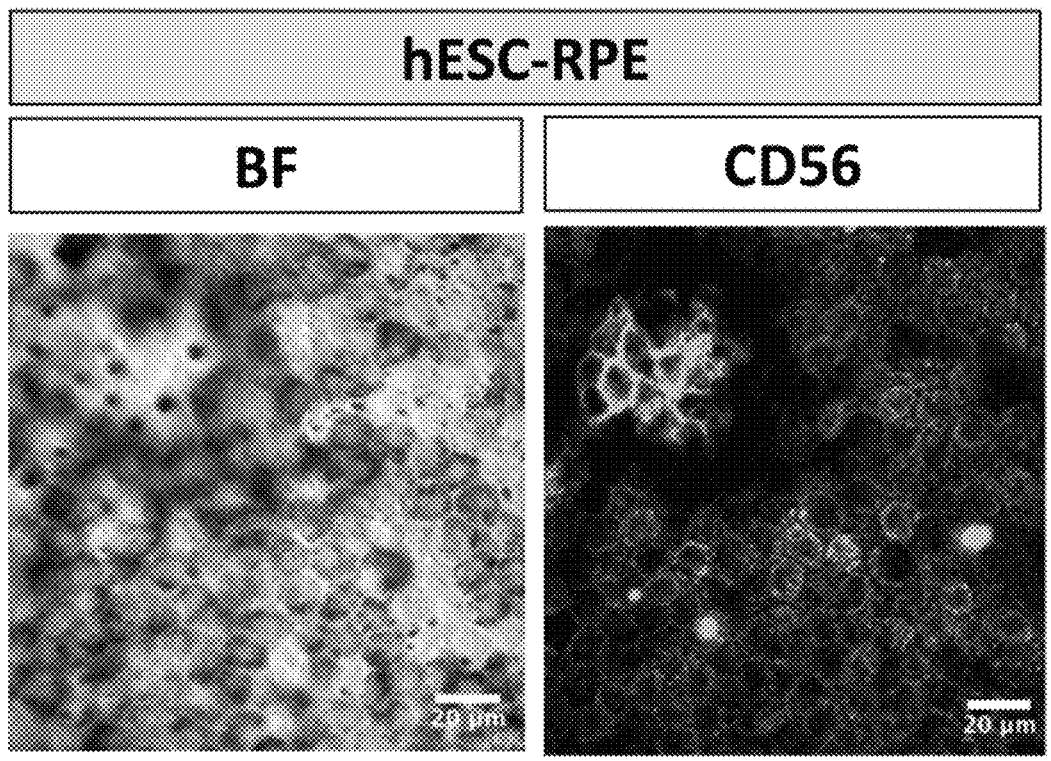
FIG. 29: Representative bright field and immunofluorescence staining pictures showing CD56 enriched in non-pigmented areas of hESC-RPE after 60 days of differentiation, consistent with less mature cells.
Figure 30:
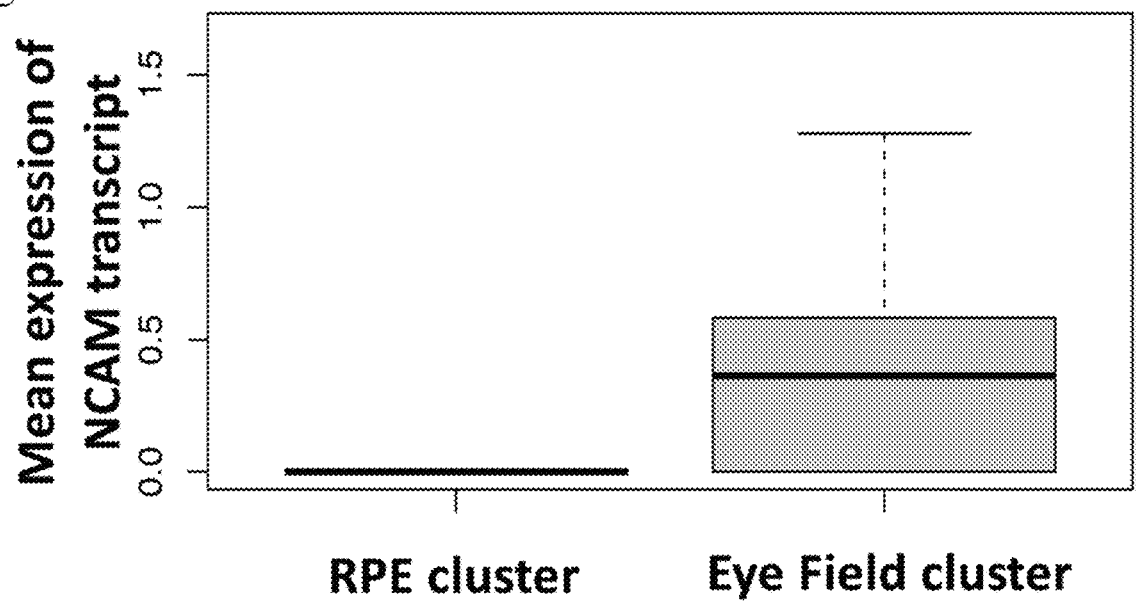
FIG. 30: Box plot comparing NCAM1/CD56 mean expression between the RPE and Eye Field clusters measured by the 10× Genomics single-cell RNA on hPSC-RPE cultures after 60 days of differentiation.
Figure 31:
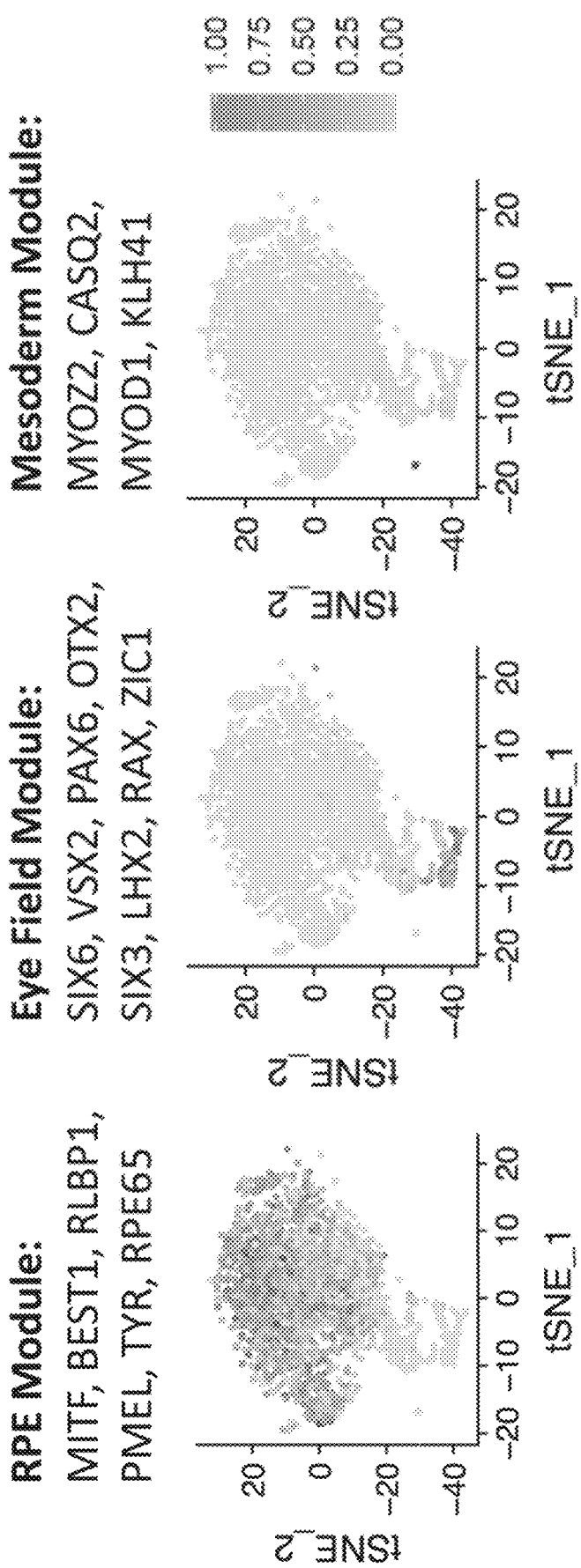
FIG. 31 and FIG. 32: tSNE cluster analysis of all three differentiated samples revealed three distinct clusters (FIG. 32). The three clusters expressed gene signatures associated with mature RPE (MITF, BEST1, RLBP1, PMEL, TYR, RPE65), immature eye-field progenitors (SIX6, VSX2, PAX6, OTX2, SIX3, LHX2, RAX, ZIC1), and mesodermal lineage respectively (MYOZ2, CASQ2, MYOD1, KLHL41), as depicted by the feature plots displaying expression module scores for the mentioned lineages over the t-SNE plot.
Figure 32:
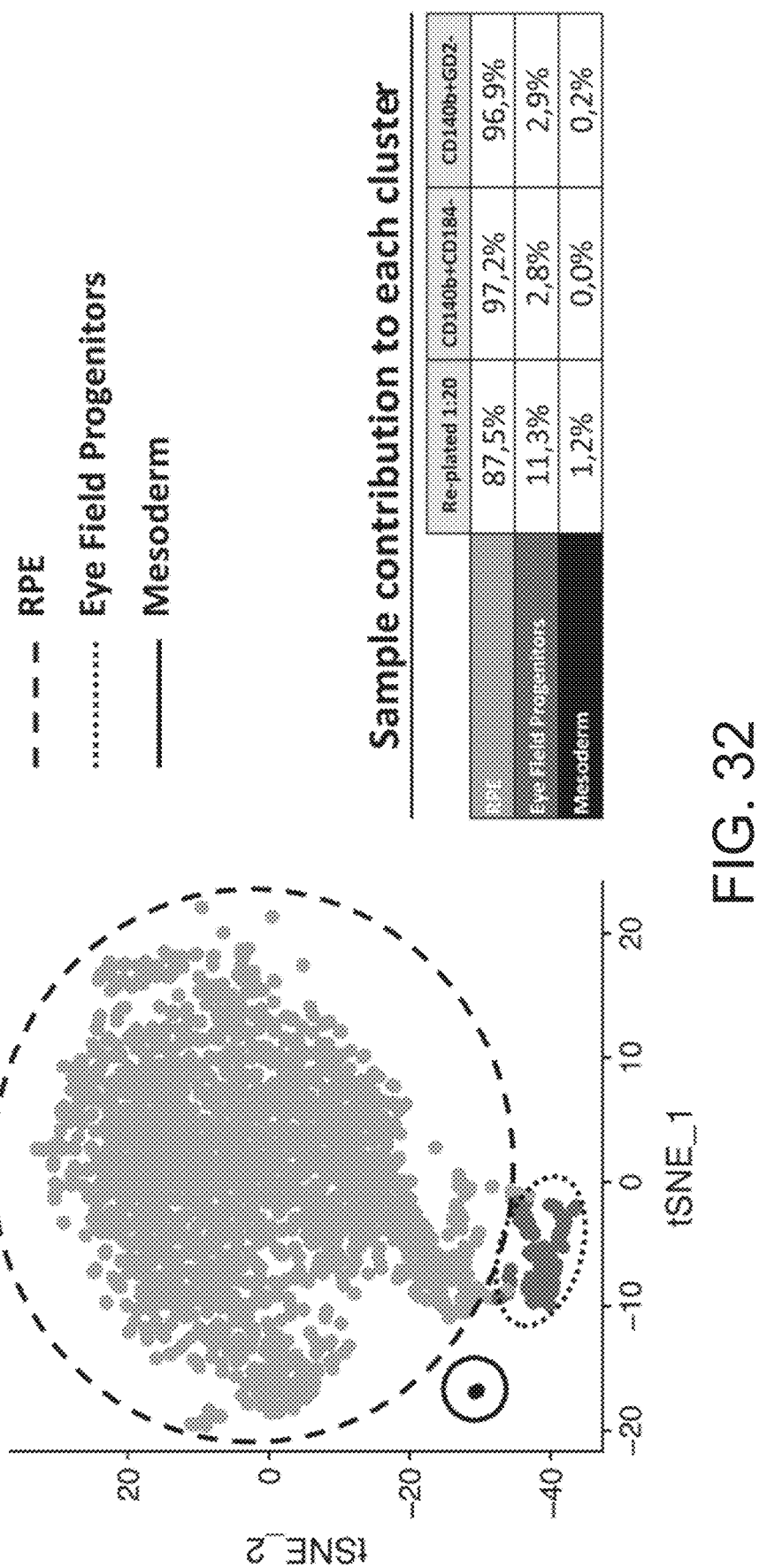
Figure 33:
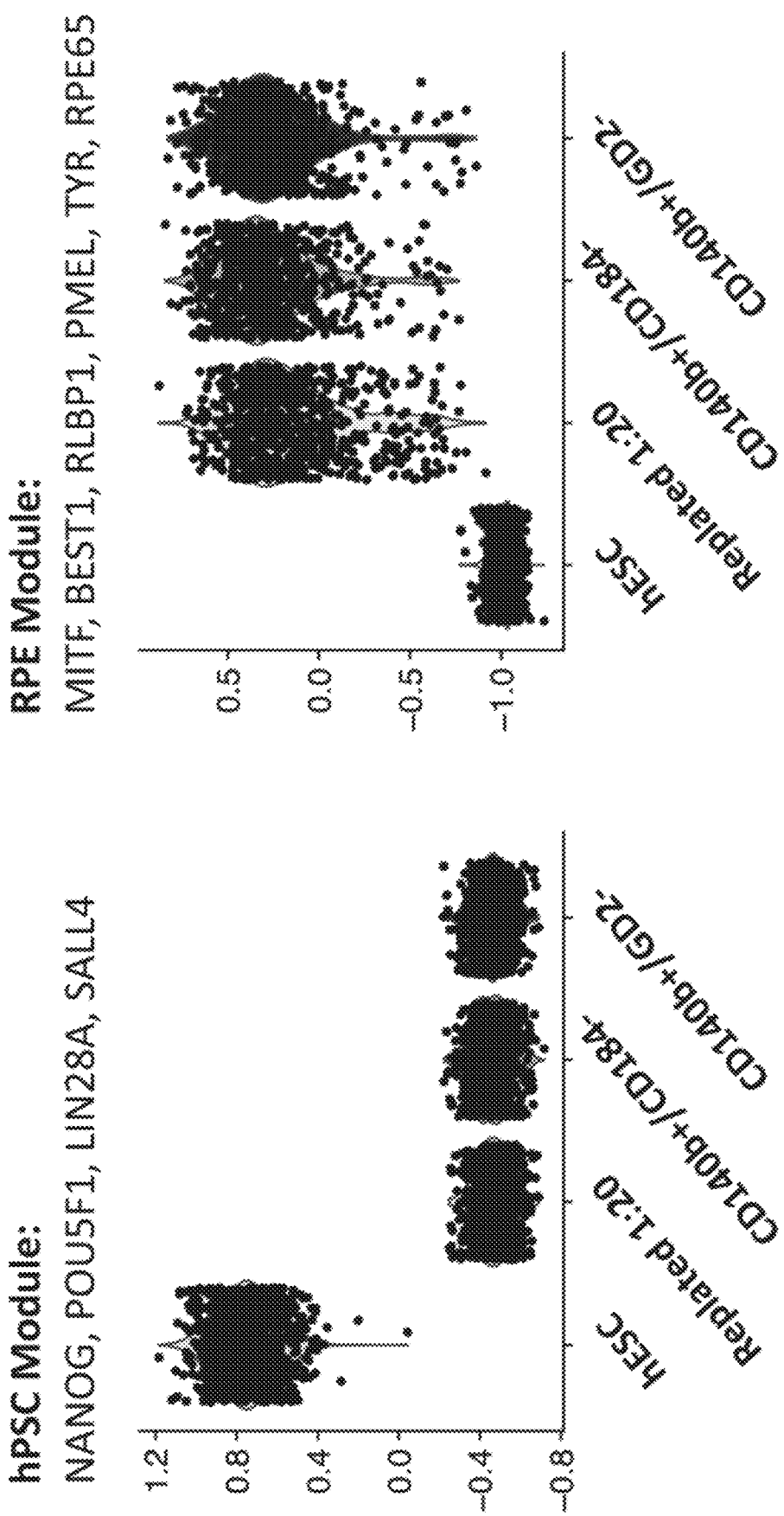
FIG. 33 shows single cell analysis that revealed that neither cells from the replated or sorted populations expressed pluripotency transcripts POU5F1, NANOG, LIN28A or SALL4, but instead most robustly expressed transcripts associated with RPE (MITF, CRALBP, PMEL, TYR, RPE65, BEST1).
Figure 34:
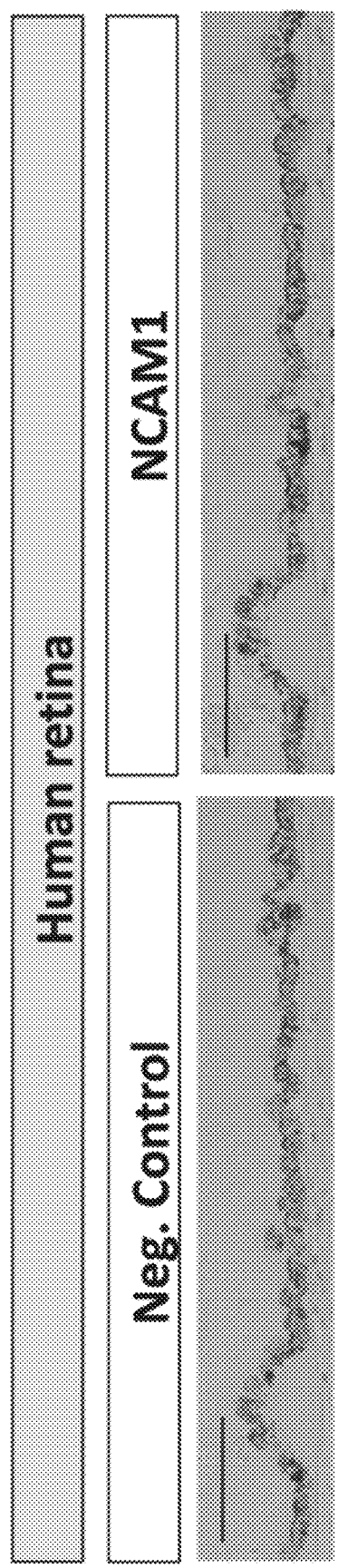
FIG. 34 shows specific immunostaining for NCAM1/CD56 in samples of human retina.
Figure 36:
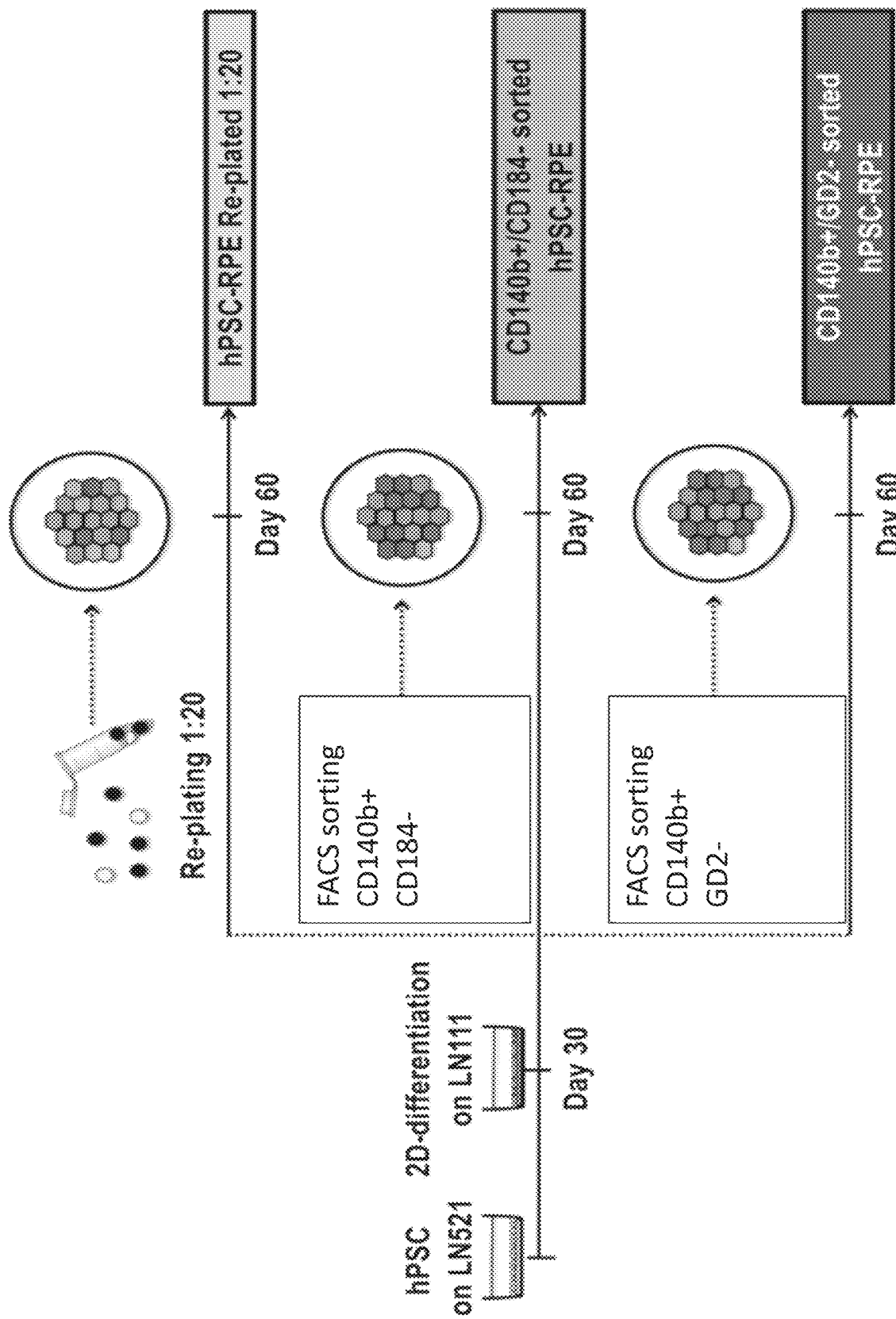
FIG. 36 illustrates schematically the experimental flow of enriching RPE cells using sorting of CD140b/CD184− and CD140b+/G2− cells (Example 2).

For this purpose, a comparative study of cultures that were either replated as described above in Example 2 or additionally purified with a combination of CD140b as a positive selection and negative selection using GD2 or CD184 at day 30 was performed. The replated and sorted populations were analyzed following additional 30 days culture on hrLN-521 as indicated (FIG. 36). Single cell analysis revealed that neither cells from the replated or sorted populations expressed pluripotency transcripts POU5F1, NANOG, LIN28A orSALL4, but instead most robustly expressed transcripts associated with RPE (MITF, CRALBP, PMEL, TYR, RPE65, BEST1) (FIG. 33). tSNE cluster analysis of all three differentiated samples revealed three distinct clusters (FIG. 32 and data not shown). The three clusters expressed gene signatures associated with mature RPE, immature eye-field progenitors and mesodermal lineage respectively (FIG. 31). Distribution of the cultures using replated or prospective isolation with the new markers showed that the replated cells preferentially contained the mesoderm contaminant, although the functional significance of such impurity at 1.2% contamination is questionable. The replated cells also harbored 11.3% of eye-field progenitors in contrast to just under 3% in the cultures with enrichment (FIGS. 31-32). Finally, signatures for several cell types present in the human retina including bipolars, amacrines, ganglion cells, photoreceptors, lens, endothelial cells and pan-neurons, were evaluated and no distinct clustering was found for any of the cell types (data not shown). While examining the single cell RNA sequencing cluster that contained genes associated with eye field progenitors it was found that NCAM1 also known as CD56 was enriched in this fraction of cells compared to the more mature RPE cluster (FIG. 30). Staining of the replated cultures showed small clusters with higher CD56 intensity, which also coincided with low pigmentation levels consistent with less mature cells (FIG. 29). In line with the sequencing data a larger CD56 "high" population was detected in the replated cultures compared to the sorted ones (FIG. 28). Furthermore, NCAM1/CD56 was not detected in mature cells following integration in the rabbit subretina or in adult human RPE, thus supporting that NCAM1/CD56 is lost in mature RPE cells (FIG. 34).

Example 4: The Identified Cell Surface Markers Show Reproducible Differentiation in Multiple hESCs A general problem with in vitro differentiation protocols is generally the requirement of optimization for individual cell lines. This has also been challenging for the previous suspension EB based differentiation protocol. Strong line to line variation but also striking differences between batch to batch were noticed even within the same cell line, making robust production very challenging. Therefore 4 hESC lines (HS980, HS975, H9 and HS983a) were tested in the new monolayer differentiation system using hrLN-111 or hrLN-521 (Example 2). Following 30 days of differentiation, three (HS980, HS975, H9) out of four lines were 70-90% CD140b positive and 50-65% positive for CD56, indicating robust induction of early RPE (FIGS. 21A-25B). In contrast, the HS983a line failed to reach 20% positive cells for either differentiation marker at 30 days indicating poor differentiation. In line with this observation the same line was found to still express the pluripotency marker TRA-1-60 in 80% of the cells (FIGS. 20A-21B). Thirty days following replating, the three performing lines had reached close to 100% CD140b levels and now reduced the progenitor marker NCAM1/CD56 to levels below 10%, correlating with the previous sequencing results (FIGS. 22A-23B). They had further reduced the fraction of cells positive for GD2 and CD184 to levels generally below 10% (FIGS. 24A-25B). At this stage the poor responding line had lost all significant TRA-1-60 expression and gained some signs of retinal differentiation with modest CD140b and CD56 levels while still expressing significant levels of the alternate fate markers GD2 and CD184, therefore indicating that the line can differentiate in this setting but with a significantly reduced kinetics (FIGS. 21A-25B). These results were confirmed also with transcriptional analysis of RPE associated genes such as MITF, BEST1 and PMEL (FIGS. 17A-19B).

As three out of four lines differentiated well with similar kinetics, it can be concluded that the monolayer differentiation protocol of Example 2 is reproducible in a majority of hPSC lines without the need for additional modification. Finally, these data also illustrate the utility of the markers identified in Example 1 as quality control during the production to eliminate batch-to-batch variability or to eliminate hPSC lines that might be resistant to differentiation.

In summary, a dissection-free methodology using in vitro hPSC-RPE differentiation in a 2D format on the biologically relevant substrate, human recombinant LN-111 or LN-521, has been demonstrated. A set of unique cell surface markers was also identified for RPE cells that can be used to optimize production methodology, perform quality control of production process and to define the final cellular composition of the product or to isolate these cells from other contaminating cells types arising from the in vitro differentiation process. The cells can be re-plated to enrich and expand the RPE population while eliminating other cell types. This dissection-free, xeno-free and defined and highly scalable protocol is compatible with GMP production of RPE cells, which can be used for subretinal transplantation.

MATERIALS AND METHODS

Human Cell Surface Marker Screening hESC and hESC-RPE cells were dissociated into single cells using TrypLE™ for 5-10 minutes. Optic vesicles were dissociated into single cells using TrypLE™ for 10 minutes followed by physical dissociation through a 20G needle. To allow the simultaneous analysis of these different populations in the same sample, hESC, hESC-RPE and OV-cells were labeled with CellTrace™ CFSE (0.25 µM) for 7 minutes at 37° C. or CellTrace™ Violet (5 µM) for 20 minutes at 37° C. following manufacturer's protocol (Thermo Fisher Scientific). Then the three cell types were stained using the BD Lyoplate™ Screening Panels (BD Biosciences) following manufacturer's protocol. The barcoding of cells made it possible to distinguish easily between the three groups of cells and to minimize sample variability during the screening. Samples were analyzed on 96-well plates on a LSRFortessa™ equipped with 405 nm, 640 nm, 488 nm, 355 nm and 561 nm lasers (BD Biosciences) or a CytoFLEXS™ equipped with 405 nm, 638 nm, 488 nm and 561 nm lasers (Beckman Coulter) cell analyzers. Non-viable cells were excluded from the analysis using 7-AAD nucleic acid dye (BD Biosciences). Analysis of the data was carried out using FlowJo v.10 software (Tree Star). See FIGS. 37A-37Bf for an illustration.

Cell Culture hESC lines HS980, HS975 and HS983 were derived and cultured under xeno-free and defined conditions according to the previously described method (Rodin, S. et al. Nat. Commun. 5, 3195 (2014)). The hESC line WA09/H9 was obtained from Wicell and was adapted to feeder-free culture on hrLN-521. The cells were maintained by clonal propagation on hrLN-521 coated plates (BioLamina AB) in NutriStem™ hPSC XF medium (Biological Industries), in a 5% $CO_2$/5% $O_2$ incubator and passaged enzymatically at 1:10 ratio every 5-6 days.

For passaging, confluent cultures were washed twice with PBS without $Ca^{2+}$ and $Mg^{2+}$ and incubated for 5 minutes at 37° C., 5% $CO_2$/5% $O_2$ with TrypLE Select (GIBCO, Invitrogen). The enzyme was then carefully removed and the cells were collected in fresh pre-warmed NutriStem™ hPSC XF medium by gentle pipetting to obtain a single cell suspension. The cells were centrifuged at 300G for 4 minutes, the pellet resuspended in fresh prewarmed NutriStem™ hPSC XF medium and cells plated on a freshly hrLN-521 coated dish. Two days after passage the medium was replaced with fresh prewarmed NutriStem™ hPSC XF medium and changed daily.

Hesc-RPE Monolayer Differentiation hESC were plated at a cell density of $2.4\times10^4$ cells/cm² on laminin coated dishes (human recombinant LN-111 or LN-521, Biolamina AB) using NutriStem™ hPSC XF medium. Rho-kinase inhibitor (Y-27632, Millipore) at a concentration of 10 µM was added during the first 24 hours, while cells were kept at 37° C., 5% $CO_2$/5% $O_2$. After 24 hours, hESC medium was replaced with differentiation medium (NutriStem™ hPSC XF without bFGF and TGFβ) and cells were placed at 37° C., 5% $CO_2$/21% $O_2$. From day 6 after plating, 100 ng/mL of Activin A (R&D Systems) was added to the media. Cells were fed three times a week and kept for 30 days. Monolayers were then trypsinized using TrypLE™ Select (GIBCO, Invitrogen) for 10 minutes at 37° C., 5% $CO_2$. The enzyme was carefully removed and the cells were collected in fresh pre-warmed NutriStem™ hPSC XF medium without bFGF and TGFβ by gentle pipetting to obtain a single cell suspension. The cells were centrifuged at 300G for 4 minutes, the pellet was resuspended, passed through a cell strainer (0 40 µm, BD Bioscience) and cells were seeded on laminin coated dishes (hrLN-111 and hrLN521 at 20 µg/mL) at different cell densities ranging from $1.4\times10^6$ to $1.4\times10^4$ cells/cm². Re-plated cells were fed three times a week during the subsequent 30 days with NutriStem™ hPSC XF medium without bFGF and TGFβ. For hESC-RPE in vitro differentiation in 3D suspension EBs, see Plaza-Reyes et al. supra. Bright field images were acquired with Nikon Eclipse™ TE2000-S microscope and a Canon SX170 IS camera was used to capture pigmentation from the top of the wells.

Quantitative Real-Time PCR

Total RNA was isolated using the RNeasy™ Plus Mini Kit and treated with RNase-free DNase (both from Qiagen). cDNA was synthesized using 1 µg of total RNA in 20 µl reaction mixture, containing random hexamers and Superscript™ III reverse transcriptase (GIBCO Invitrogen), according to the manufacturer's instructions.

Taq-polymerase together with Taqman™ probes (Thermo Fisher Scientific) for GAPDH (cat. no. 4333764F), NANOG (cat. no. Hs02387400_g1), POU5F1 (cat. no. Hs03005111_g1), BEST1 (cat. no. Hs00188249_m1), RPE65 (cat. no. Hs01071462_m1), TYR (cat. no. Hs00165976_m1), PMEL (cat. no. Hs00173854_m1) and TBB3 (cat no. Hs00801390_s1) were used. Samples were subjected to real-time PCR amplification protocol on StepOne™ real-time PCR System (Applied Biosystems). Three independent experiments were performed for every condition and technical duplicates were carried for each reaction. Results are presented as mean±SEM (standard error of the mean).

Flow Cytometry hESC-RPE growing on the tested substrates were dissociated into single cells using TrypLE™ Select. Samples were stained with BV421 Mouse Anti-Human CD140b (BD, #564124, clone 28D4, at a concentration of 10 µg/mL), PE Mouse Anti-Human CD140b (BD, #558821, clone 28D4, at a concentration of 10 µg/mL), BB515 Mouse Anti-Human CD56 (BD, #564489, clone B159, at a concentration of 2.5 µg/mL), Alexa Fluor 647 Mouse Anti-Human TRA-1-60 (BD, #560850, at a concentration of 0.6 µg/mL), BV421 Mouse Anti-Human CD184 (BD, #562448, clone 12G5, at a concentration of 2.5 µg/mL) and BV421 Mouse Anti-Human Disialoganglioside GD2 (BD, #564223, clone 14.G2a, at a concentration of 2.5 µg/mL) conjugated antibodies, diluted in 2% FBS and 1 mM EDTA (Sigma). Cells were incubated with the conjugated antibodies on ice for 30 minutes. Fluorescence minus one (FMO) controls were included for each condition to identify and gate negative and positive cells. Stained cells were analyzed using a CytoFLEX™ flow cytometer equipped with 488 nm, 561 nm, 405 nm and 640 nm lasers (Beckman Coulter). Analysis of the data was carried out using FlowJo™ v.10 software (Tree Star).

Cell sorting was performed on hPSC-RPE cultures after 21 days or 30 days of differentiation. Cells were incubated with the mentioned conjugated antibodies on ice for 30 minutes. Fluorescence minus one (FMO) controls were included for each condition to identify and gate negative and positive cells. Stained cells were then sorted using a BD FACS Aria Fusion Cell Sorter™ (BD Bioscience).

Immunofluorescence

Protein expression of mature hESC-RPE monolayers was assessed with immunofluorescence. Cells were fixed with 4% methanol free formaldehyde at room temperature for 10 minutes, followed by permeabilization with 0.3% Triton X-100™ in Dulbecco's phosphate-buffered saline (DPBS) for 10 minutes and blocking with 4% fetal bovine serum (FBS) and 0.1% Tween-20™ in DPBS for 1 hour. Primary antibodies were diluted to the specified concentrations in 4% FBS, 0.1% Tween-20™, DPBS solution: NANOG (1:200, ReproCel™ RCAB003P), Bestrophin 1 (BEST1) (1:100, Millipore MAB5466), Microphthalmia-Associated Transcription Factor (MITF) (1:200, Abcam ab3201, clone [D5]), Zonula occludens-1 (ZO-1) (1:100, Invitrogen 40-2200), PDGFRβ (CD140b) (1:200, BD #564124, clone 28D4), CXCR4 (CD184) (1:200, Novus Biologicals MAB172, clone [44716]) and Ganglioside GD2 (1:200, Santa Cruz sc-53831, clone [14G2a]). The primary antibodies were incubated overnight at 4° C. followed by 2 hours incubation at room temperature with secondary antibodies: Alexa Fluor 647 donkey anti-rabbit IgG and Alexa Fluor 488 donkey anti-mouse IgG (both from Thermo Fisher Scientific, A31573 and A21202, respectively) diluted 1:1000 in 4% FBS, 0.1% Tween-20, DPBS solution. Nuclei were stained with Hoechst 33342 (1:1000, Invitrogen). Images were acquired with Zeiss LSM710-NLO™ point scanning confocal microscope. Post-acquisition analysis of the pictures was performed using IMARIS™ (Bitplane) and/or Fiji/ImageJ™

Histology and Tissue Immunostaining

Immediately after sacrifice by intravenous injection of 100 mg/kg pentobarbital (Allfatal™ vet. 100 mg/ml, Omnidea), the eyes were enucleated and the bleb injection area marked with green Tissue Marking Dye (TMD) (Histolab Products). An intravitreal injection of 100 piL fixing solution (FS) consisting of 4% buffered formaldehyde (Solvenco AB) was made before fixation in FS for 24-48 hours, and embedding in paraffin. 4 μm serial sections were made through the TMD-labeled area and every 4 sections were stained with hematoxylin-eosin (HE).

For immunostaining, slides were deparaffinized in xylene, dehydrated in graded alcohols, and rinsed with dH$_2$O and Tris Buffered Saline (TBS, pH 7.6). Antigen retrieval was done in 10 mM citrate buffer (trisodium citrate dihydrate, Sigma-Aldrich, pH 6.0) with 1:2000 Tween-20™ (Sigma-Aldrich) at 96° C. for 30 min, followed by 30 min cooling at room temperature. Slides were washed with TBS and blocked for 30 min with 10% Normal Donkey Serum (Abcam) diluted in TBS containing 5% (w/v) IgG and protease free bovine serum albumin (Jackson Immunoresearch) in a humidified chamber. Primary antibodies diluted in blocking buffer, were incubated overnight at 4° C.: human nuclear mitotic apparatus protein (NuMA) (1:200, Abcam ab84680), BEST1 (1:200, Millipore MAB5466), CD140b/PDGFRβ (1:100, Santa Cruz Biotechnology sc-432) and CD56/NCAM1 (1:100, Santa Cruz Biotechnology sc-7326). Secondary antibodies (Alexa Fluor 555 donkey anti-rabbit IgG A31572 and Alexa Fluor 647 donkey anti-mouse IgG A31571, both from Thermo Fisher Scientific) diluted 1:200 in blocking buffer, were incubated 1 hour at room temperature. Sections were mounted with vector vectashield with DAPI mounting medium (Vector Laboratories) in a 24×50 mm coverslip.

For immunohistochemistry, slides were deparaffinized followed by epitope retrieval (ER2 solution, pH9 20 min, Leica Biosystems) and staining (IHC Protocol F) for CD140b/PDGFRβ (1:100, Santa Cruz Biotechnology sc-432) and CD56/NCAM1 (1:100, Santa Cruz Biotechnology sc-7326) antibodies on Bond RXm™ instrument (Leica Biosystems).

Images were taken with Olympus IX81™ fluorescence inverted microscope. Post-acquisition analysis of the pictures was performed using ImageJ™ software.

Phagocytosis Assay

FITC-labelled bovine photoreceptor outer segments (POS) were isolated and kindly given by Dr. E. F. Nandrot from Institut de la Vision, Paris (Parinot et al. J. Vis. Exp. (2014). doi:10.3791/52100). hESC-RPE were cultured on transwell membrane (0.33 cm$^2$, Corning) coated with hrLN-521 20 μg/mL for one month after seeding. Cells were incubated at 37° C. or 4° C. for 16 hours with 2.42×10$^6$ thawed POS/Transwell diluted in DMEM or CO$_2$ independent media (both from Thermo Fisher Scientific), respectively. After incubation, cells were quenched with Trypan Blue Solution 0.2% (GIBCO, Invitrogen) for 10 minutes at room temperature, fixed with 4% methanol free formaldehyde (Polysciences) at room temperature for 10 min and permeabilized with 0.3% Triton X-100™ in DPBS for 15 min. Rhodamine phalloidin staining (1:1000, 20 minutes at room temperature, Thermo Fisher Scientific) was used to visualize the cell boundaries. Nuclei were stained with Hoechst 33342 (1:1000, 20 minutes at room temperature, Invitrogen).

Images were acquired with Zeiss LSM710-NLO™ point scanning confocal microscope. Post-acquisition analysis of the pictures was performed using IMARIS™ (Bitplane).

Enzyme-Linked Immunosorbent Assay (ELISA)

hESC-RPE were cultured on Transwell™ membranes (0.33 cm$^2$, Millipore) coated with different substrates. Supernatants from both the hESC-RPE apical and basal sides (meaning upper and lower compartments of the transwell, respectively) were collected 60 hours after the medium was changed. VEGF and PEDF secretion levels were measured in triplicates for each condition with commercially available human VEGF and PEDF ELISA Kits (VEGF: Cat #DVE00, R&D Systems; PEDF: Cat #RD191114200R, BioVendor), in accordance with the instructions of the manufacturers, after 60 days of culture The optical density readings were measured using SpectraMax™ 250 Microplate Reader (MolecularDevices). Results are presented as mean±SEM (standard error of the mean).

Transepithelial Resistance Measurements

Transepithelial electrical resistance (TER) RPE cells plated on Transwells™ (0.33 cm$^2$, Millipore) was measured using the Millicell™ Electrical Resistance System volt-ohm meter (Millicell ERS-2, Millipore), according to the manufacturer's instructions. 60-day cultures were equilibrated outside the incubator at room temperature for 15-20 min before the experiment. Measurements were performed in unchanged culture media in triplicates for each condition, at three different positions of each well. Averages were used for further analysis. The background resistance was determined from a blank culture insert in the same media coated with the corresponding substrate but without cells, and subtracted from the respective experiment condition. Measurements are reported as resistance in ohms times the area in square centimeter ($\Omega$*cm$^2$). Results are presented as mean±SEM (standard error of the mean).

Single Cell RNA Sequencing Bioinformatic Analysis 60 days hESC-RPE cells were dissociated using TrypLE™ Select and passed through a cell strainer (0 40 μm, BD Bioscience). They were resuspended in a 1000 cells/μL in 0.04% BSA in PBS. Cells were transported at 4° C. to the Eukaryotic Single Cell Genomics Facility (ESCG, SciLifeLab, Stockholm, Sweden) where a 3' cDNA library was prepared for single cell RNA sequencing with the 10× Genomics platform.

Cell Ranger™ 2.1.1 (10× Genomics) pipeline was used to convert Illumina base call files to fastq format, align sequencing reads to the hg19 transcriptome using the STAR aligner, and generate feature-barcode matrices. Cell Ranger™ quality-control filtered cells were analyzed in R version 3.5.1 (R Core Team), using Seurat™ suite version 2.3.4. As a further quality-control measure, RPE cells with unique expressed genes (≥2000 to ≤5000), UMIs (≥10000 to ≤30000) and percentage of UMIs mapping to MT-genes (≥0.025 to ≤0.10) were selected. Similarly, hESC cells with unique expressed genes (≥2000 to ≤8000), UMIs (≥10000 to ≤80000) and percentage of UMIs mapping to MT-genes (≥0.025 to ≤0.10). This filtration step resulted in final dataset of 905, 616, 725 and 779 cells for hESC, CD140b+GD2−, CD140b+CD184− and re-plated 1:20 samples, respectively. Before dimensionality reduction by principal-component analysis (PCA), cell-cell variation in gene expression driven by UMIs, mitochondrial gene expression and cell-cycle stages were regressed out during data scaling process. Variable genes within RPE samples were selected based on their normalized average expression and dispersion (expression cutoff=0.0125 to 5, and bottom dispersion cutoff=0.5). For principal component (PC) selection, findings of PCHeatmap™, jackStraw™, PC standard deviations and Clustree™ analysis were assessed. The first 15 PCs were used for the t-SNE projection and clustering analysis (resolution=0.1, perplexity=40).

Cell clusters were analyzed by two approaches. Top differential genes were first identified for each cluster using Wilcoxon Rank Sum test. Secondary, signature gene expression (module scores) was computed for undifferentiated hESC and several cell types present in human retina. Cells expressing mesoderm markers were manually subdivided in a separate cluster using interactive plotting features of Seurat™

Animals

After approval by the Northern Stockholm Animal Experimental Ethics Committee, 9 New Zealand white albino rabbits (provided by Lidköpings rabbit farm, Lidköping, Sweden) aged 5 months, weighing 3.5 to 4.0 kg were used in this study. All experiments were conducted in accordance with the Statement for the Use of Animals in Ophthalmic and Vision Research.

Subretinal Transplantation hESC-RPE monolayers were washed with PBS, incubated with TrypLE™ and dissociated to single cell suspension. Cells were counted in a Neubauer haemocytometer chamber using 0.4% trypan blue (ThermoFisher Scientific Corp.), centrifuged at 300 g for 4 minutes, and the cell pellet was resuspended in freshly filter-sterilized PBS to a final concentration of 1000 cells/μL. The cell suspension was then aseptically aliquoted into 600 μL units and kept on ice until surgery.

Animals were put under general anesthesia by intramuscular administration of 35 mg/kg ketamine (Ketaminol™, 100 mg/ml, Intervet) and 5 mg/kg xylazine (Rompun™ vet. 20 mg/ml, Bayer Animal Health), and the pupils were dilated with a mix of 0.75% cyclopentolate/2.5% phenylephrine (APL). Microsurgeries were performed on both eyes using a 2-port 25G transvitreal pars plana technique (Alcon Accurus, Alcon Nordic) as described previously (Petrus-Reurer, S. et al., *J. Vis. Exp.* (2018). doi:10.3791/56702). The cell suspension was drawn into a 1 mL syringe connected to an extension tube and a 38G polytip cannula (MedOne Surgical Inc). Without prior vitrectomy the cannula was inserted through the upper temporal trocar. After proper tip positioning, ascertained by a focal whitening of the retina, 50 μL of cell suspension (equivalent to 50,000 cells) was injected slowly subretinally approximately 6 mm below the inferior margin of the optic nerve head, forming a uniform bleb that was clearly visible under the operating microscope. Care was taken to maintain the tip within the bleb during the injection to minimize reflux. After instrument removal light pressure was applied to the self-sealing suture-less sclerotomies. 2 mg (100 μL) of intravitreal triamcinolone (Triescence™, Alcon Nordic) was administered one week prior to the surgery, and no post-surgical antibiotics were given.

The invention claimed is:

1. A method for obtaining Retinal Pigment Epithelium (RPE) cells, comprising:
   a. providing a culture of human pluripotent stem cells adherent on a first substrate comprising a first laminin;
   b. exposing the adherent stem cells to a differentiation medium for a first time period of about 15 days to about 50 days to obtain a first population of adherent cells comprising RPE cells and/or progenitors thereof;
   c. at the end of the first time period, dissociating the first population from the first substrate;
   d. replating the dissociated first population of cells on a second substrate comprising a second laminin; and
   e. culturing the replated first population of cells on the second substrate for second time period to obtain an expanded and matured second population of cells comprising the RPE cells;
   wherein the first and second laminins are independently selected from LN-521, LN-511, LN-111 and LN-121, and are an intact protein or protein fragment; and
   further comprising quantitating the fraction of cells expressing the marker CD140b; and
   wherein the dissociation step (c) is initiated when at least 30% of the cells are positive for the marker, or wherein the culturing step (e) is continued until at least 80% of the cells are positive for the marker.

2. The method according to claim 1, wherein the first and second laminin are coated at an amount of about 5 μg/cm² to about 20 μg/cm²; or
   wherein the first and/or second substrate is/are xeno-free; or
   wherein the first and/or second substrate contain only a single laminin.

3. The method according to claim 1, wherein the first laminin is LN-111 and the second laminin is LN-521.

4. The method according to claim 1, wherein the stem cells are cultured in a stem cell culture medium comprising basic fibroblast growth factor (bFGF) or transforming growth factor beta (TGFbeta), and a Rho-kinase inhibitor is included in the stem cell culture medium for a time period of about 12 hours to about 48 hours prior to the initiation of the exposure to the differentiation medium.

5. The method according to claim 1, wherein Activin A is included in the differentiation medium.

6. The method according to claim 5, wherein Activin A is included in the differentiation medium at a concentration of about 50 ng/ml to about 200 ng/ml.

7. The method according to claim 5, wherein Activin A is included in the differentiation medium no earlier than a time point at about 4 days to about 8 days from the exposure, and ending at the time of the dissociation step.

8. The method according to claim 1, wherein the first time period is about 15 days to about 40 days.

9. The method according to claim 1, further comprising quantitating the number or fraction of cells expressing a marker selected from CD56, CD104, CD164, CD220, or EGFR, wherein the dissociation step (c) is initiated when at least 30% of the cells are positive for the marker, or wherein the culturing step (e) is continued until at least 80% of the cells are positive for the marker.

10. The method according to claim 1, further comprising quantitating the number or fraction of cells expressing a marker selected from GD2, CD184, CD10, CD30, CD49a, CD49b, CD50, CD171, TRA-1-60, or CD326, wherein the dissociation step (c) is initiated when at least 30% of the cells are negative for the marker, or wherein the culturing step (e) is continued until at least 80% of the cells are negative for the marker.

11. The method according to claim 1, wherein the dissociated first population of cells are replated without any selection.

12. The method according to claim 1, wherein the dissociated first population of cells is enriched prior to replating by the steps of:
F1. labelling a cell surface marker on the dissociated first population of cells;
F2. separating the cells that are positive for said cell surface marker from cells that are negative for said cell surface marker to obtain an enriched first population of cells that is more enriched in RPE cells and/or progenitors thereof than the dissociated first population cells; and
F3. using the enriched first population of cells in the replating step.

13. The method according to claim 12, wherein the cell surface marker is selected from CD140b, CD56, CD104, CD164, CD220, CD165 and EGFR, wherein cells positive for said cell surface marker are selected for the enriched first population of cells.

14. The method according to claim 12, wherein the cell surface marker is selected from GD2, CD184, CD10, CD30, CD49a, CD49b, CD50, CD171, TRA-1-60, and CD326, wherein cells negative for said cell surface marker are selected for the enriched first population.

15. The method according to claim 1, wherein the dissociation from the first substrate involves forming a suspension of single cells of the first population of cells.

16. The method according to claim 1, wherein the dissociated cells are replated on a second substrate at a cell density from about $1.4 \times 10^4$ cells/cm$^2$ to about $1.4 \times 10^6$ cells/cm$^2$.

17. The method according to claim 1, wherein the RPE cells are obtained after a total of 6-12 weeks.

18. The method according to claim 1, wherein the first and second laminins are both LN-521.

* * * * *